(12) United States Patent
Walecki

(10) Patent No.: US 11,885,609 B2
(45) Date of Patent: Jan. 30, 2024

(54) WAFER THICKNESS, TOPOGRAPHY, AND LAYER THICKNESS METROLOGY SYSTEM

(71) Applicant: Wojciech Jan Walecki, Sunrise, FL (US)

(72) Inventor: Wojciech Jan Walecki, Sunrise, FL (US)

( * ) Notice: Subject to any disclaimer, the term of this patent is extended or adjusted under 35 U.S.C. 154(b) by 0 days.

(21) Appl. No.: 17/532,308

(22) Filed: Nov. 22, 2021

(65) Prior Publication Data

US 2023/0160687 A1 May 25, 2023

(51) Int. Cl.
*G01B 11/06* (2006.01)
*G01J 3/42* (2006.01)
*G01J 3/02* (2006.01)

(52) U.S. Cl.
CPC ............ *G01B 11/06* (2013.01); *G01J 3/0218* (2013.01); *G01J 3/42* (2013.01)

(58) Field of Classification Search
None
See application file for complete search history.

(56) References Cited

U.S. PATENT DOCUMENTS

| | | | | |
|---|---|---|---|---|
| 7,116,429 B1 * | 10/2006 | Walecki | ............. | G01B 11/0675 356/479 |
| 10,209,058 B1 * | 2/2019 | Walecki | ................ | G01B 11/303 |
| 2014/0368830 A1 * | 12/2014 | Michelt | ............. | G01B 11/0608 356/485 |

\* cited by examiner

*Primary Examiner* — Tarifur R Chowdhury
*Assistant Examiner* — Roberto Fabian, Jr.

(57) ABSTRACT

The invention describes a metrology system allowing for the reduction of the errors caused by vibration of the production floor and allowing for measurements of the thickness of wafers in motion. This is accomplished by performing simultaneous measurements of spectra containing interference signals containing distance information using a plurality of probes positioned on both sides of the measured wafer on the same detector at the same time or by means of plurality of synchronized detectors. System is also able to measure thickness of the individual optically accessible layers present in the sample.

3 Claims, 88 Drawing Sheets

WAFER THICKNESS, TOPOGRAPHY, AND LAYER THICKNESS METROLOGY SYSTEM

CROSS-REFERENCE TO RELATED APPLICATIONS

There are no related applications.

STATEMENT REGARDING FEDERALLY SPONSORED RESEARCH OR DEVELOPMENT

There was no federal sponsorship for this research and development.

THE NAMES OF THE PARTIES TO A JOINT RESEARCH AGREEMENT

There was no joint development agreement.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

There is no appendix. There is no disc.

STATEMENT REGARDING PRIOR DISCLOSURES BY THE INVENTOR OR A JOINT INVENTOR

There was no public prior disclosure of the invention.

BACKGROUND OF THE INVENTION

Our invention is related to the determining the topography and thickness of slabs of materials. More particularly, the present invention in one of its embodiments relates to measuring the thickness of slabs of materials using a spectroscopic system. The invention can be used for measurement of the topography and thickness of semiconductors and other materials ranging from 0.1 micrometer up to 10 mm. The invention can be used to measure the thickness of slabs of homogenous materials, thickness of layered materials, optical thickness of individual layers, refractive indices of uniform materials, and the roughness of the interfaces between material layers.

The invention may be used in applications involving back-end processing of semiconductor chips, grinding and polishing of patterned and blanket wafers, and processing of micro-electromechanical-systems, such as but not limited to pressure monitors, micro-mirrors and similar advanced devices and structures.

BRIEF SUMMARY OF THE INVENTION

Measurement of the thickness of thin wafers is important in modern chip packaging. At the backend phase of manufacturing, wafers are thinned using mechanical or chemical means. Since various chips are often stacked, it is important to accurately control the thickness and flatness of individual chips. Often the thickness and flatness metrology tools are in proximity of other machinery causing mechanical vibrations, such as grinders or lapping machines. The invention describes a metrology system allowing for the reduction of the errors caused by vibration of the production floor and allowing for measurements of the thickness of wafers in motion. This is accomplished by performing measurements of spectra containing interference signals containing distance information using a plurality of probes positioned on both sides of the measured wafer on the same detector at the same time. The invention reduces number of spectrometers, and detectors used in measurement and provides excellent synchronization of the measured signals.

BRIEF DESCRIPTIONS OF THE SEVERAL VIEWS OF THE DRAWINGS

Figure 4:
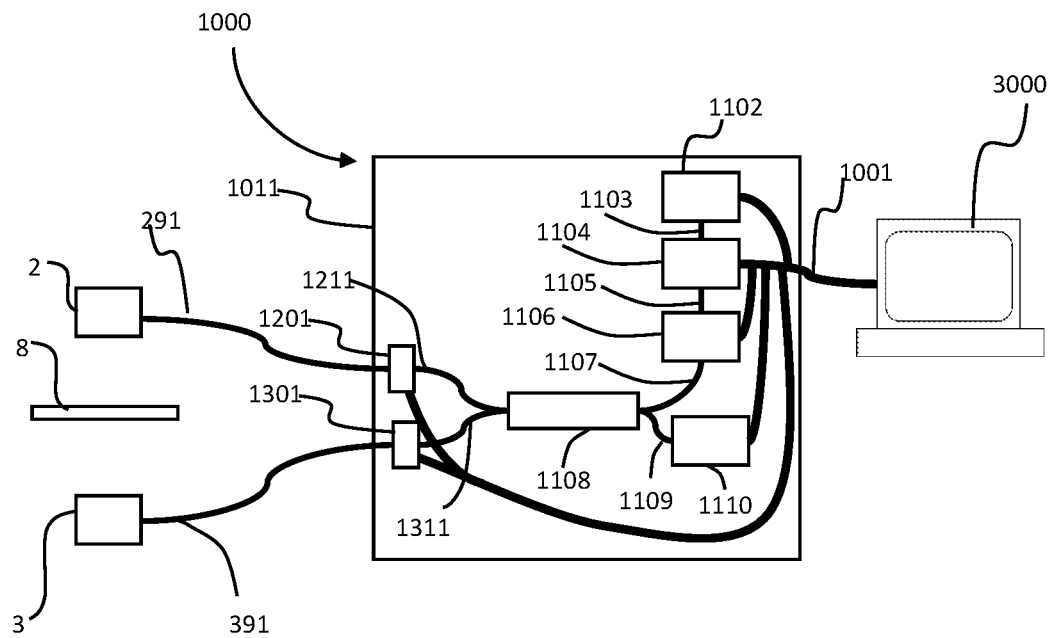
FIG. 4 represents a metrology unit similar with computer-controlled shutters 1201 and 1301.
Figure 6:
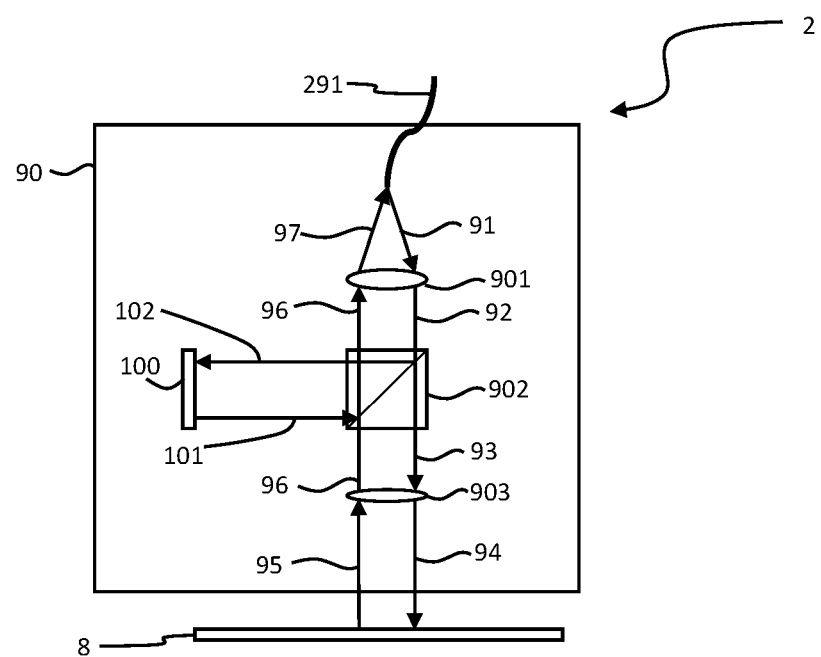

FIG. 6 represents probe 3 when connected to the metrology unit shown in FIG. 4. In this case, the optical fiber 201 is replaced by the optical fiber 291.

Figure 7:
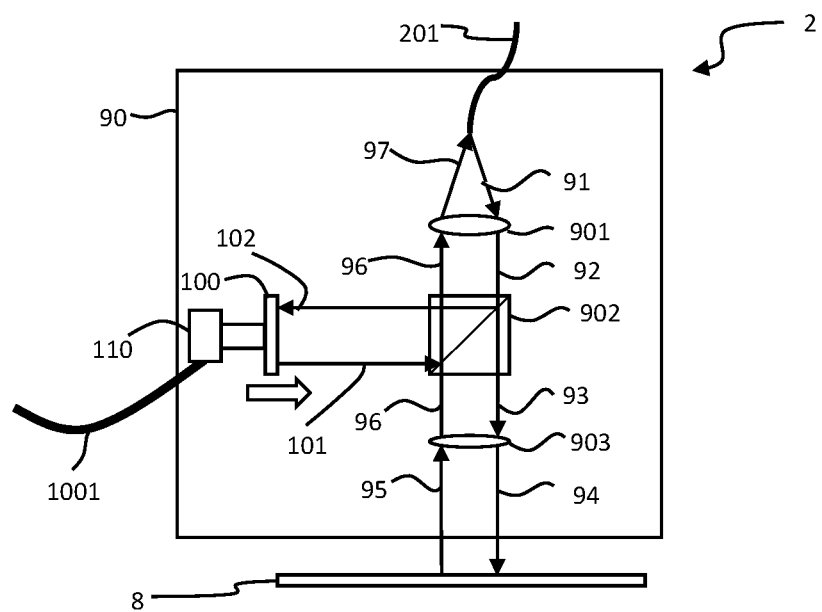

FIG. 7 represents the probe with adjustable length of the reference arm $L_{reference}$.

Figure 8:
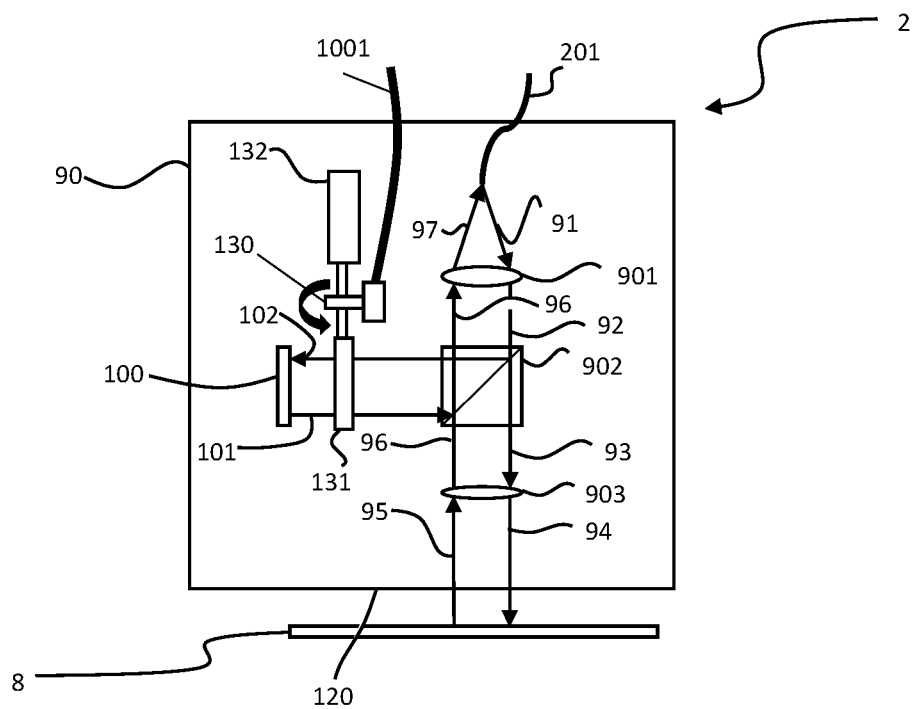

FIG. 8 represents the probe with adjustable optical length of the reference arm $L_{reference}$ using color filter wheel equipped with refractive slabs of material for introducing additional delay.

Figure 9:
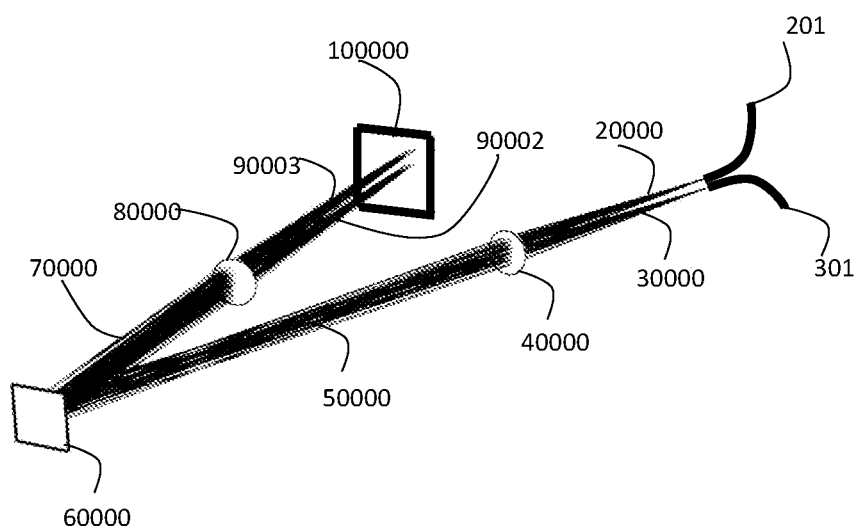

FIG. 9 represents spectrometer for simultaneous measurement of the spectra of radiation emanating from fibers 201, and 301.

Figure 10:
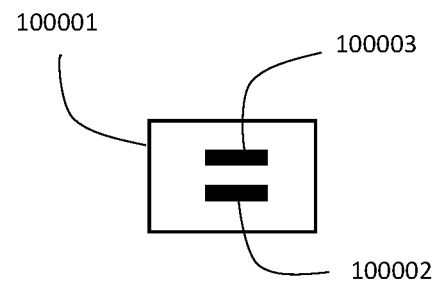

FIG. 10 represents the two-dimensional detector 100001 and recorded spectra.

Figure 11:
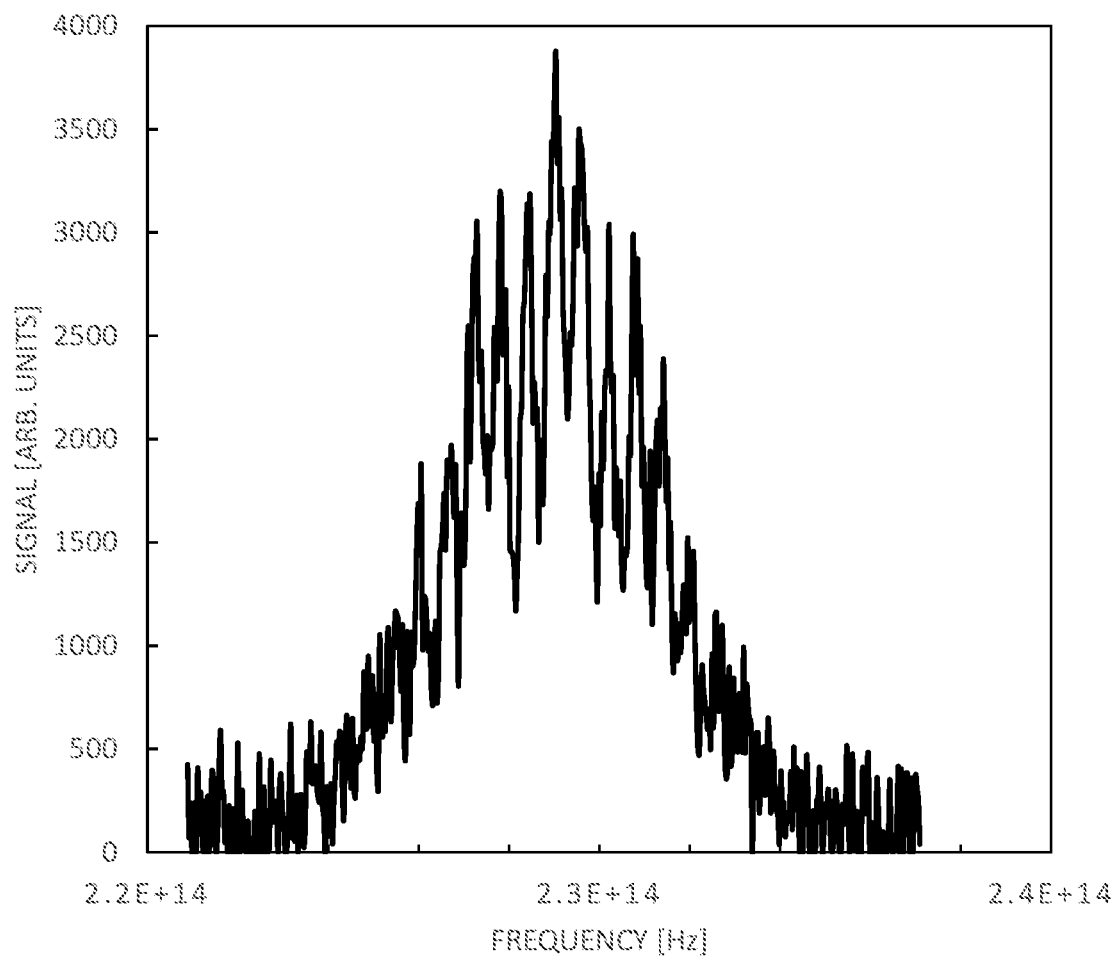

FIG. 11 represents a simulated signal detected by the system shown in FIG. 4.

Figure 12:
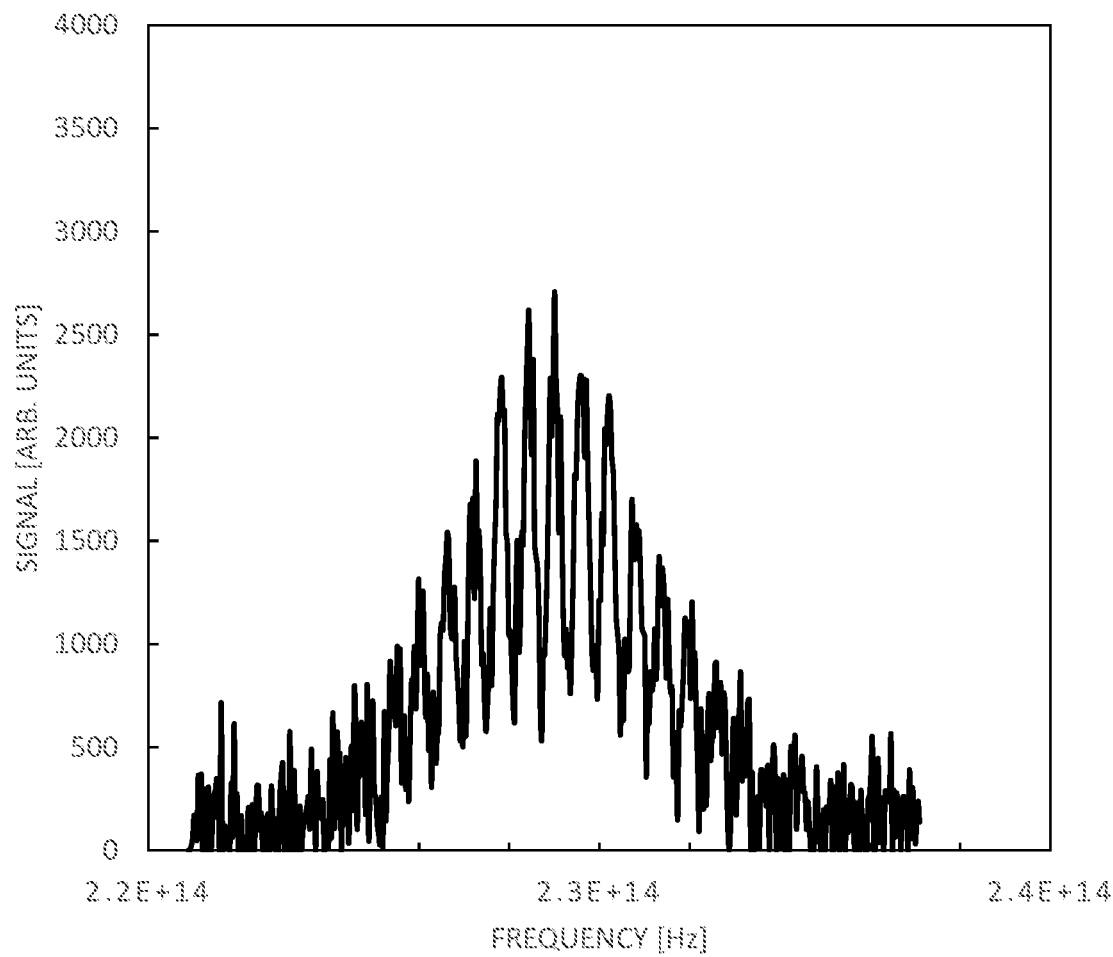

FIG. 12 represents the spectrum of the signal when sample 8 is illuminated only by probe 2.

Figure 13:
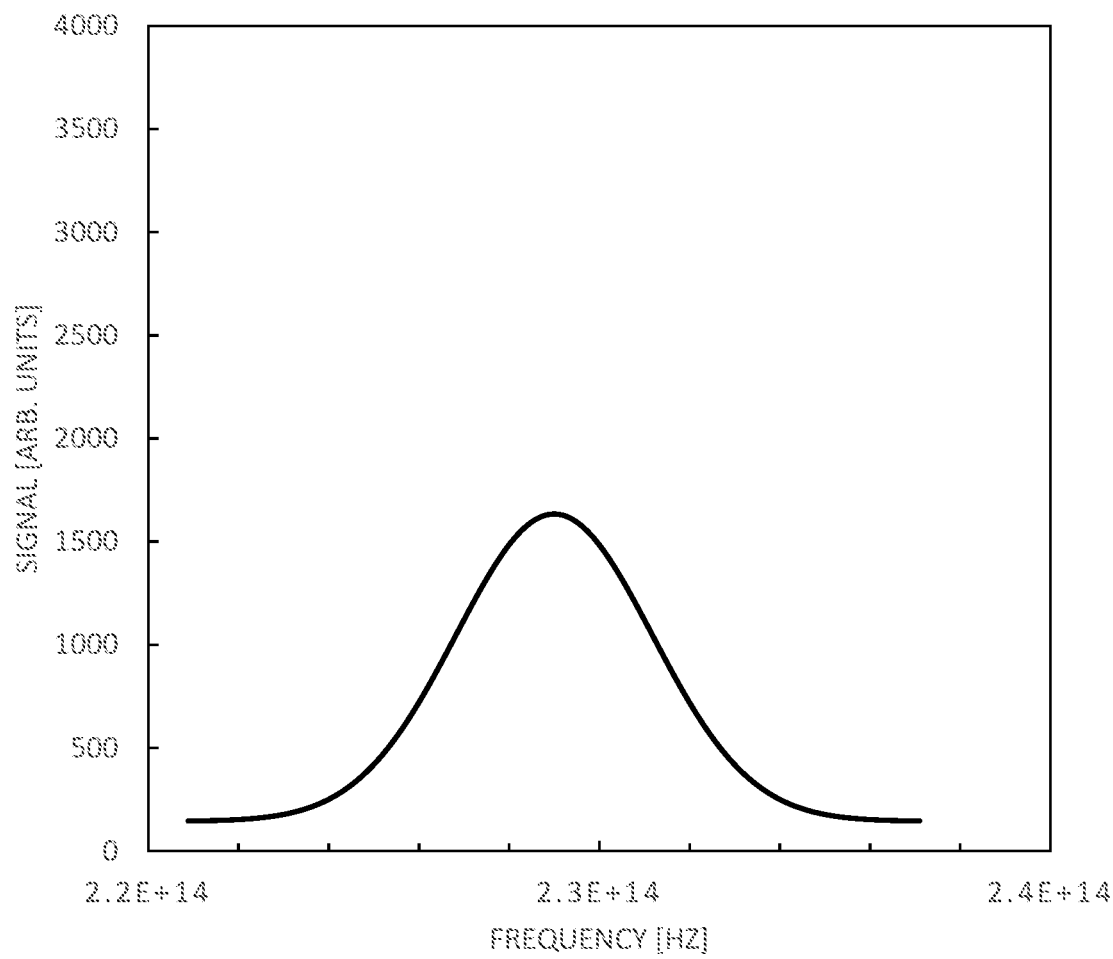

FIG. 13 represents the signal presented in FIG. 12 fitted with a gaussian function.

Figure 14:
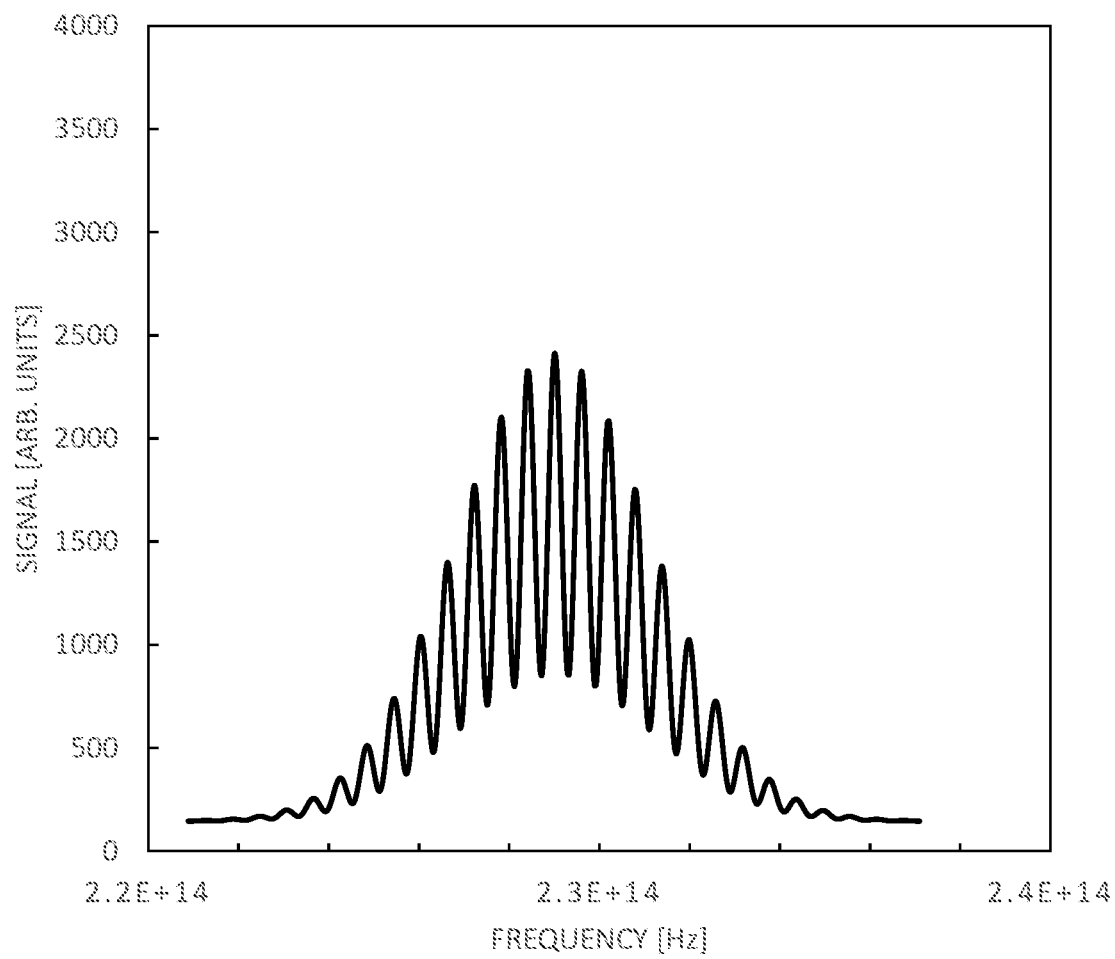

FIG. 14 represents the signal shown in FIG. 12 fitted with function with interference fringes.

Figure 15:
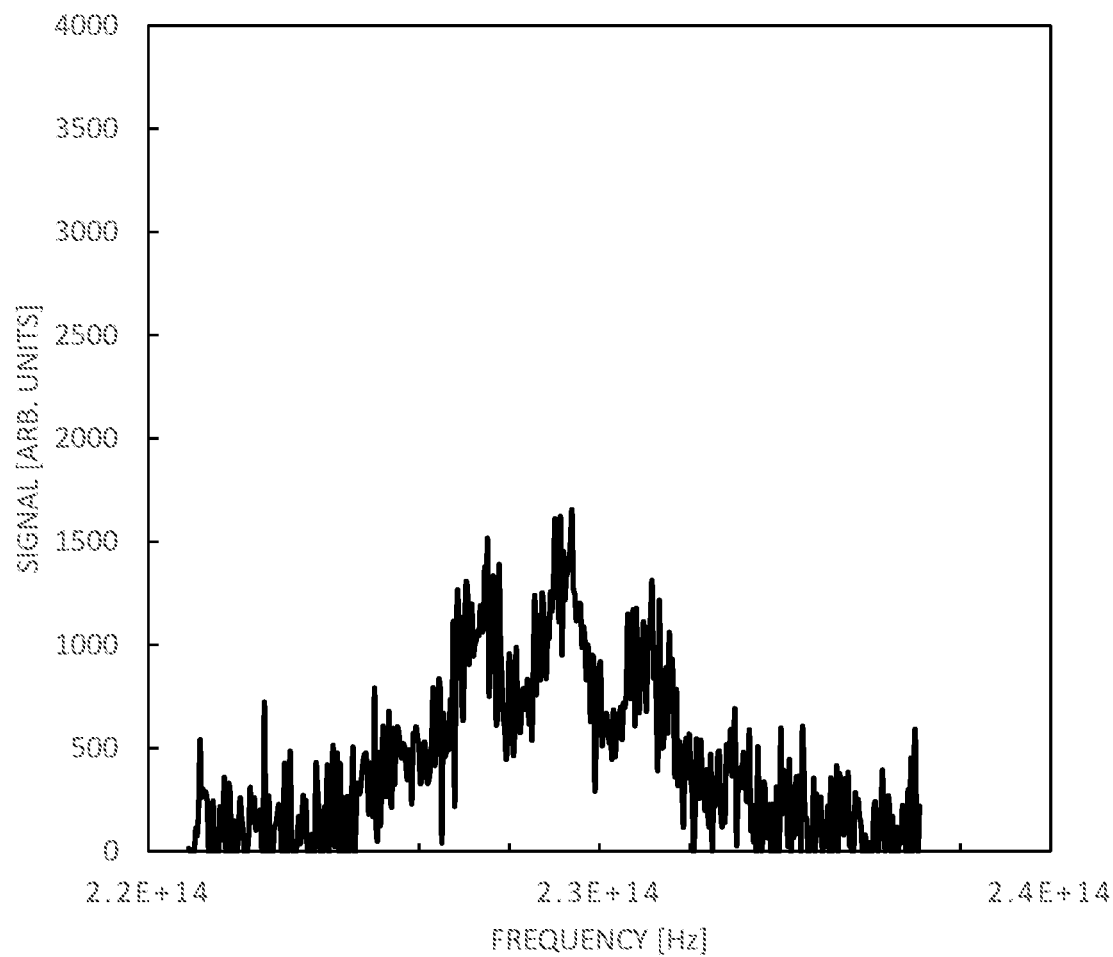

FIG. 15 represents the spectrum of signal when sample 8 is only illuminated by probe 3.

Figure 16:
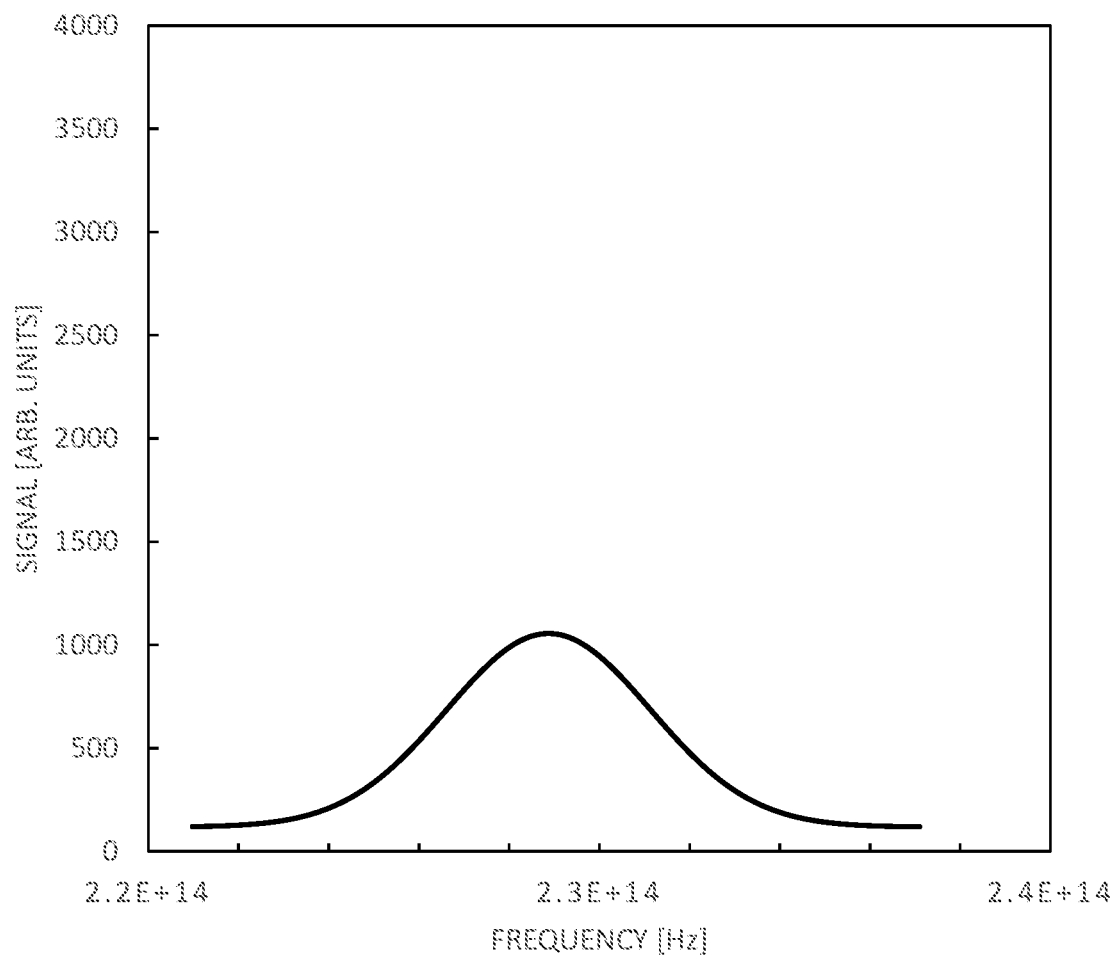

FIG. 16 represents the signal presented in FIG. 15 fitted with a gaussian function.

Figure 17:
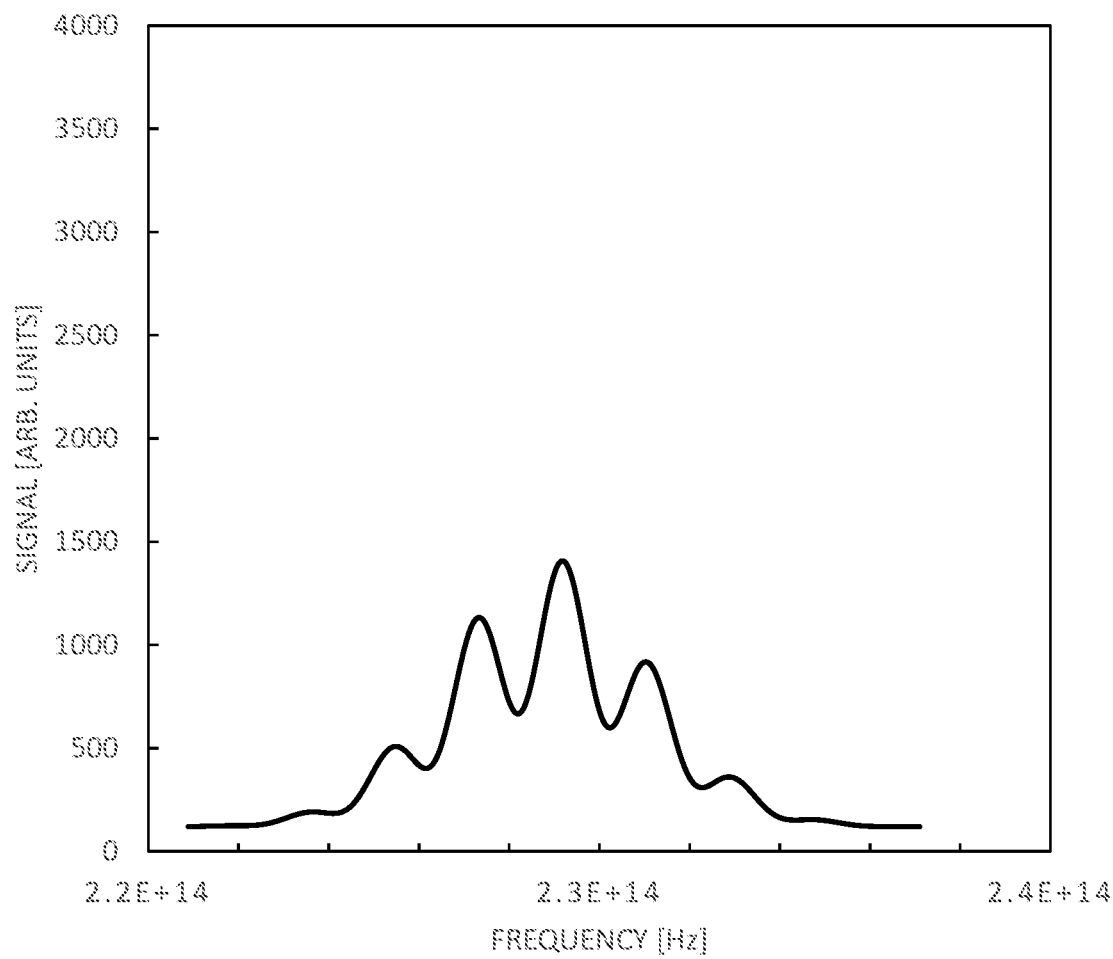

FIG. 17 represents the signal shown in FIG. 15 fitted with the function with fringes.

Figure 18:
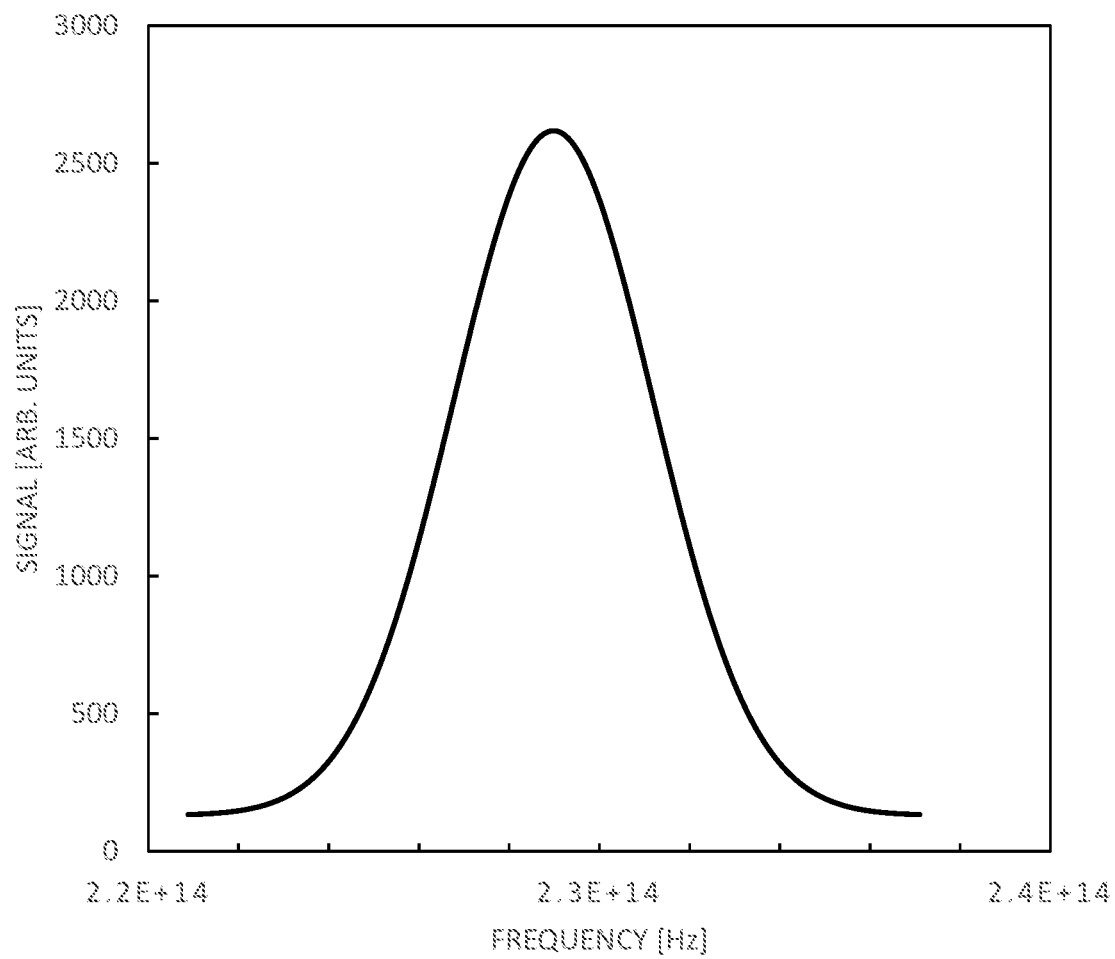

FIG. 18 represents the signal presented in FIG. 11 fitted with a gaussian function.

Figure 19:
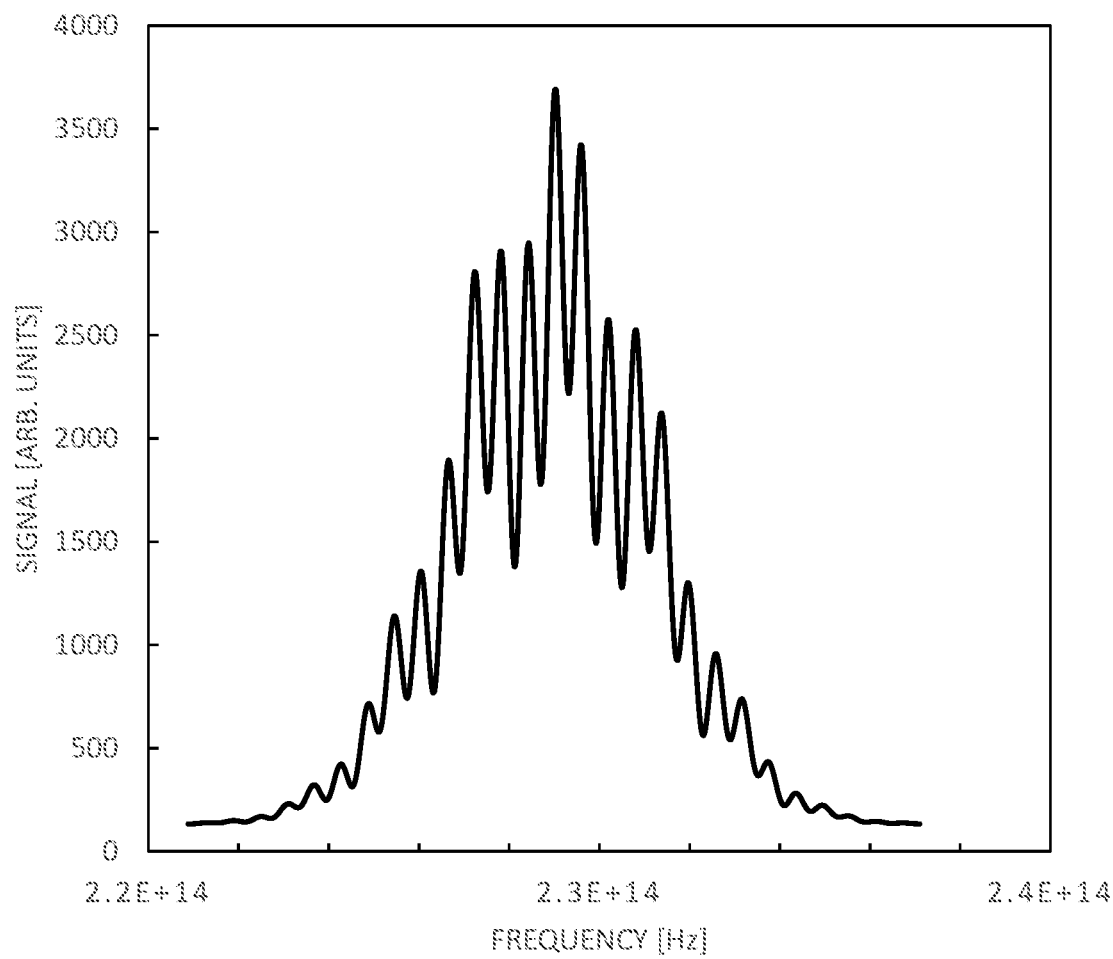

FIG. 19 represents the signal presented in FIG. 15 fitted with the final fitting function.

Figure 20:
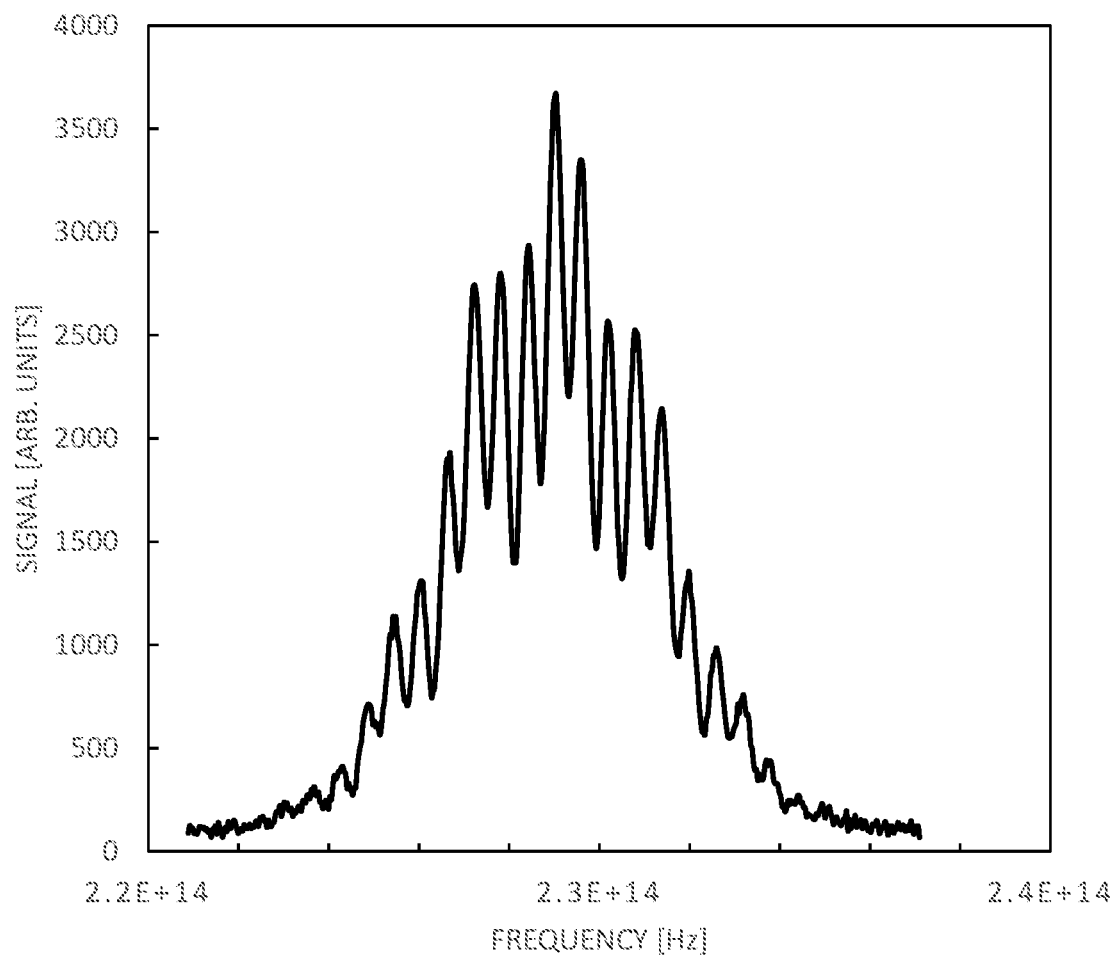

FIG. 20 shows a simulated signal like that shown in FIG. 11 where the noise is small.

Figure 21:
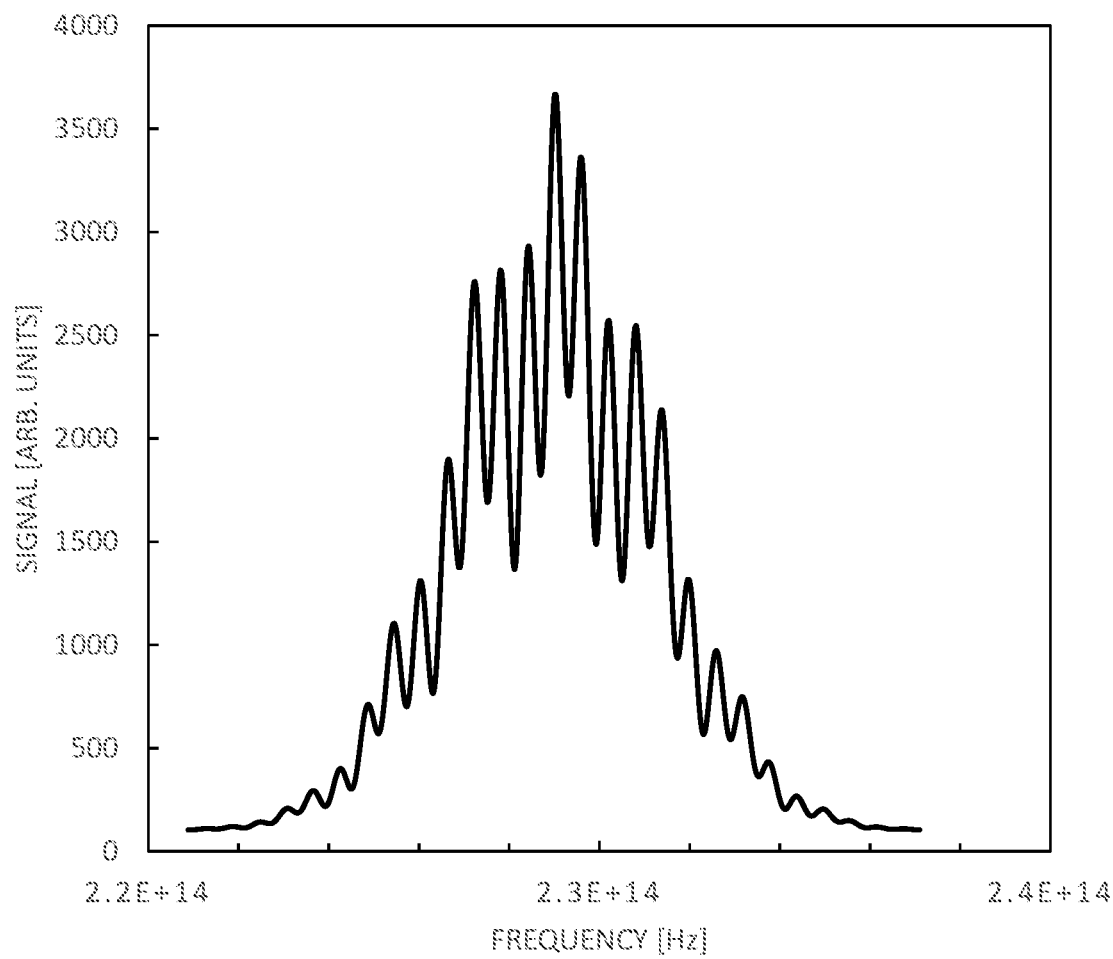

FIG. 21 shows a fitted function to the data shown in FIG. 20.

Figure 22:
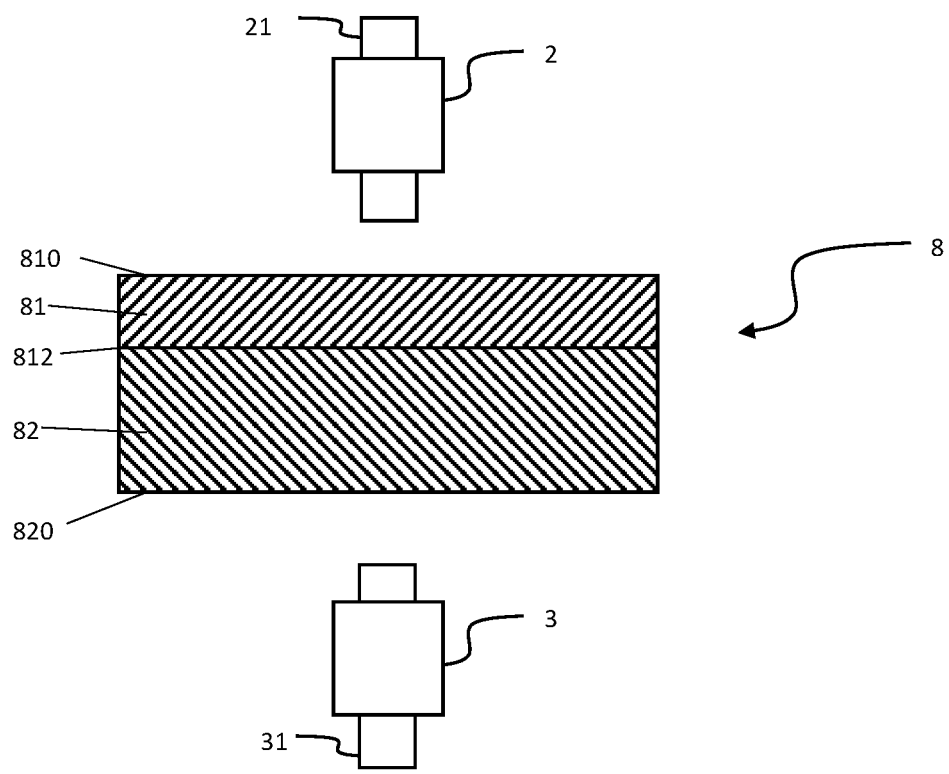

FIG. 22 shows a multilayer sample 8 comprising two layers layer 81 and layer 82 . . . 23

Figure 23:
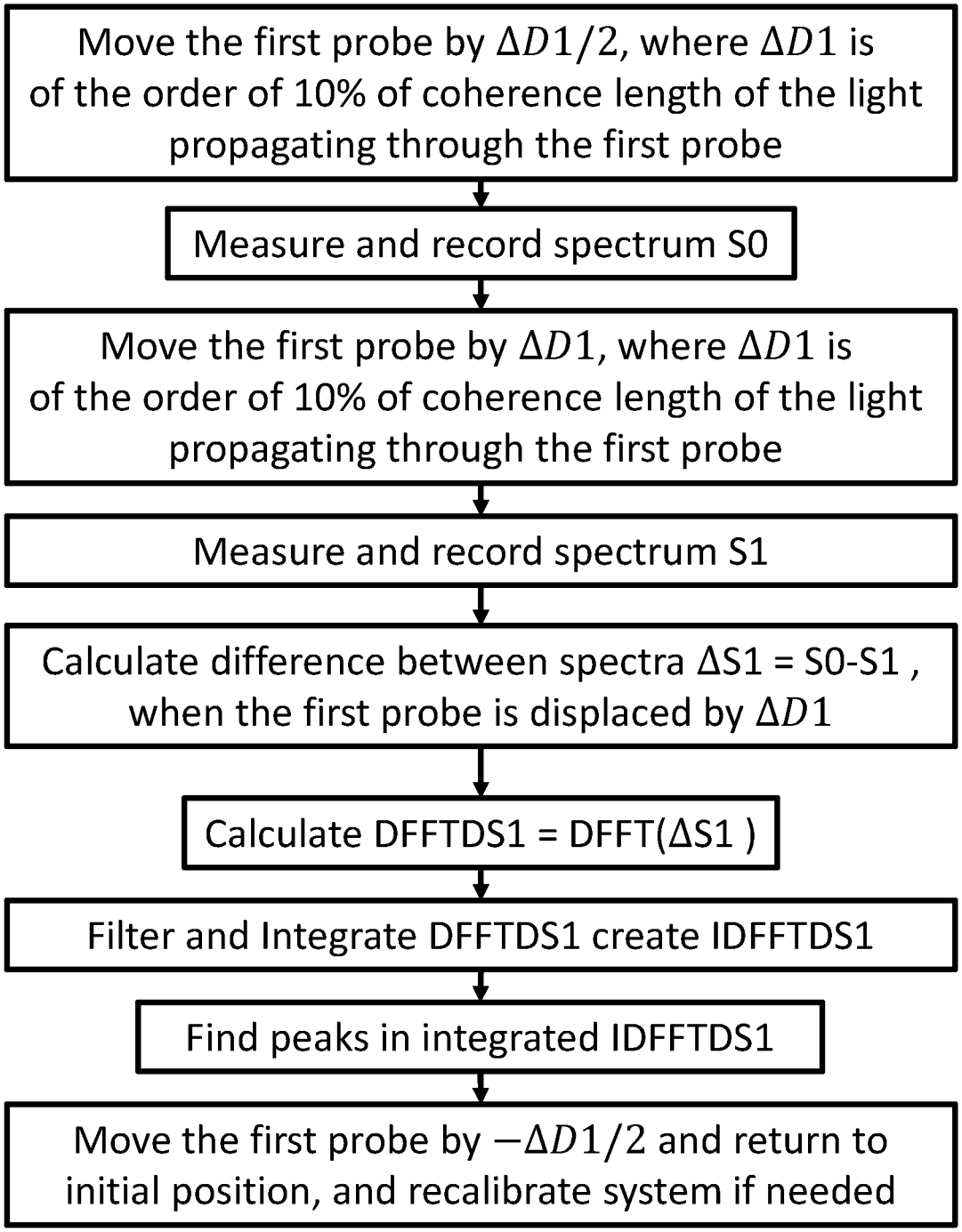

FIG. 23 describes procedure for finding differential spectrum using the first probe.

Figure 24:
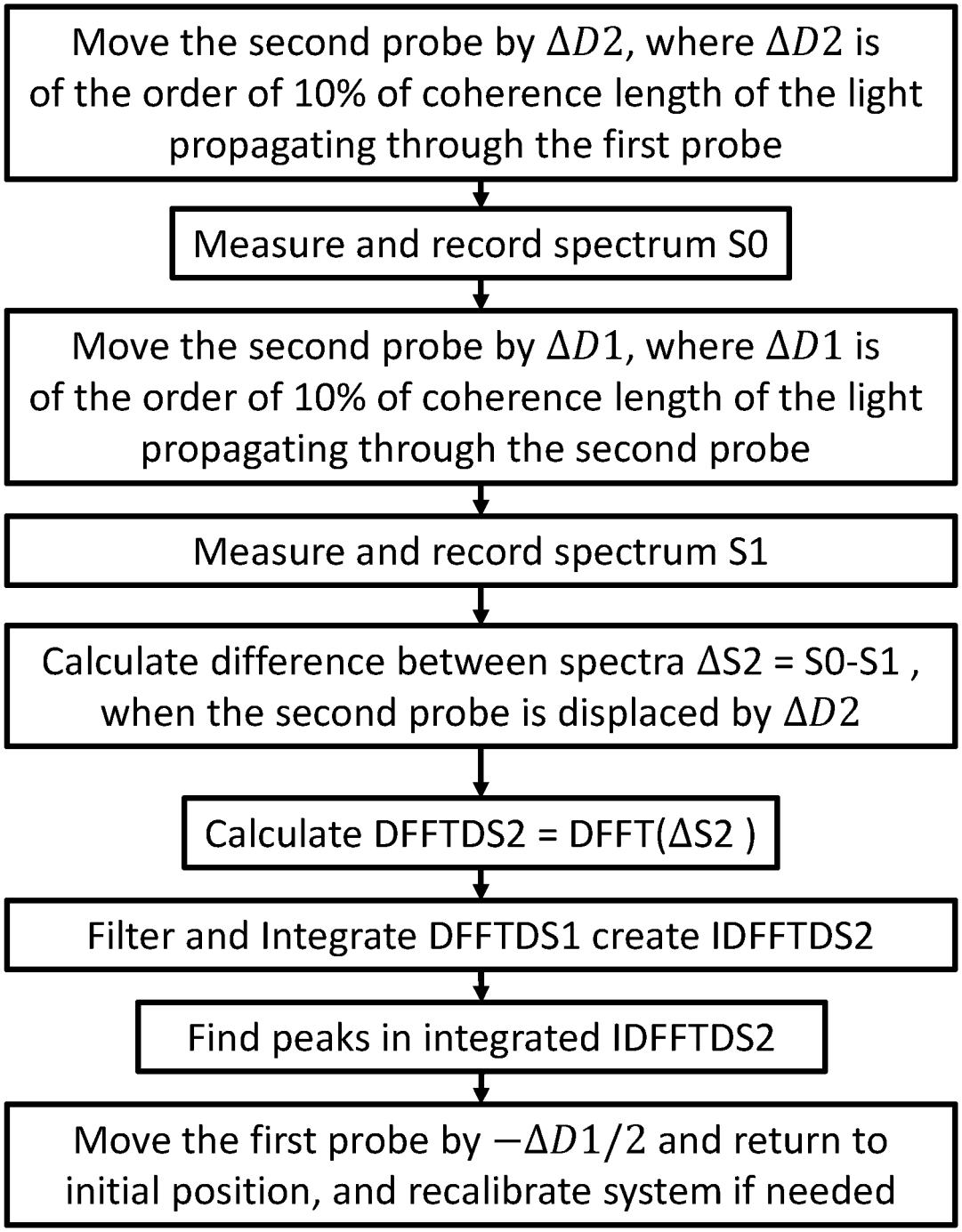

FIG. 24 describes procedure for finding differential spectrum using the second probe.

Figure 25:
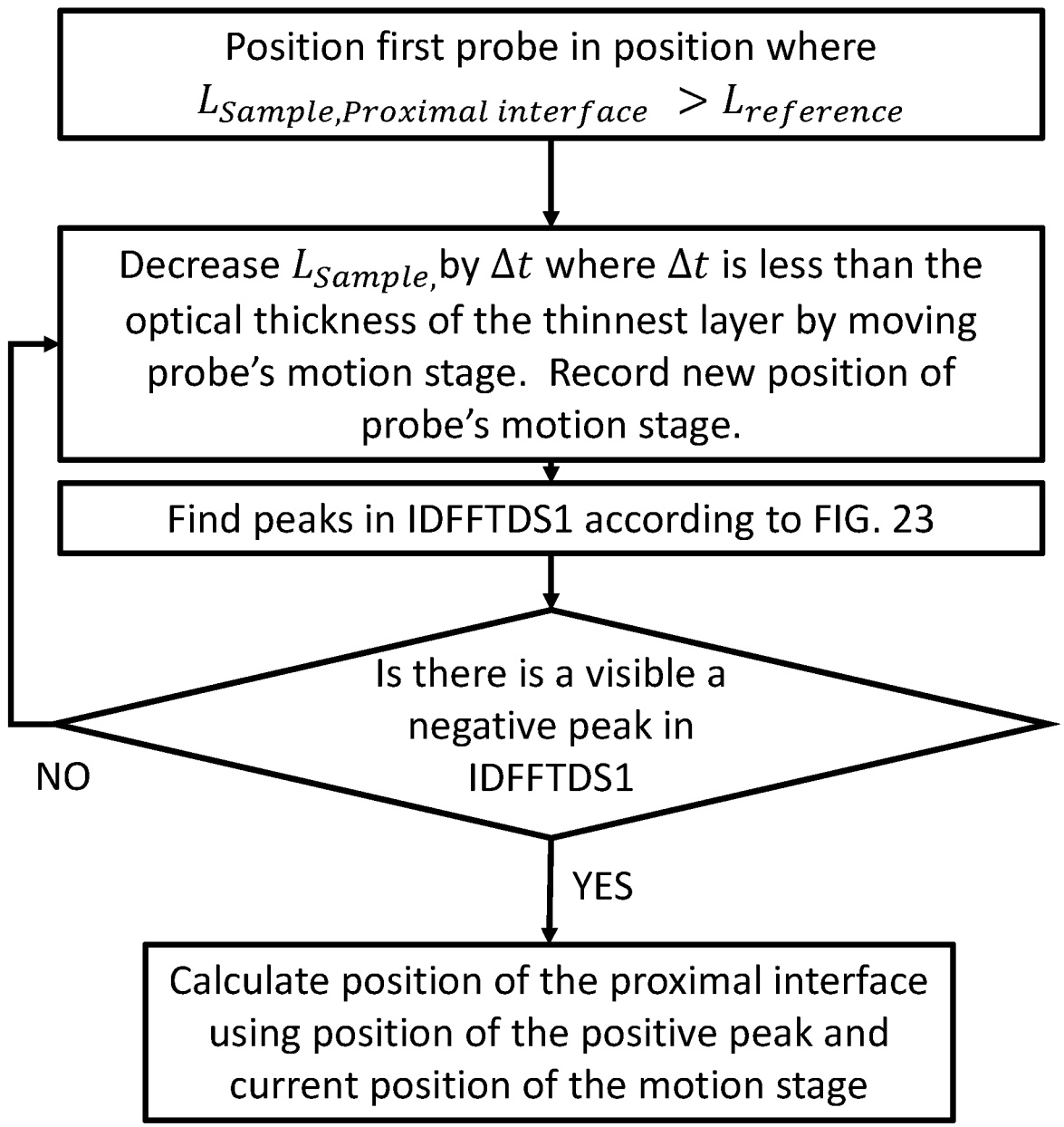

FIG. 25 describes procedure for finding procedure for finding the interface proximal to the first probe.

Figure 26:
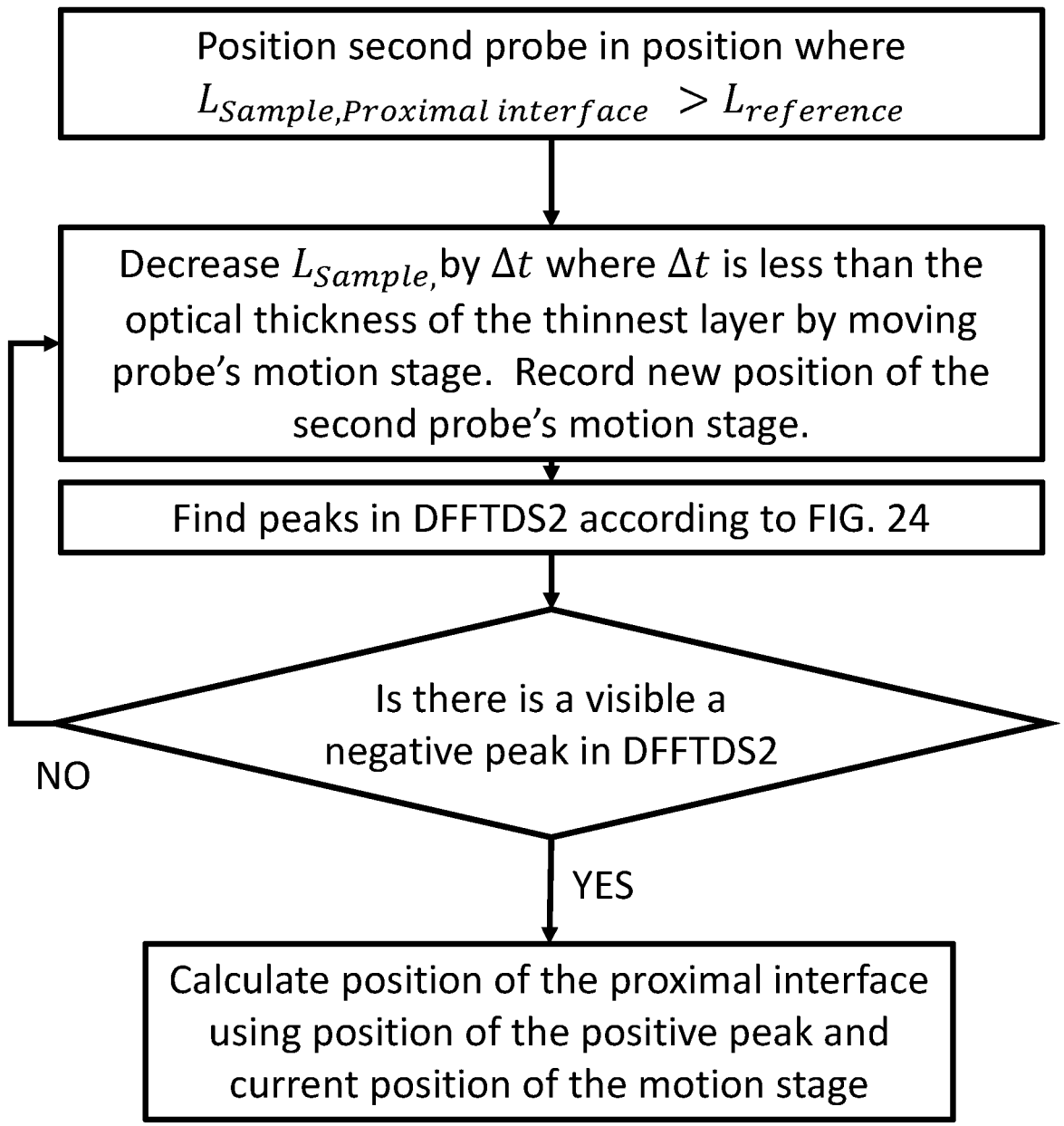

FIG. 26 describes procedure for finding procedure for finding the interface proximal to the second probe.

Figure 27:
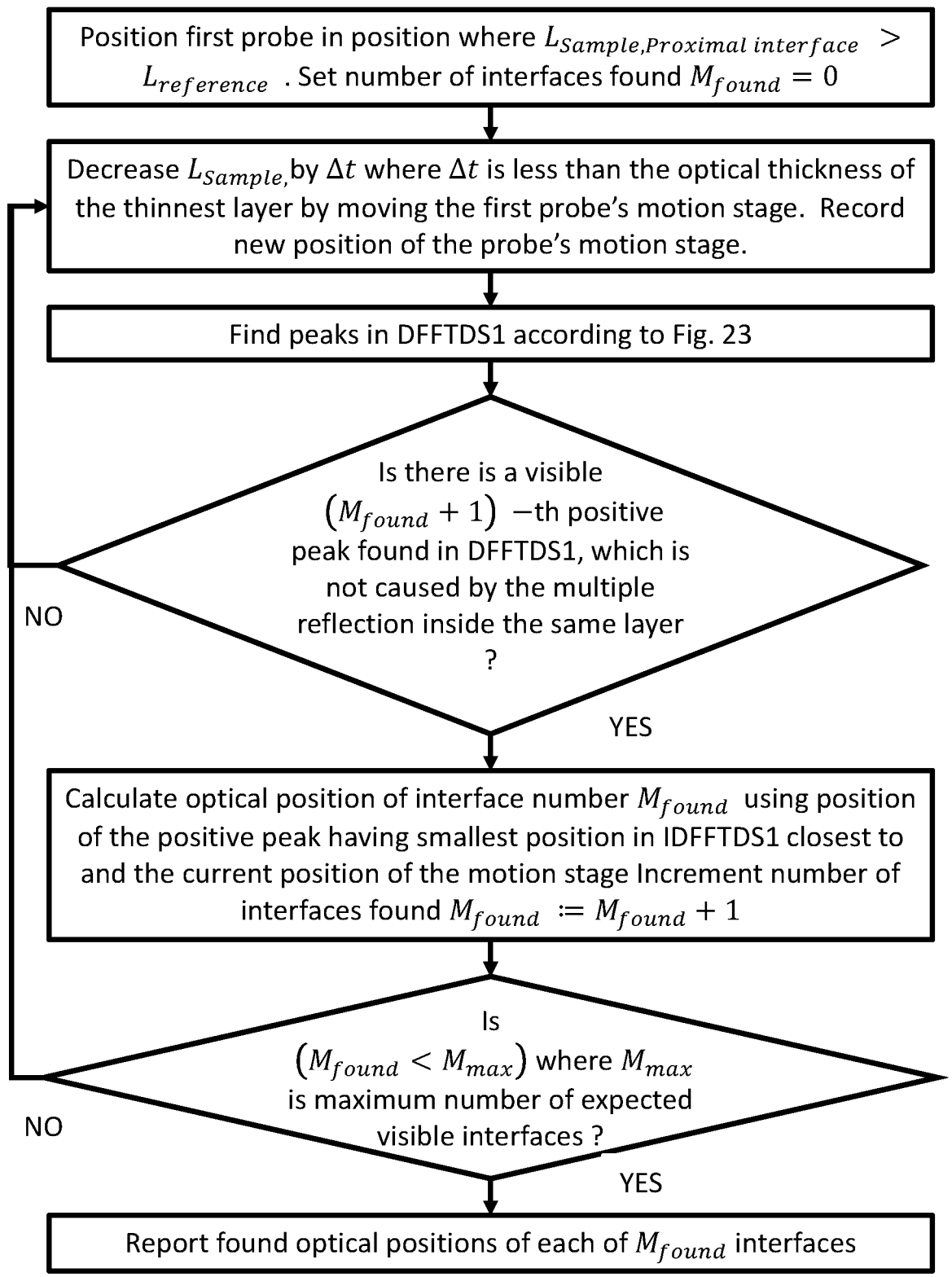

FIG. 27 describes procedure for finding multiple interfaces using the first probe.

Figure 28:
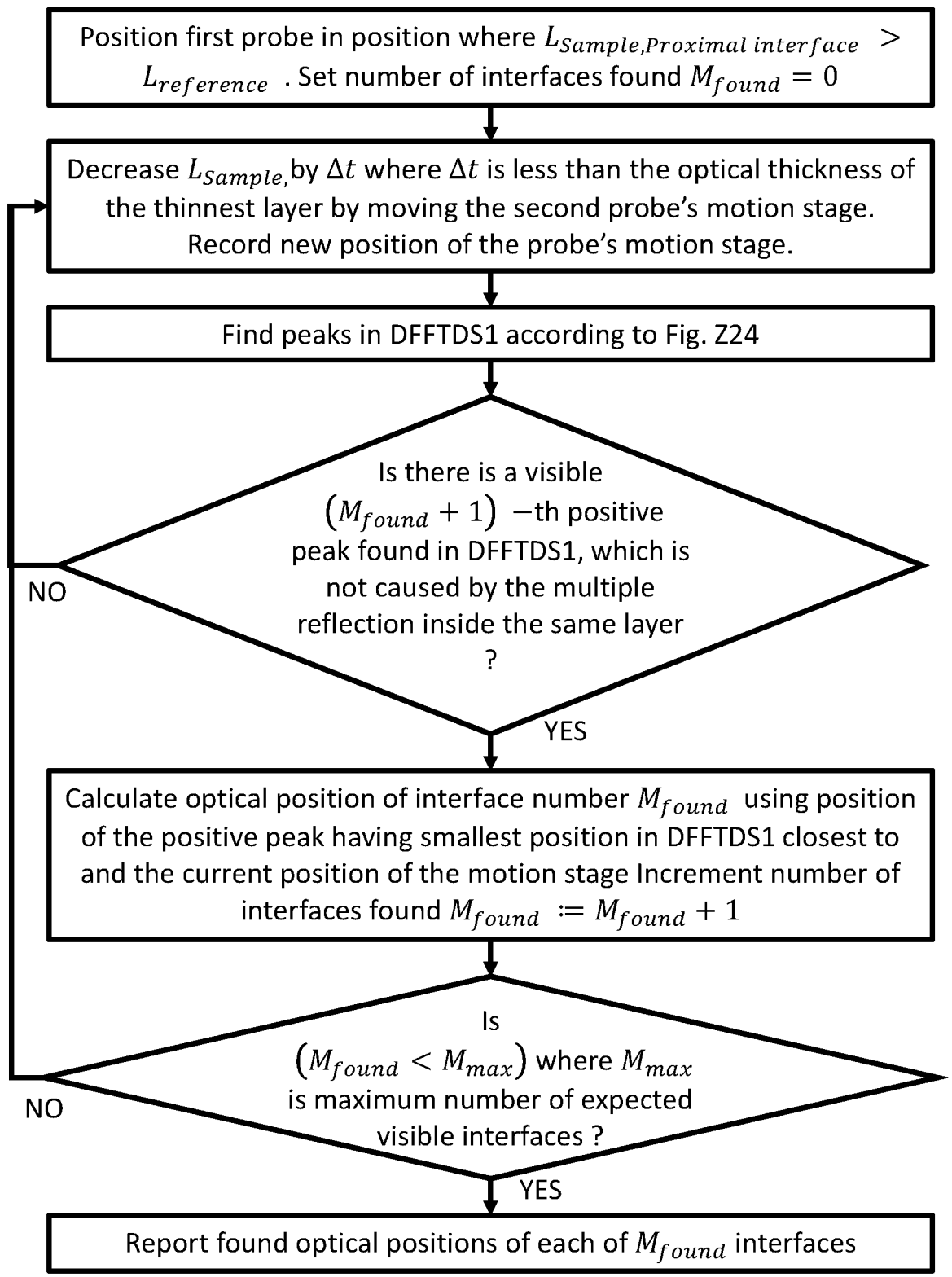

FIG. 28 describes procedure for finding multiple interfaces using the second probe.

Figure 29:
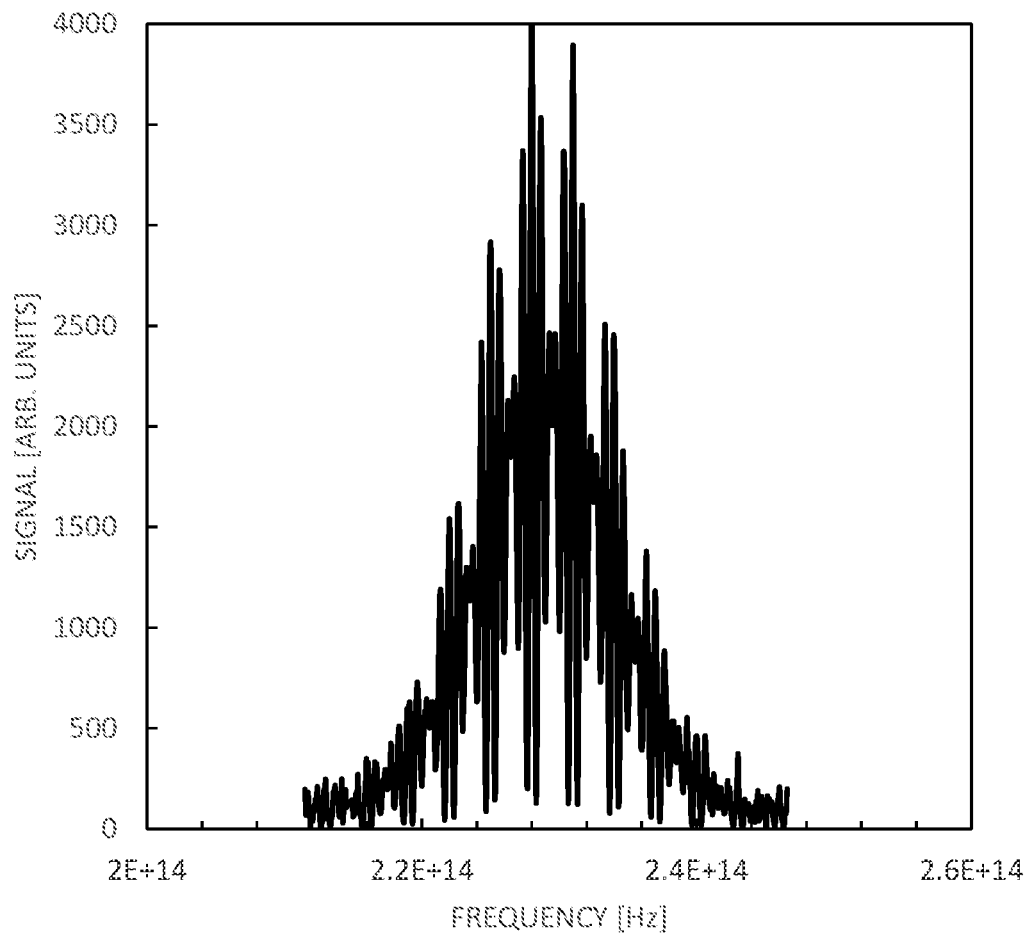

FIG. 29 represents signal recorded by 1D detector being incoherent sum of the reflection signals from the first and the second probe, when the sample is a slab of gold coated material, and the first probe is positioned at the distance 0.250 mm from the surface proximal to it. The second probe is positioned at the distance 0.200 mm from the surface proximal to the second probe.

Figure 30:
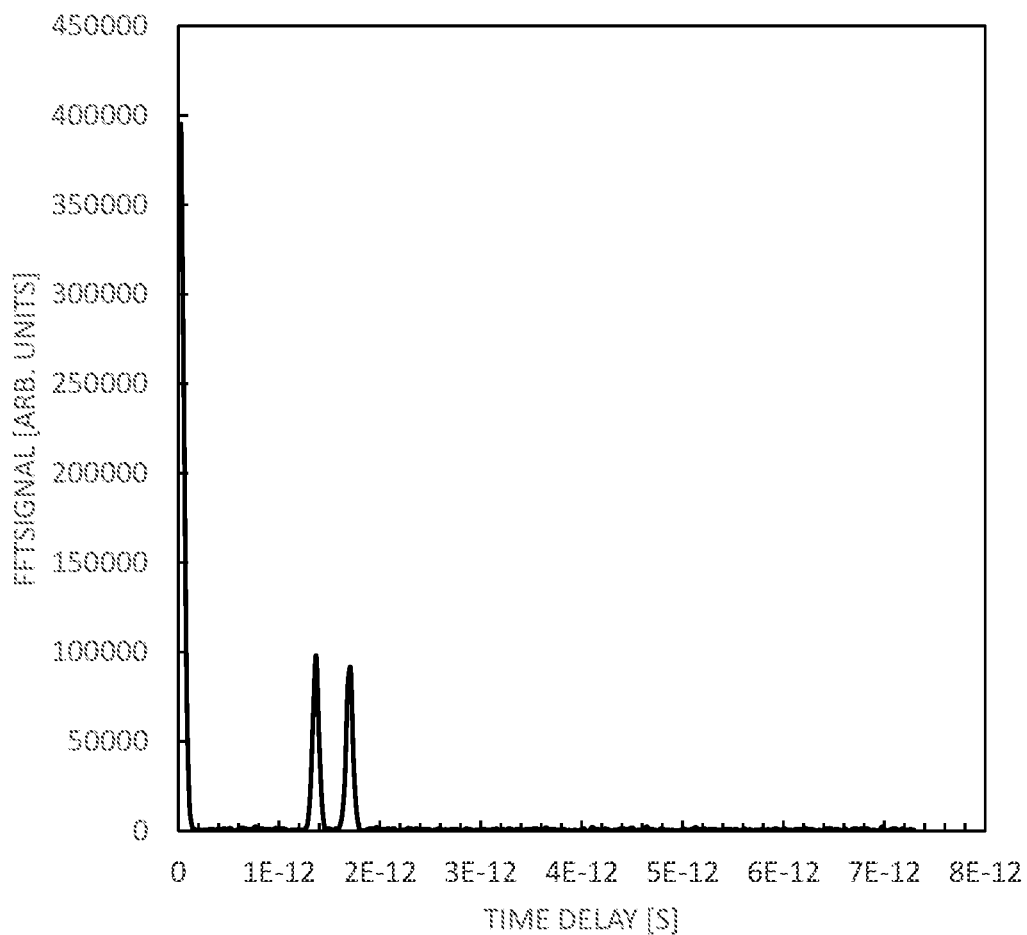

FIG. 30 represents a magnitude of the discrete Fourier transform of the signal shown in FIG. 29.

Figure 31:
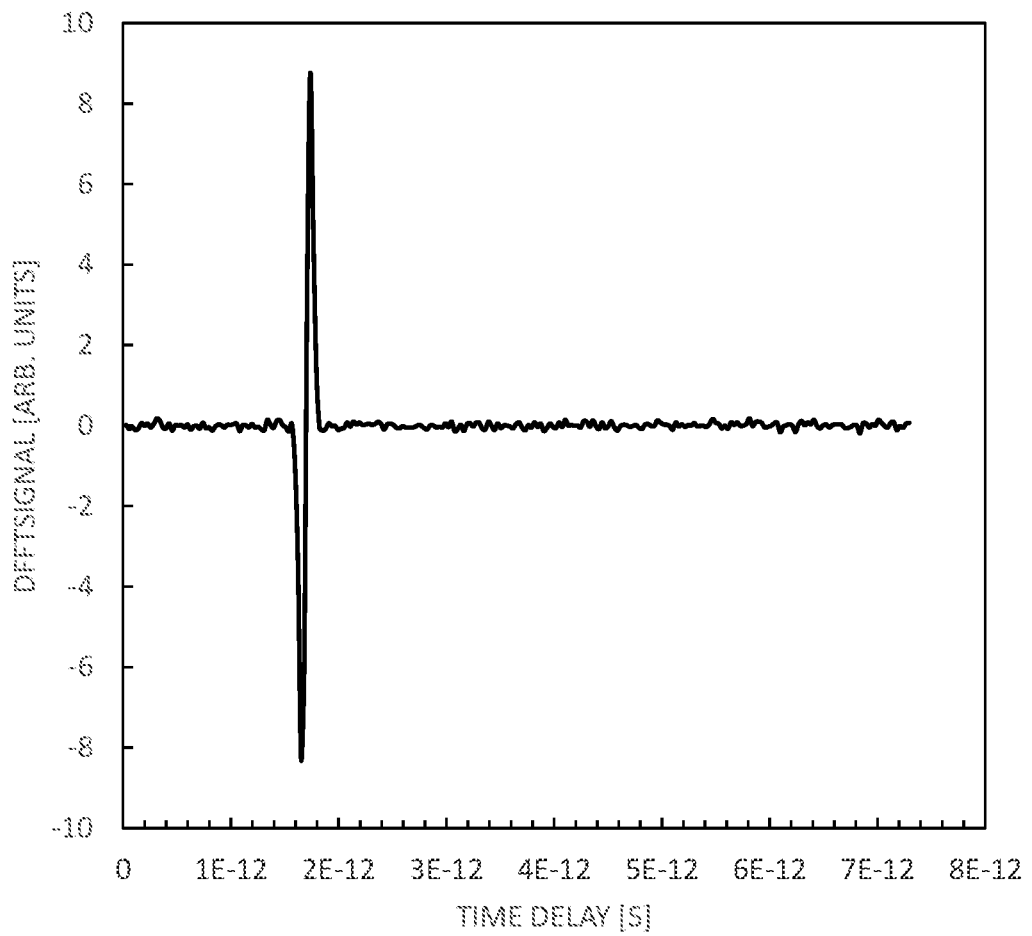

FIG. 31 represents differential spectrum DFFTDS1 calculated from the spectrum shown in FIG. 30 using parameter $\Delta D=0.010$ mm.

Figure 32:
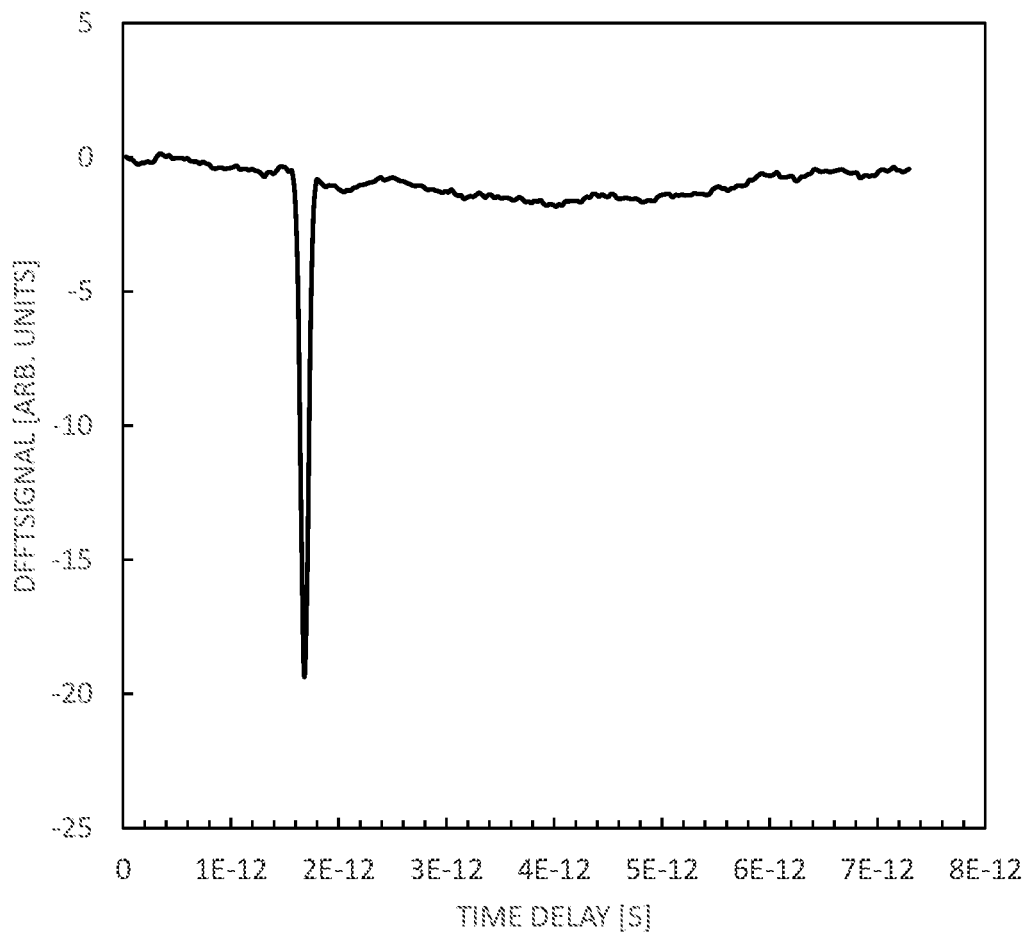

FIG. 32 represents filtered and integrated differential spectrum DFFTDS1 calculated from the spectrum shown in FIG. 31 using parameter $\Delta D=0.010$ mm using algorithm shown in FIG. 25.

Figure 33:
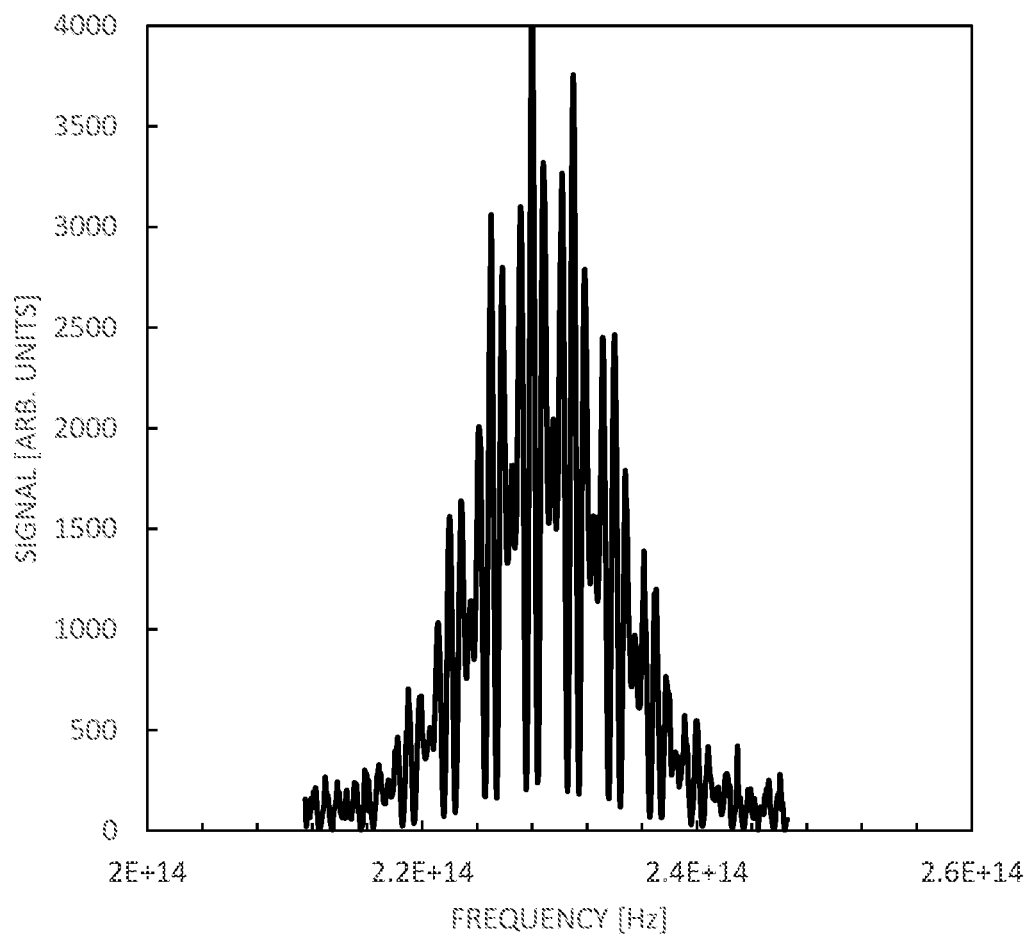

FIG. 33 represents signal recorded by 1D detector being incoherent sum of the reflection signals from the first and the second probe, when the sample is a slab of gold coated material, and the first probe is positioned at the distance 0.150 mm from the surface proximal to it. The second probe is positioned at the distance 0.200 mm from the surface proximal to the second probe.

Figure 34:
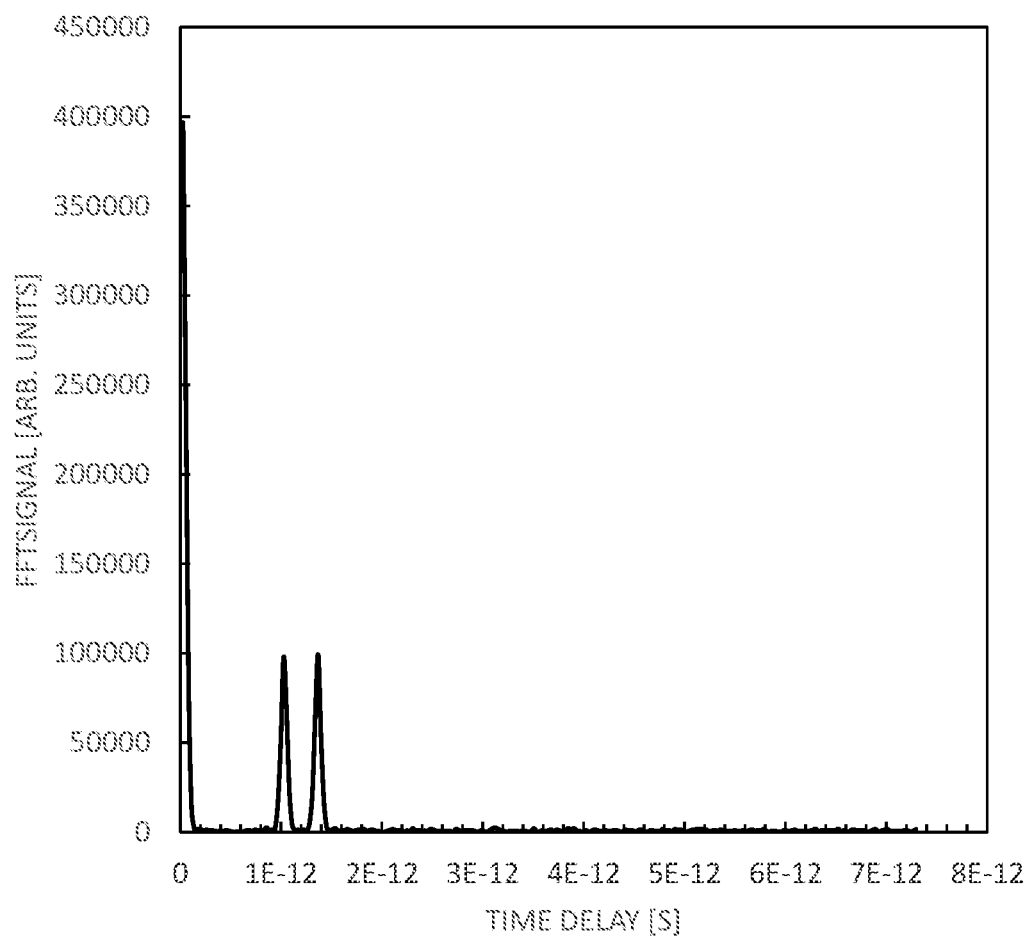

FIG. 34 represents a magnitude of the discrete Fourier transform of the signal shown in FIG. 33.

Figure 35:
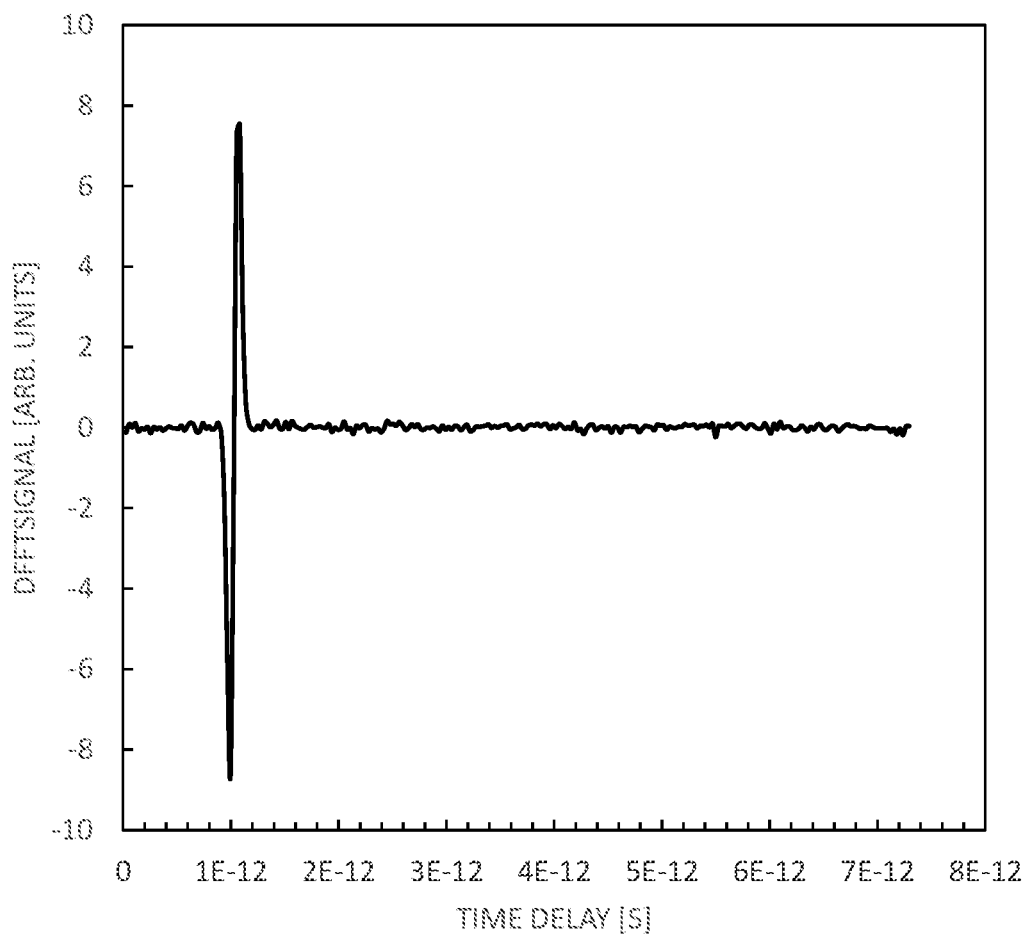

FIG. 35 represents differential spectrum DFFTDS1 calculated from the spectrum shown in FIG. 33 using parameter $\Delta t=0.010$ mm.

Figure 36:
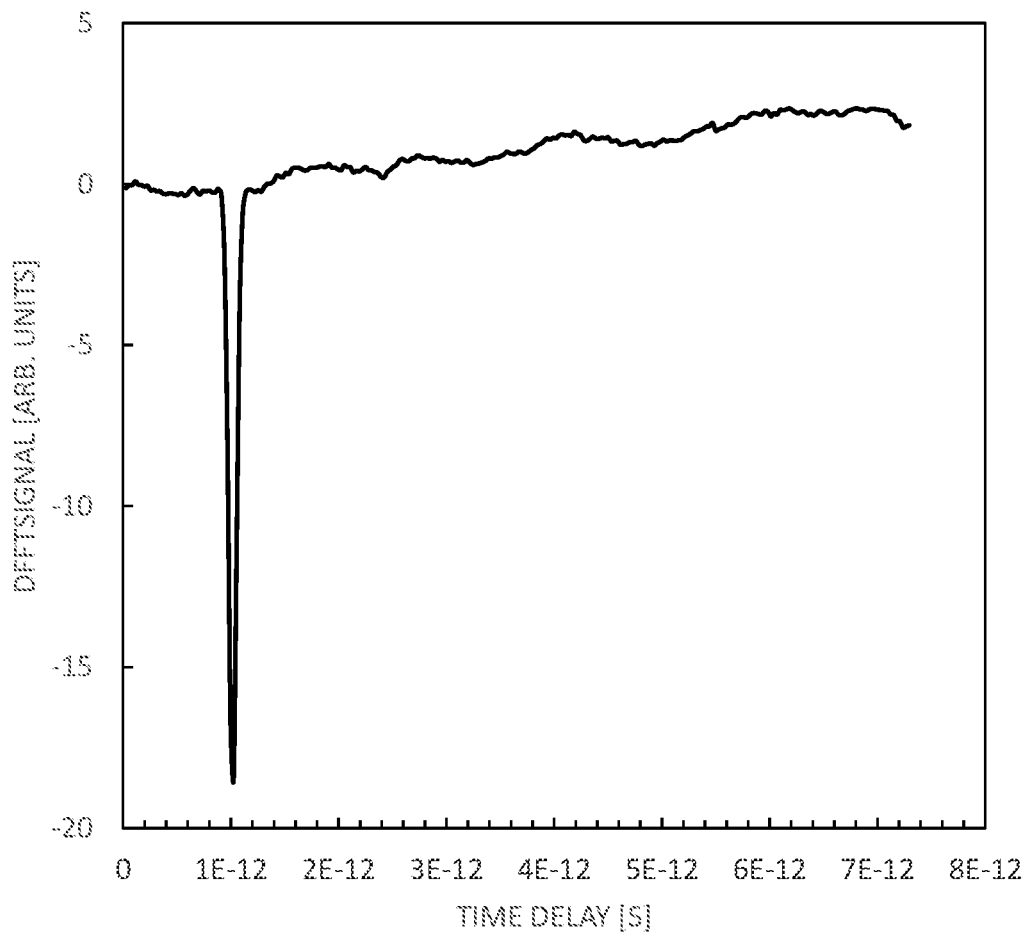

FIG. 36 represents filtered and integrated differential spectrum IDFFTDS1 calculated from the spectrum shown in FIG. 35 using parameter $\Delta t=0.010$ mm.

Figure 37:
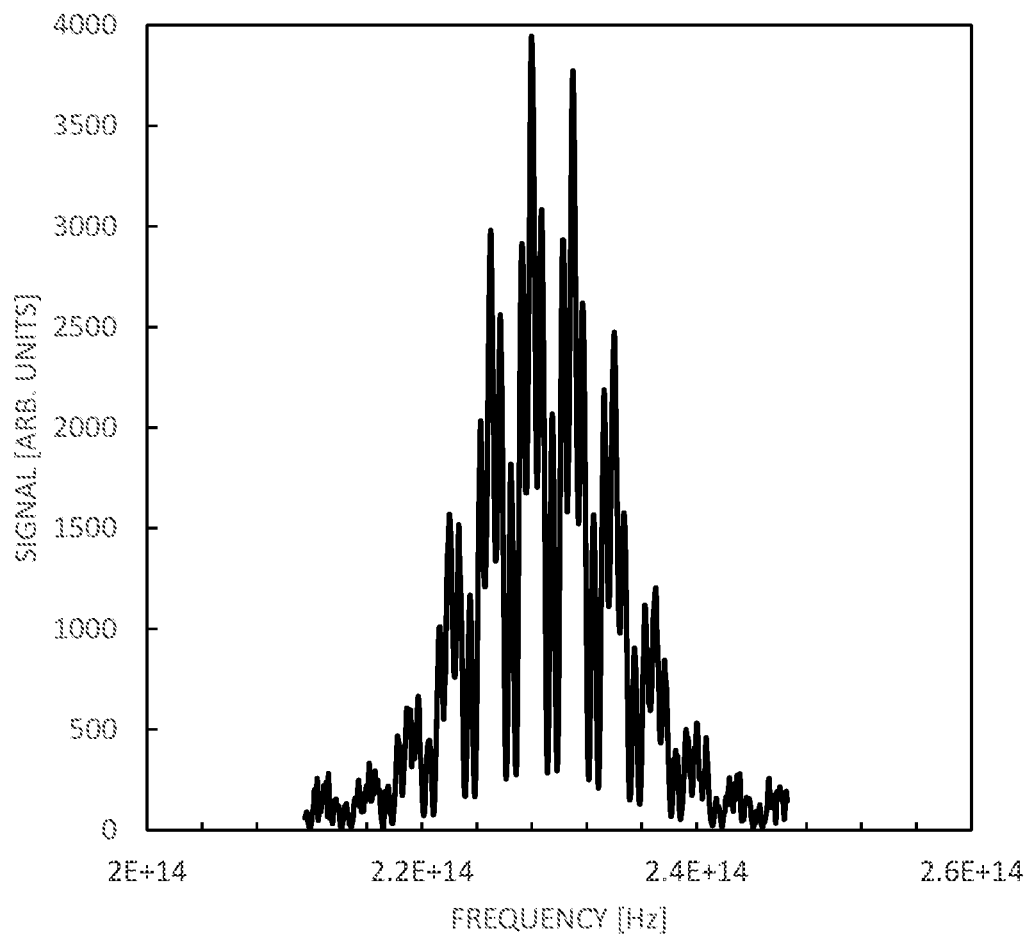

FIG. 37 represents signal recorded by 1D detector being incoherent sum of the reflection signals from the first and the second probe, when the sample is a slab of gold coated material, and the first probe is positioned at the distance 0.050 mm from the surface proximal to it. The second probe is positioned at the distance 0.200 mm from the surface proximal to the second probe.

Figure 38:
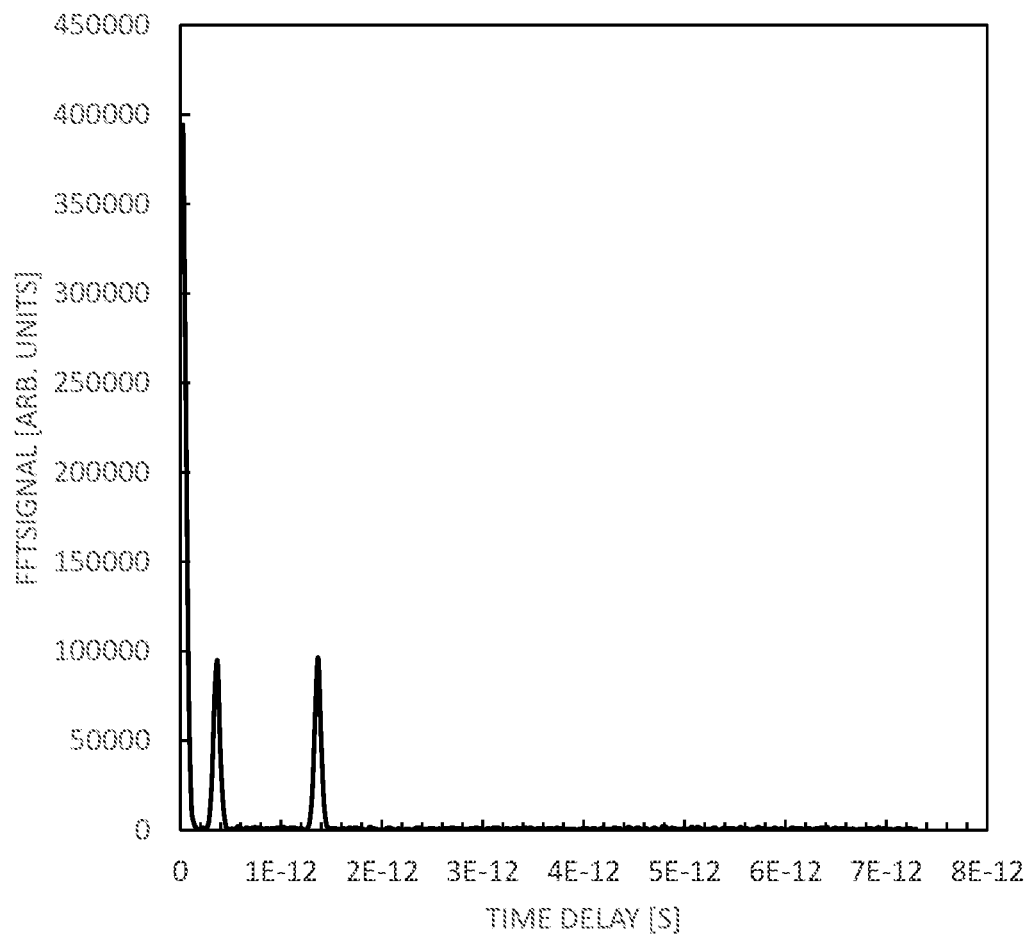

FIG. 38 represents a magnitude of the discrete Fourier transform of the signal shown in FIG. 37.

Figure 39:
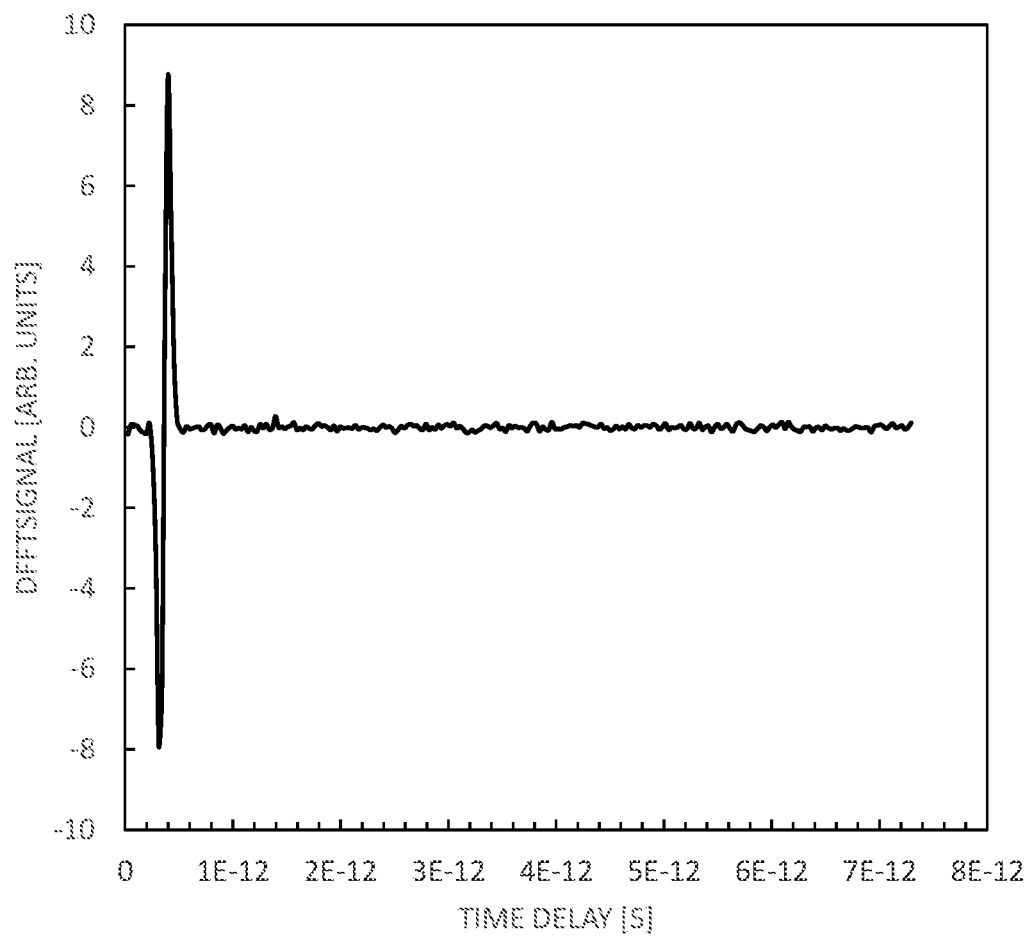

FIG. 39 represents differential spectrum IDFFTDS1 calculated from the spectrum shown in FIG. 38 using parameter $\Delta t=0.010$ mm.

Figure 40:
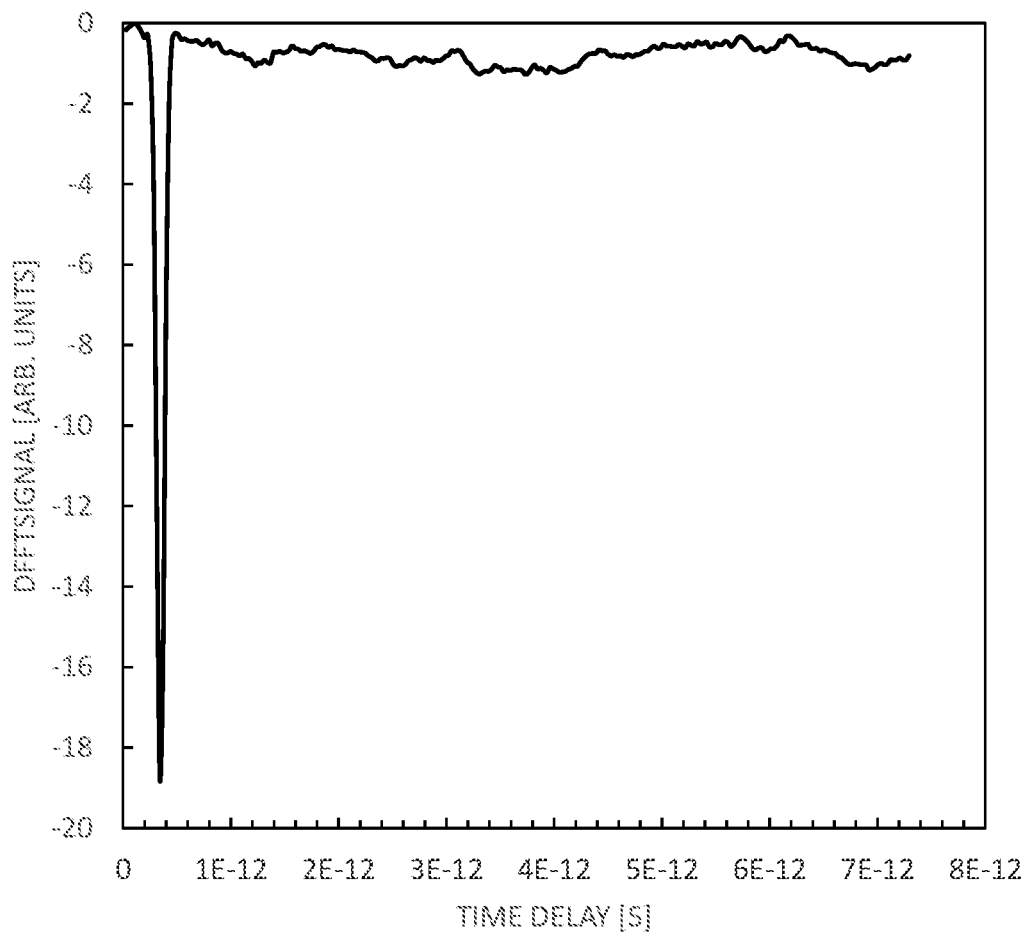

FIG. 40 represents filtered and integrated differential spectrum DFFTDS1 calculated from the spectrum shown in FIG. 39 using parameter $\Delta t=0.010$ mm.

Figure 41:
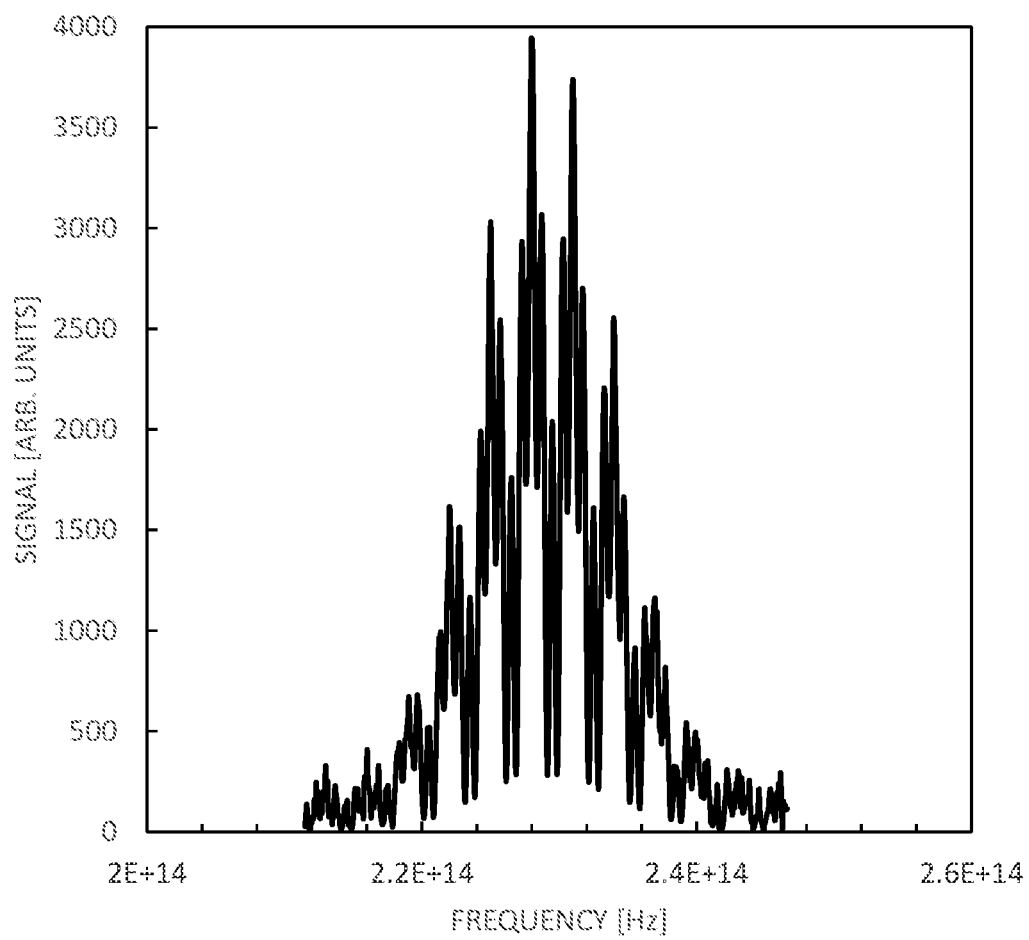

FIG. 41 represents signal recorded by 1D detector being incoherent sum of the reflection signals from the first and the second probe, when the sample is a slab of gold coated material, and the first probe is positioned at the distance −0.050 mm (negative 0.050 mm) from the surface proximal to it. The second probe is positioned at the distance 0.200 mm from the surface proximal to the second probe.

Figure 42:
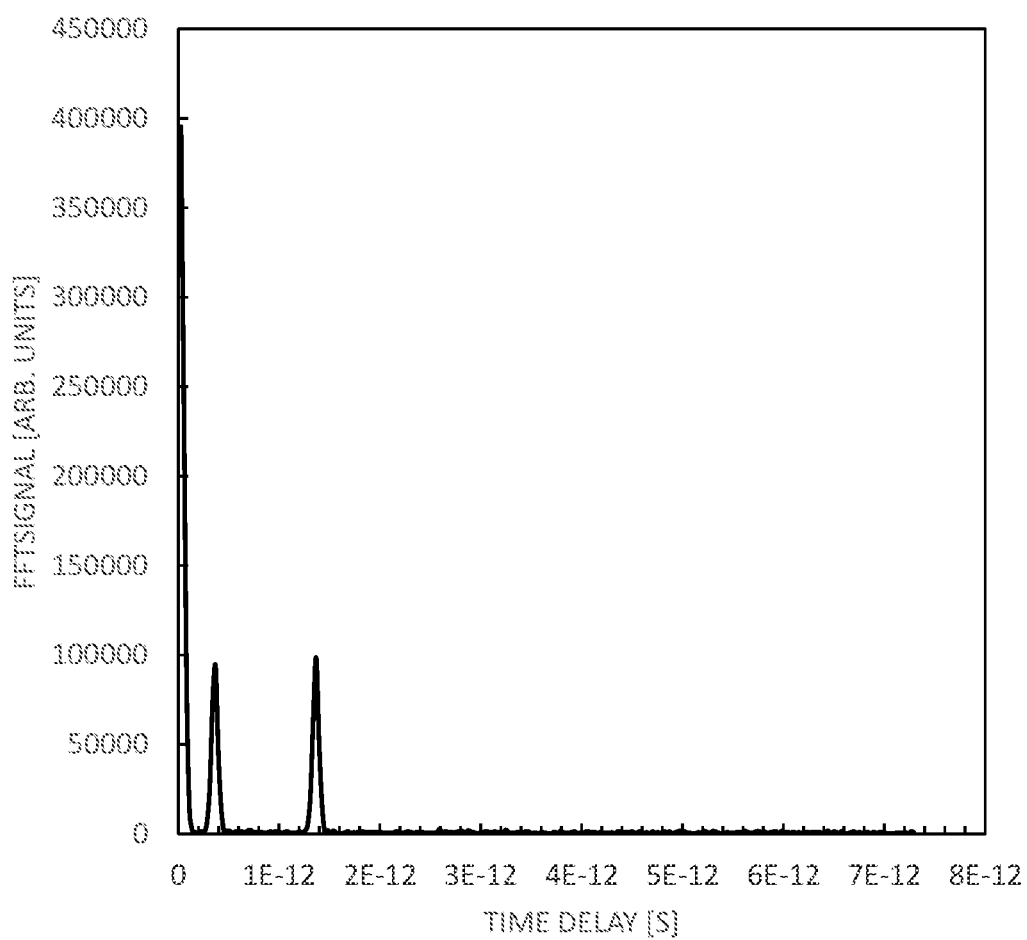

FIG. 42 represents a magnitude of the discrete Fourier transform of the signal shown in FIG. 29.

Figure 43:
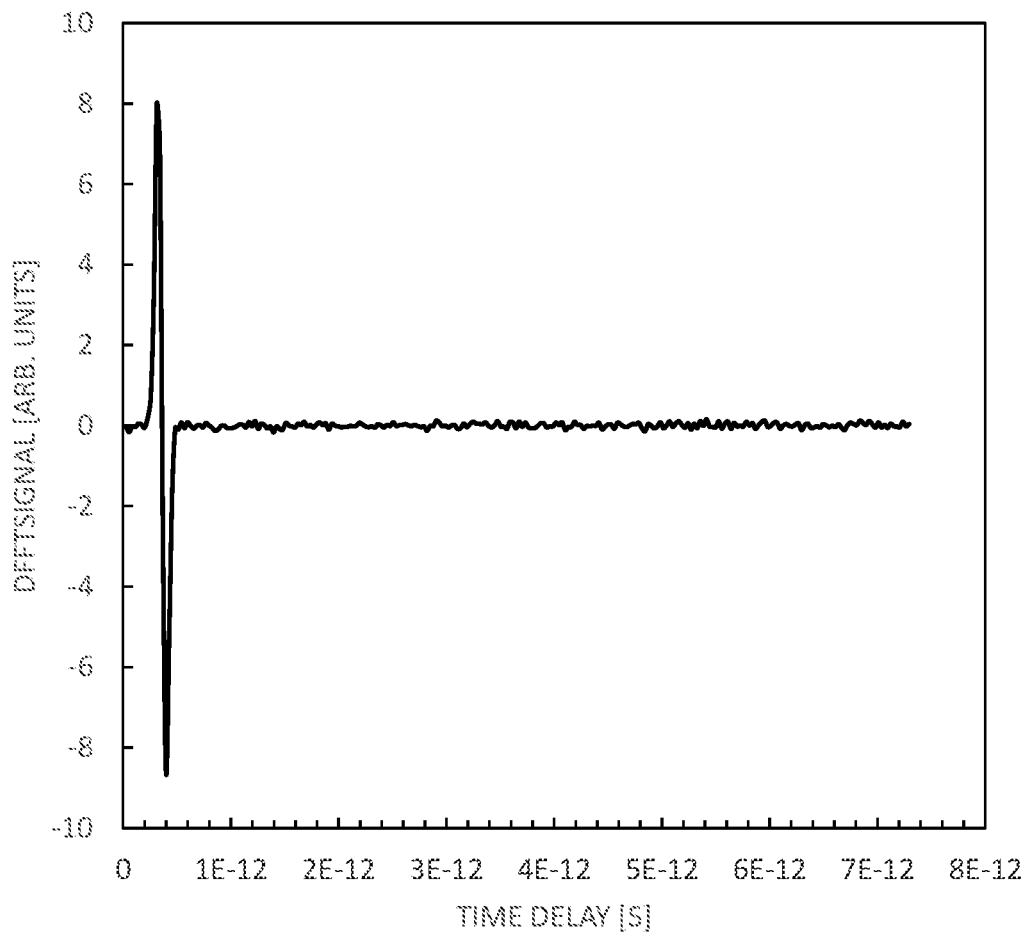

FIG. 43 represents differential spectrum DFFTDS1 calculated from the spectrum shown in FIG. 30 using parameter $\Delta t=0.010$ mm.

Figure 44:
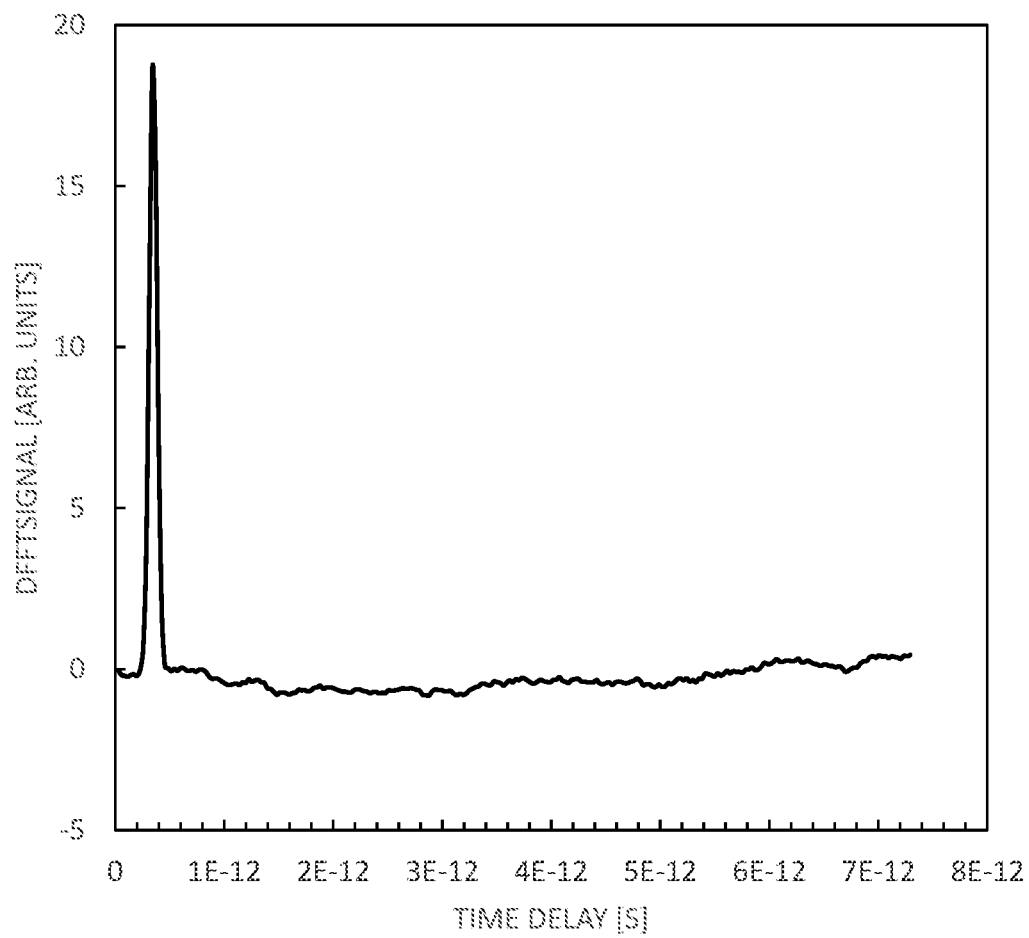

FIG. 44 represents filtered and integrated differential spectrum IDFFTDS1 calculated from the spectrum shown in FIG. 31 using parameter $\Delta t=0.010$ mm.

Figure 45:
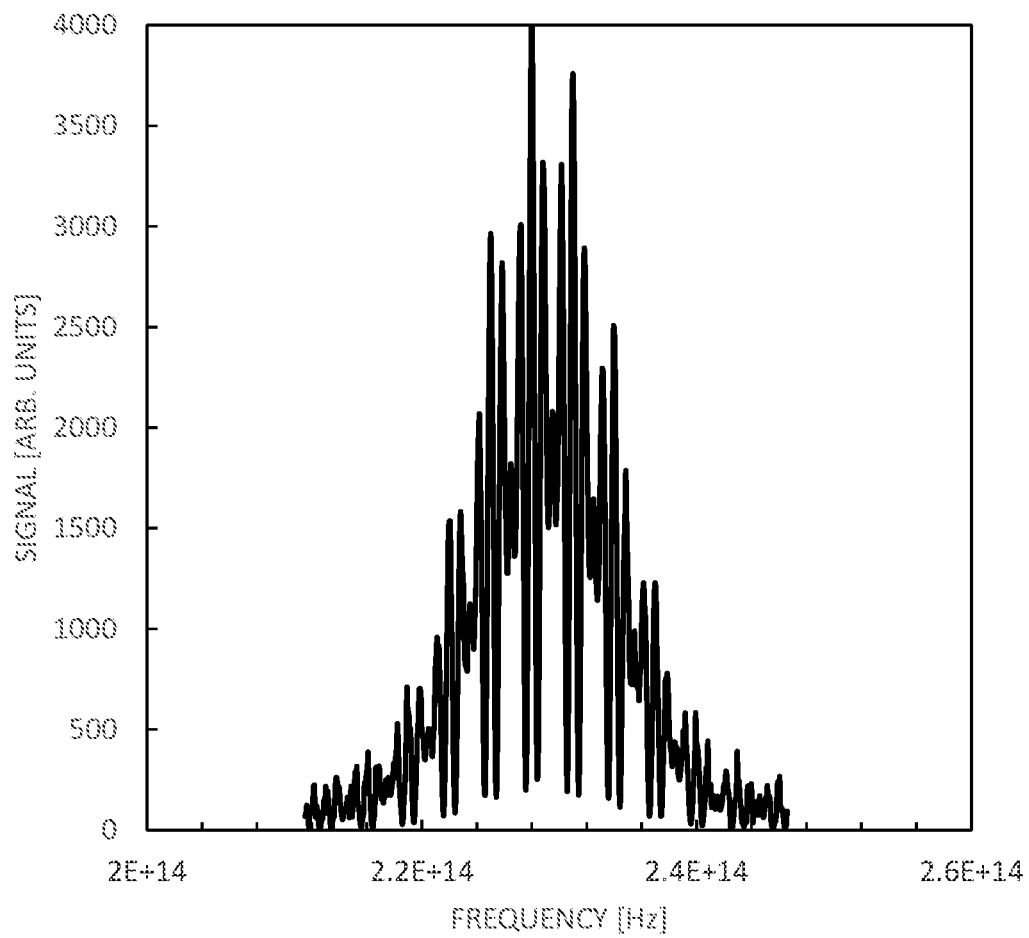

FIG. 45 represents signal recorded by 1D detector being incoherent sum of the reflection signals from the first and the second probe, when the sample is a slab of gold coated material, and the first probe is positioned at the distance −0.150 mm from the surface proximal to it. The second probe is positioned at the distance 0.200 mm from the surface proximal to the second probe.

Figure 46:
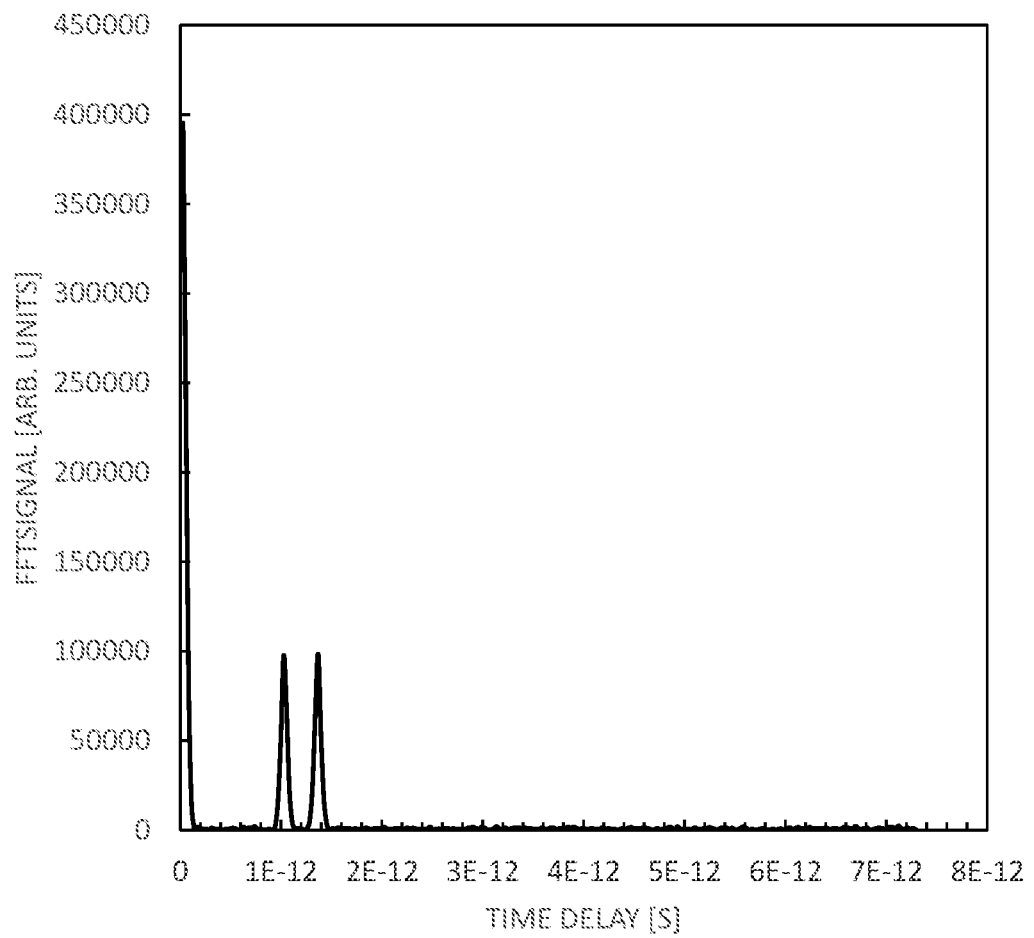

FIG. 46 represents a magnitude of the discrete Fourier transform of the signal shown in FIG. 45.

Figure 47:
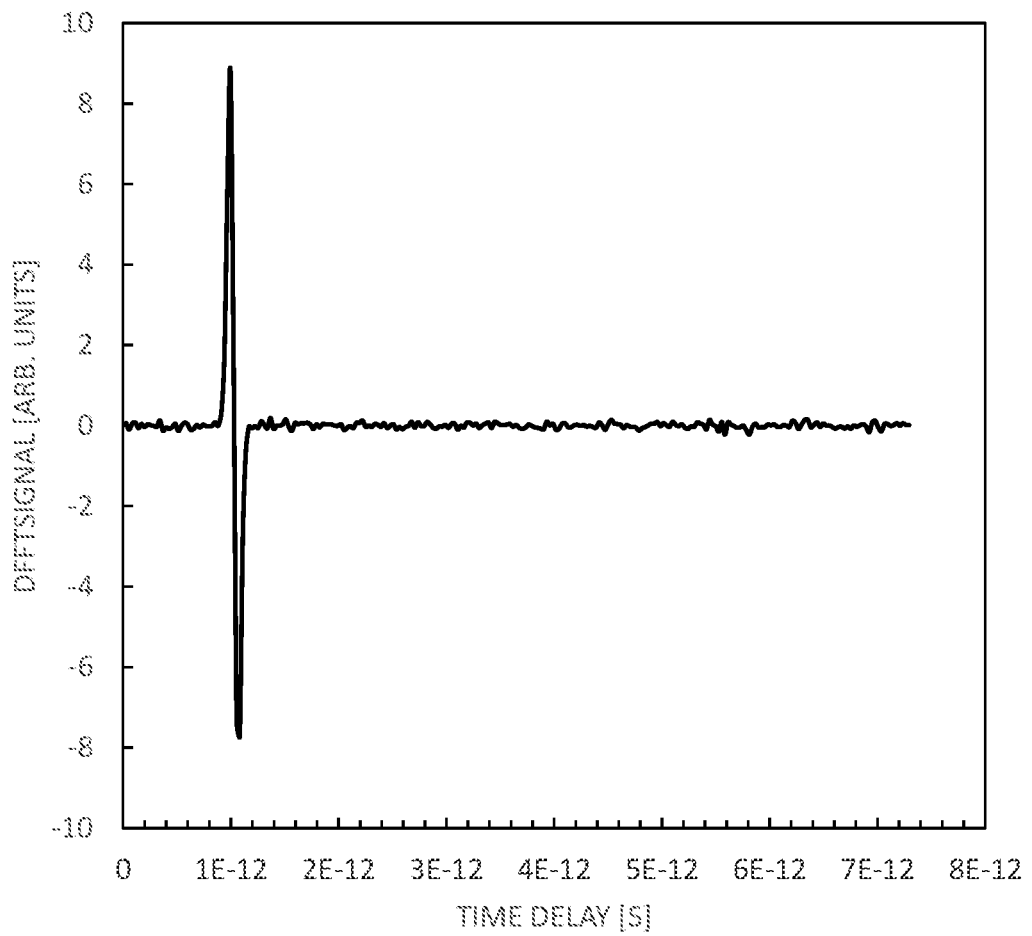

FIG. 47 represents differential spectrum DFFTDS1 calculated from the spectrum shown in FIG. 46 using parameter $\Delta t=0.010$ mm.

Figure 48:
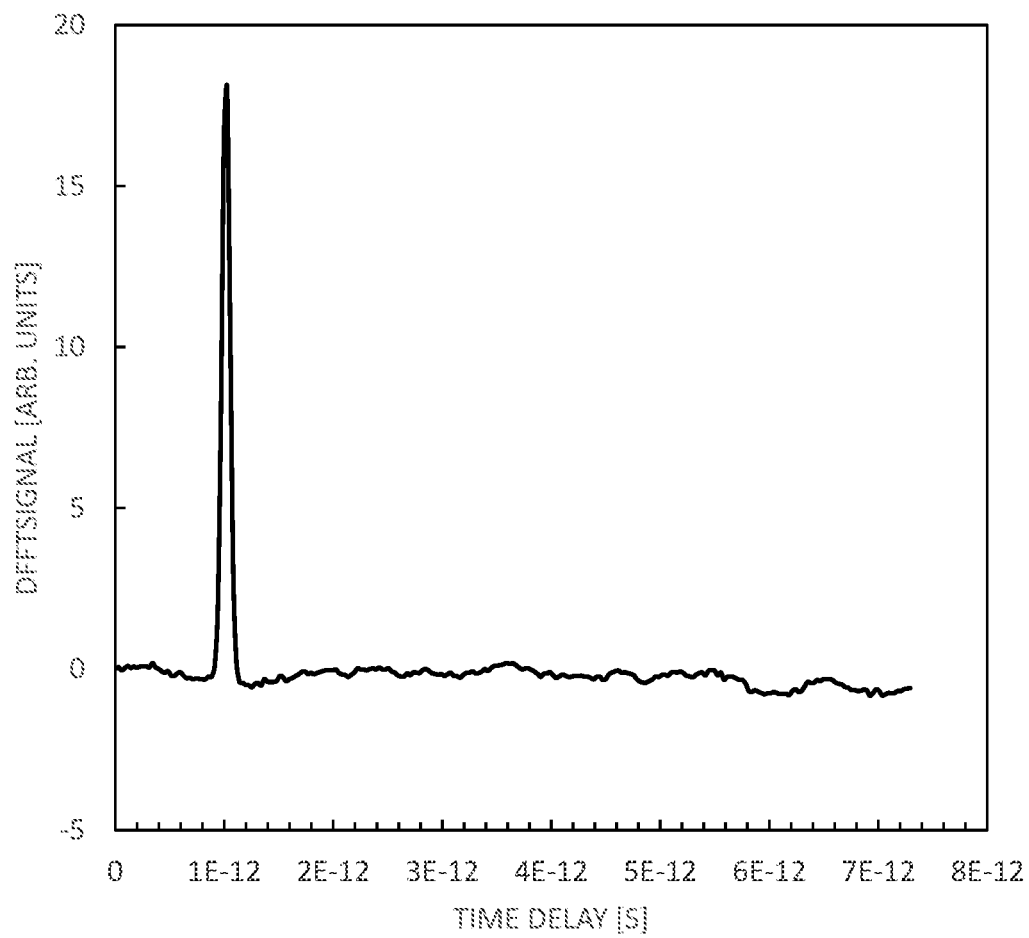

FIG. 48 represents filtered and integrated differential spectrum DFFTDS1 calculated from the spectrum shown in FIG. 47 using parameter $\Delta t=0.010$ mm.

Figure 49:
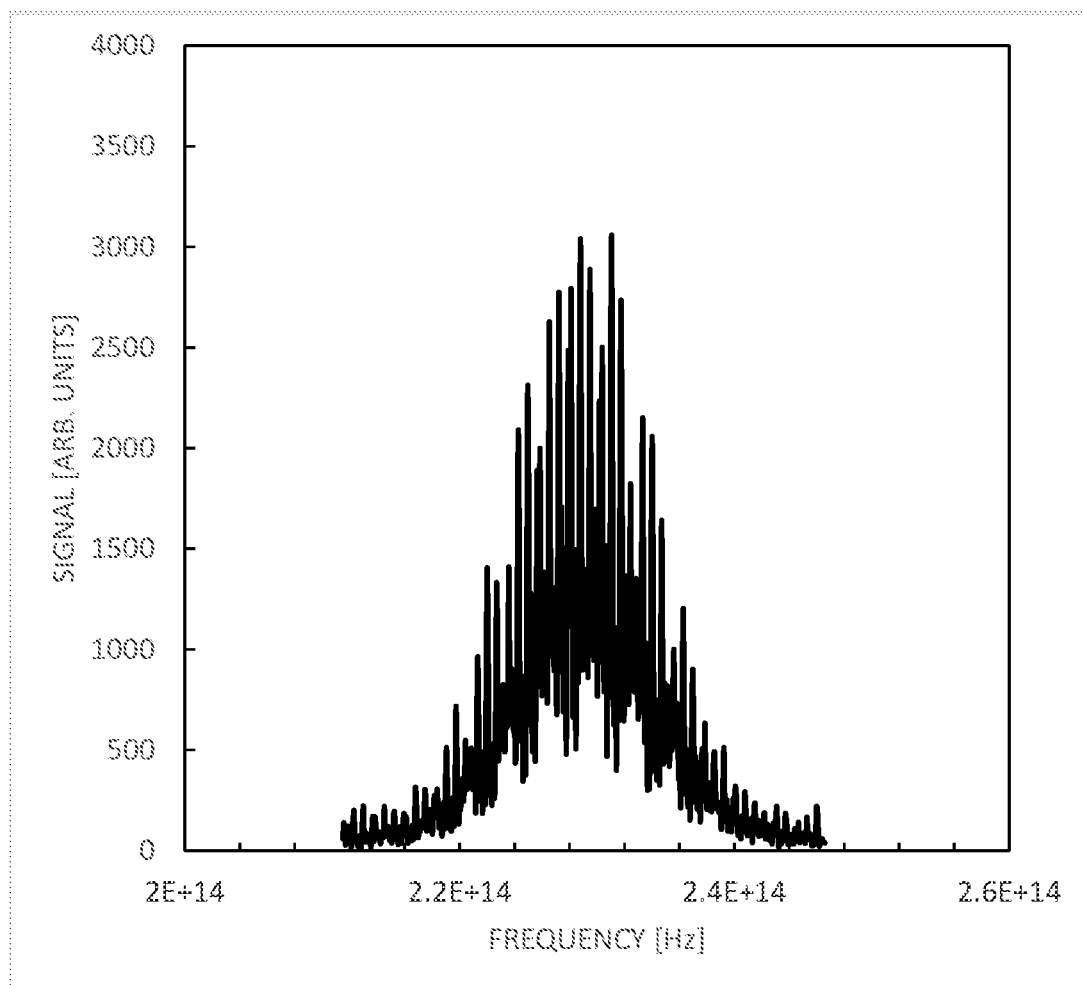

FIG. 49 represents signal recorded by 1D detector being incoherent sum of the reflection signals from the first and the second probe, when the sample is a multilayer sample, and the first probe is positioned at the distance 0.250 mm from the surface proximal to it. The second probe is positioned at the distance 0.200 mm from the surface proximal to the second probe.

Figure 50:
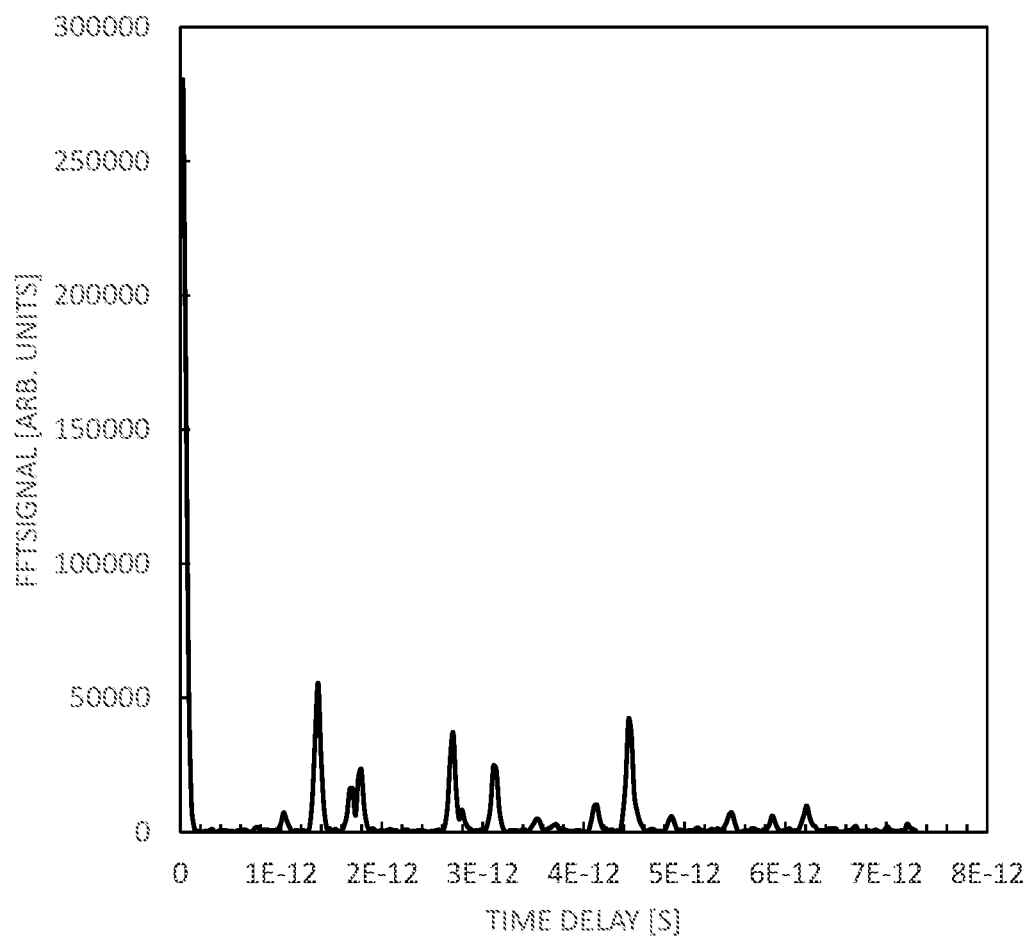

FIG. 50 represents a magnitude of the discrete Fourier transform of the signal shown in FIG. 49.

Figure 51:
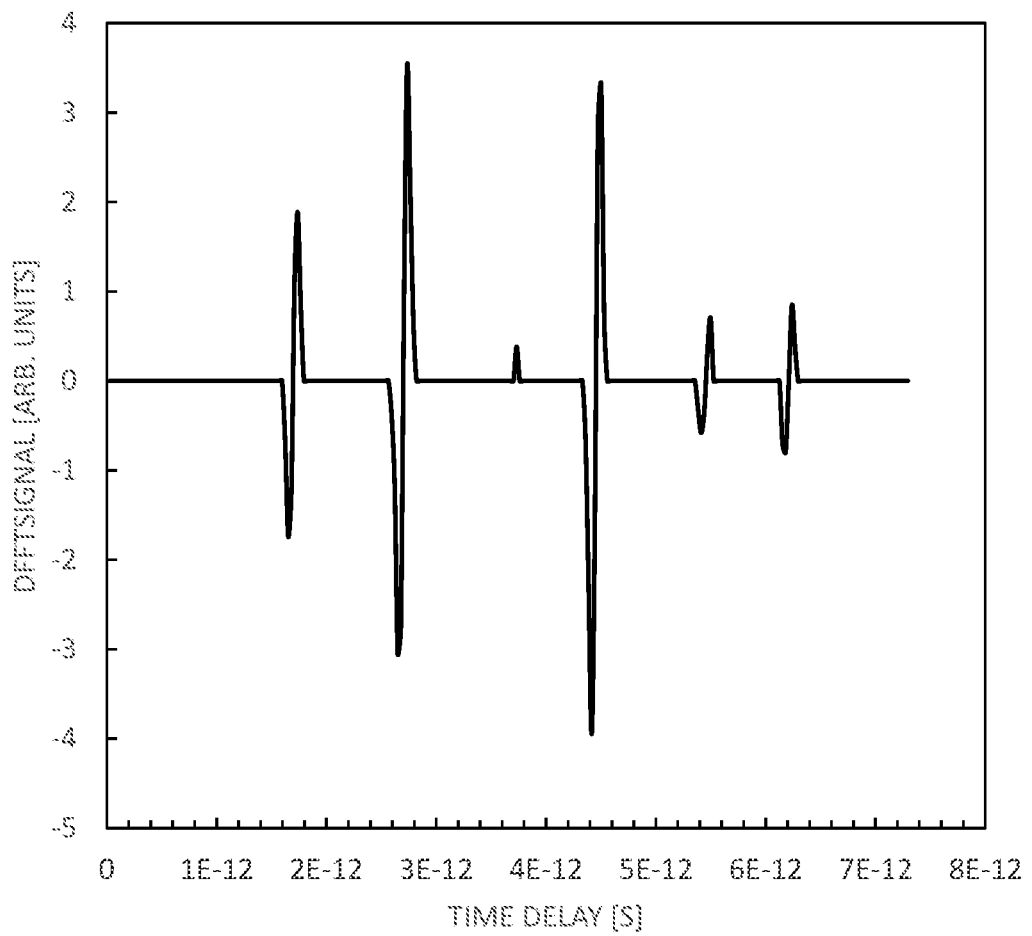

FIG. 51 represents differential spectrum DFFTDS1 calculated from the spectrum shown in FIG. 50 using parameter $\Delta t=0.010$ mm.

Figure 52:
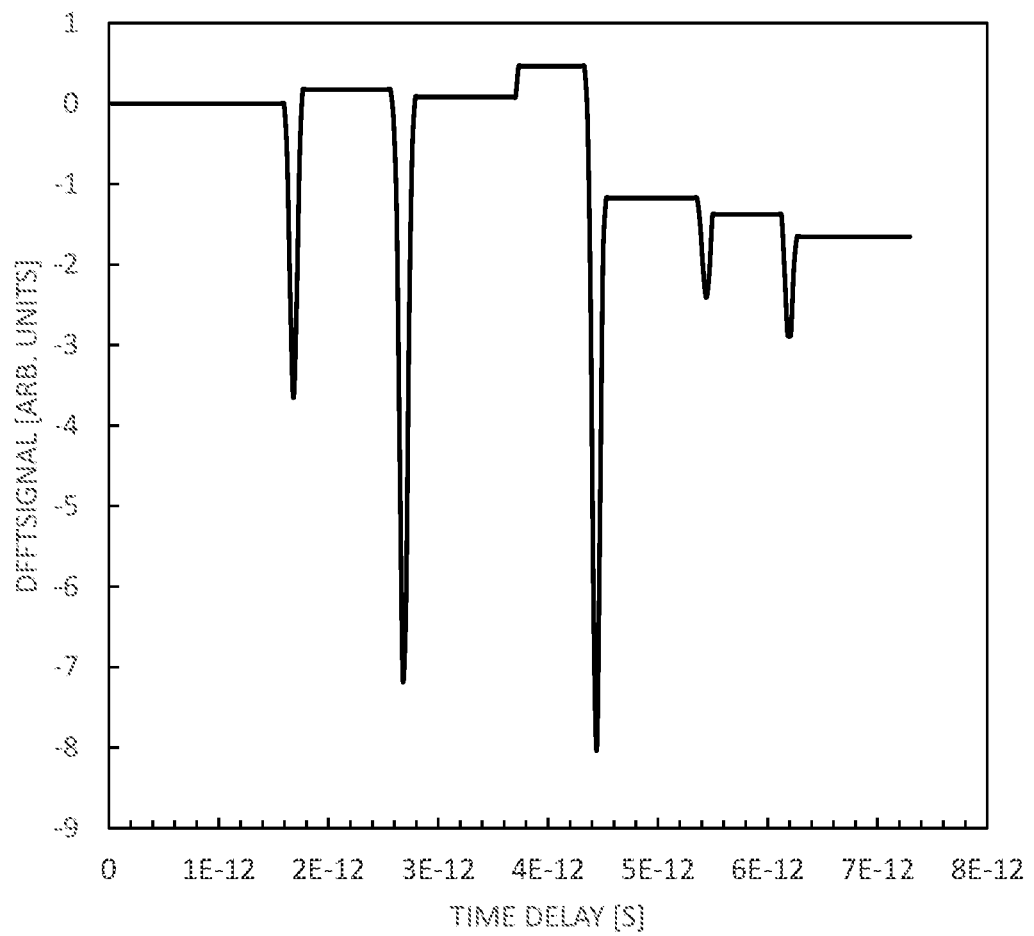

FIG. 52 represents filtered and integrated differential spectrum DFFTDS1 calculated from the spectrum shown in FIG. 51 using parameter $\Delta t=0.010$ mm.

Figure 53:
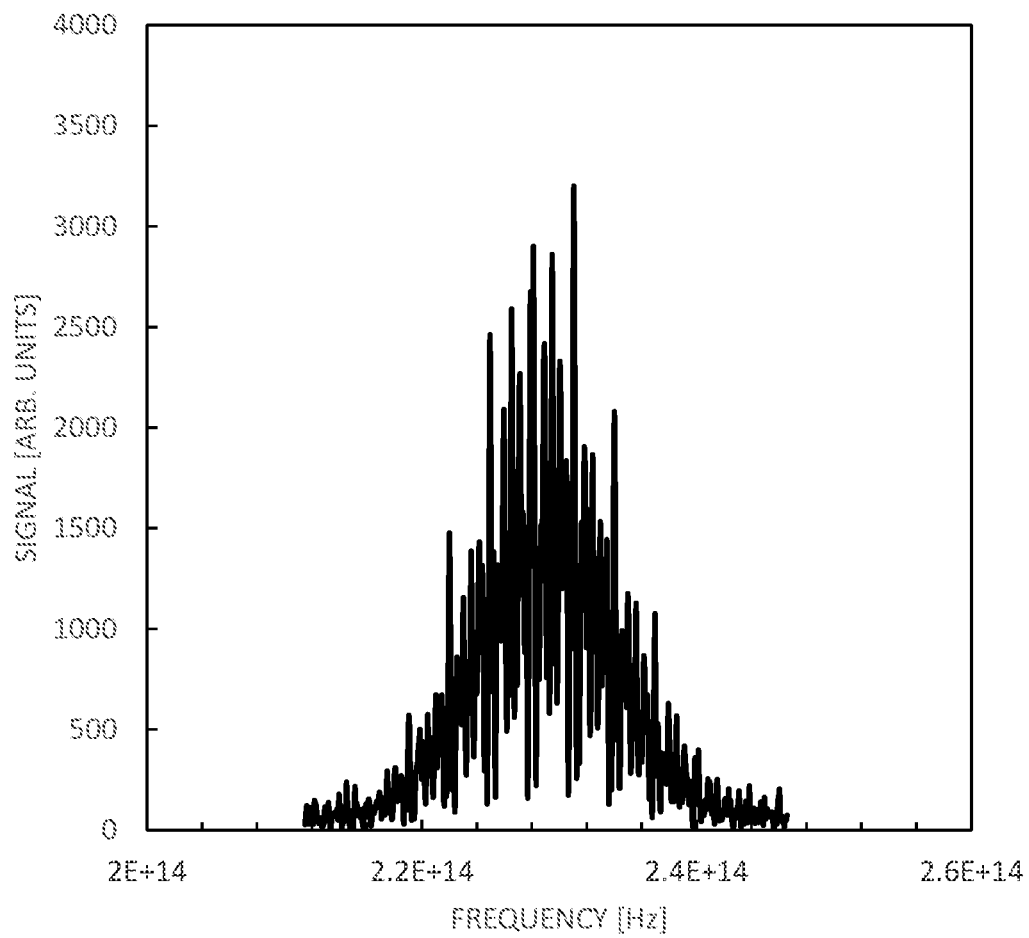

FIG. 53 represents signal recorded by 1D detector being incoherent sum of the reflection signals from the first and the second probe, when the sample is a multilayer sample, and the first probe is positioned at the distance 0.150 mm from the surface proximal to it. The second probe is positioned at the distance 0.200 mm from the surface proximal to the second probe.

Figure 54:
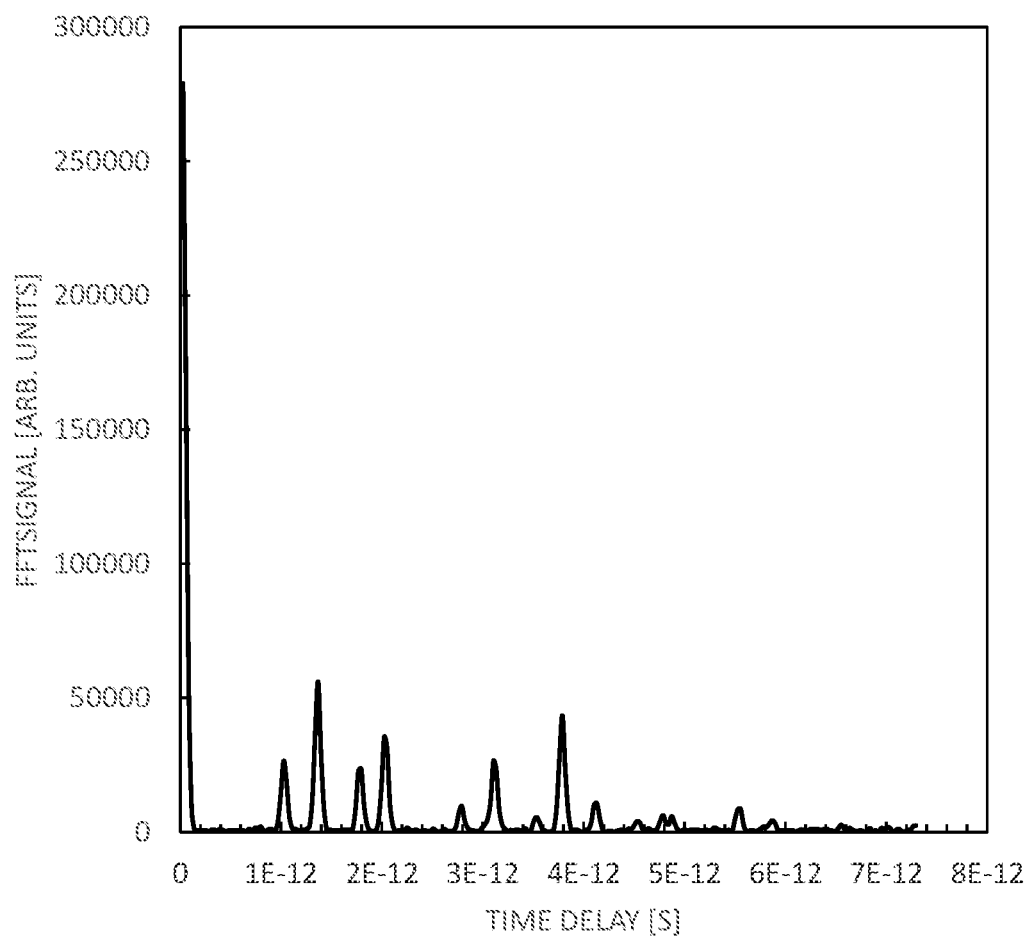

FIG. 54 represents a magnitude of the discrete Fourier transform of the signal shown in FIG. 53.

Figure 55:
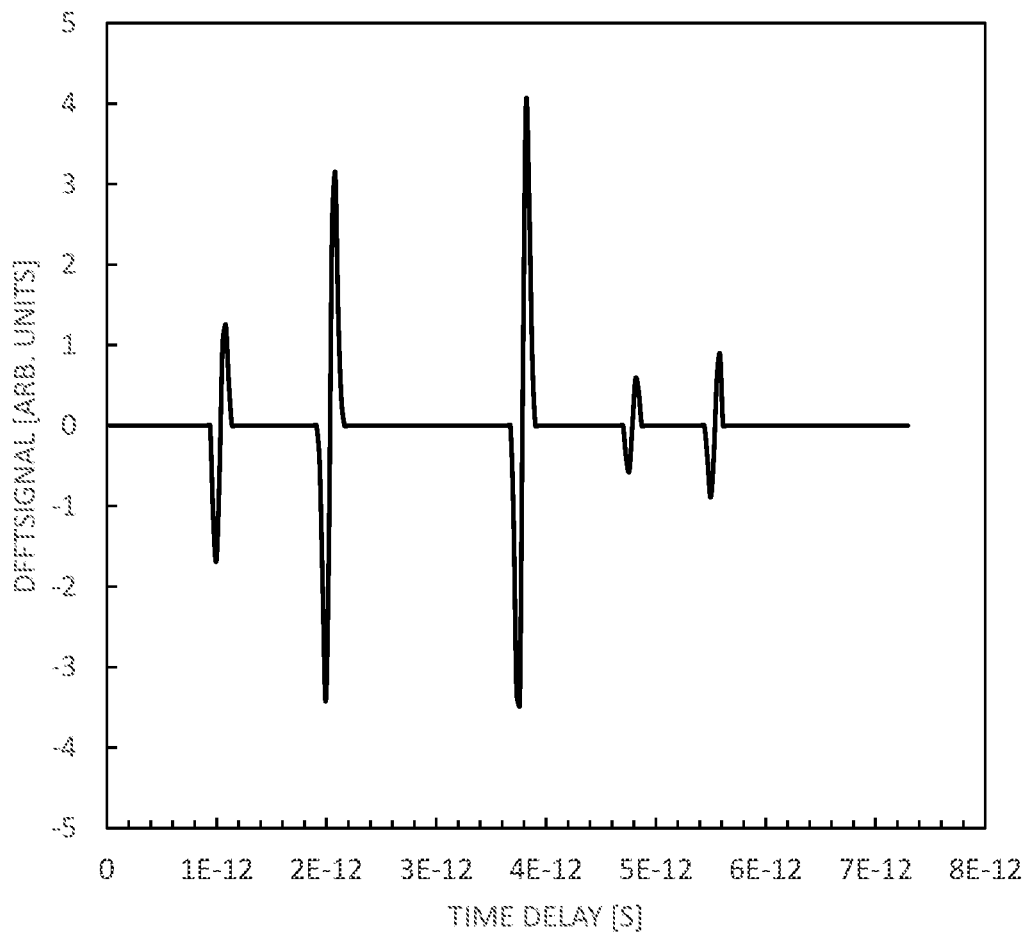

FIG. 55 represents differential spectrum DFFTDS1 calculated from the spectrum shown in FIG. 54 using parameter $\Delta t=0.010$ mm.

Figure 56:
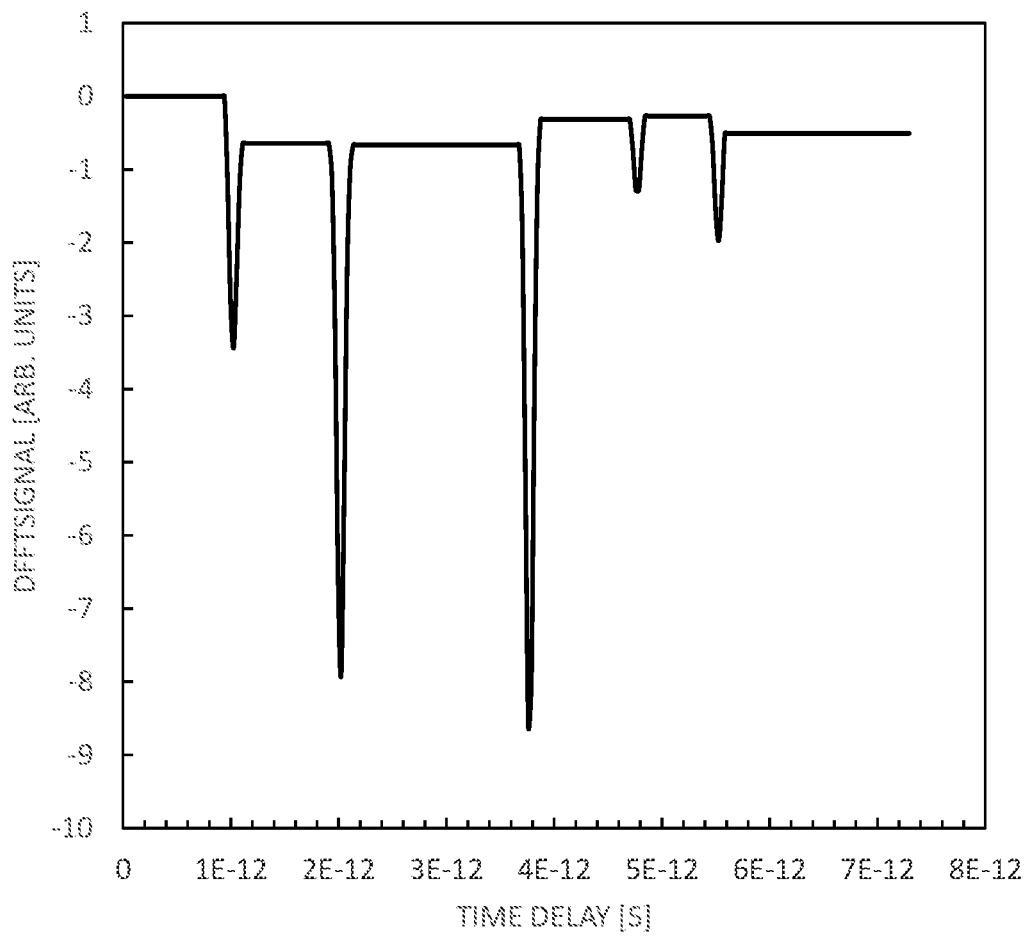

FIG. 56 represents filtered and integrated differential spectrum DFFTDS1 calculated from the spectrum shown in FIG. 55 using parameter $\Delta t=0.010$ mm.

Figure 57:
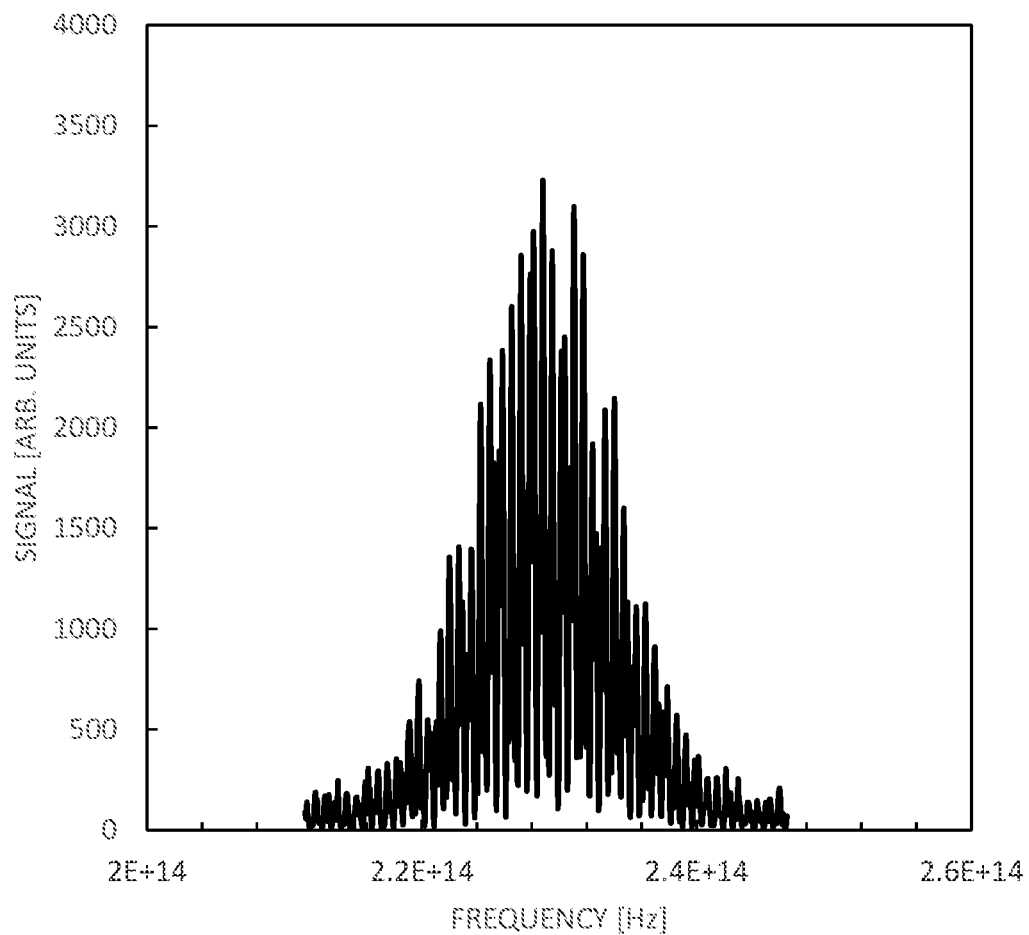

FIG. 57 represents signal recorded by 1D detector being incoherent sum of the reflection signals from the first and the second probe, when the sample is a multilayer sample, and the first probe is positioned at the distance 0.050 mm from the surface proximal to it. The second probe is positioned at the distance 0.200 mm from the surface proximal to the second probe.

Figure 58:
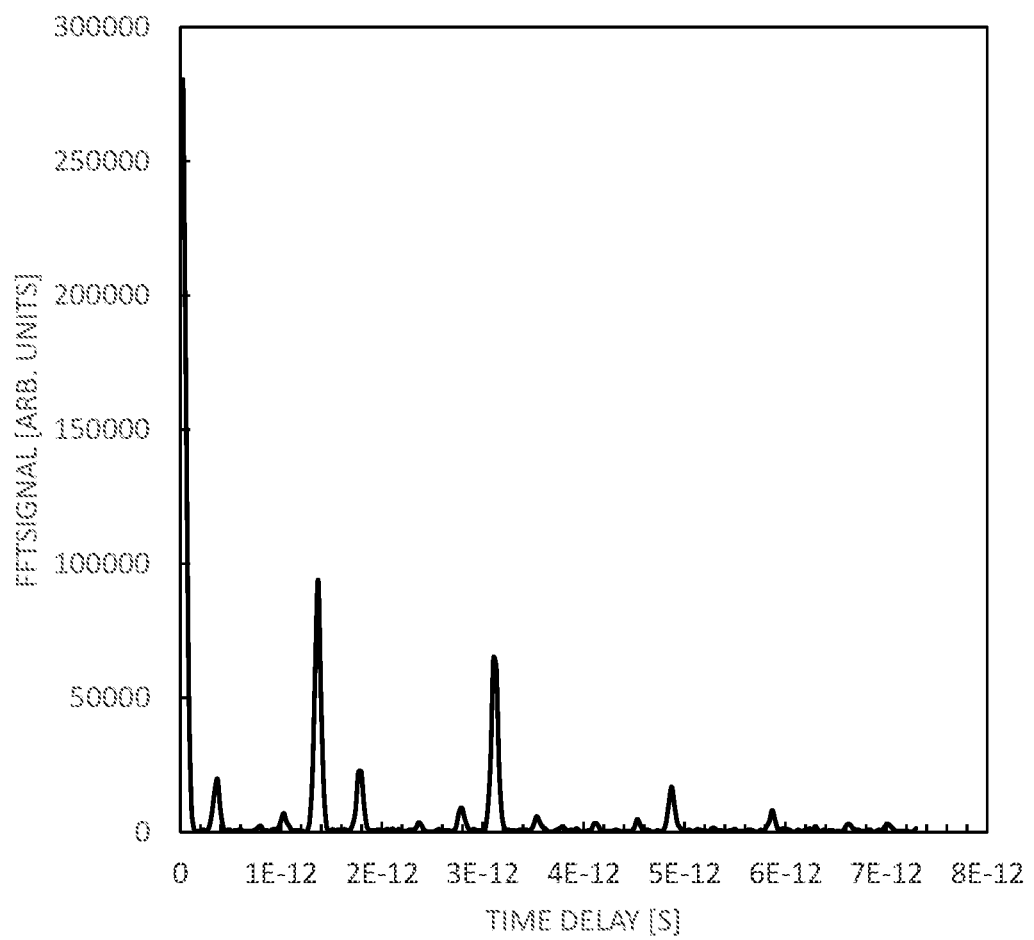

FIG. 58 represents a magnitude of the discrete Fourier transform of the signal shown in FIG. 57.

Figure 59:
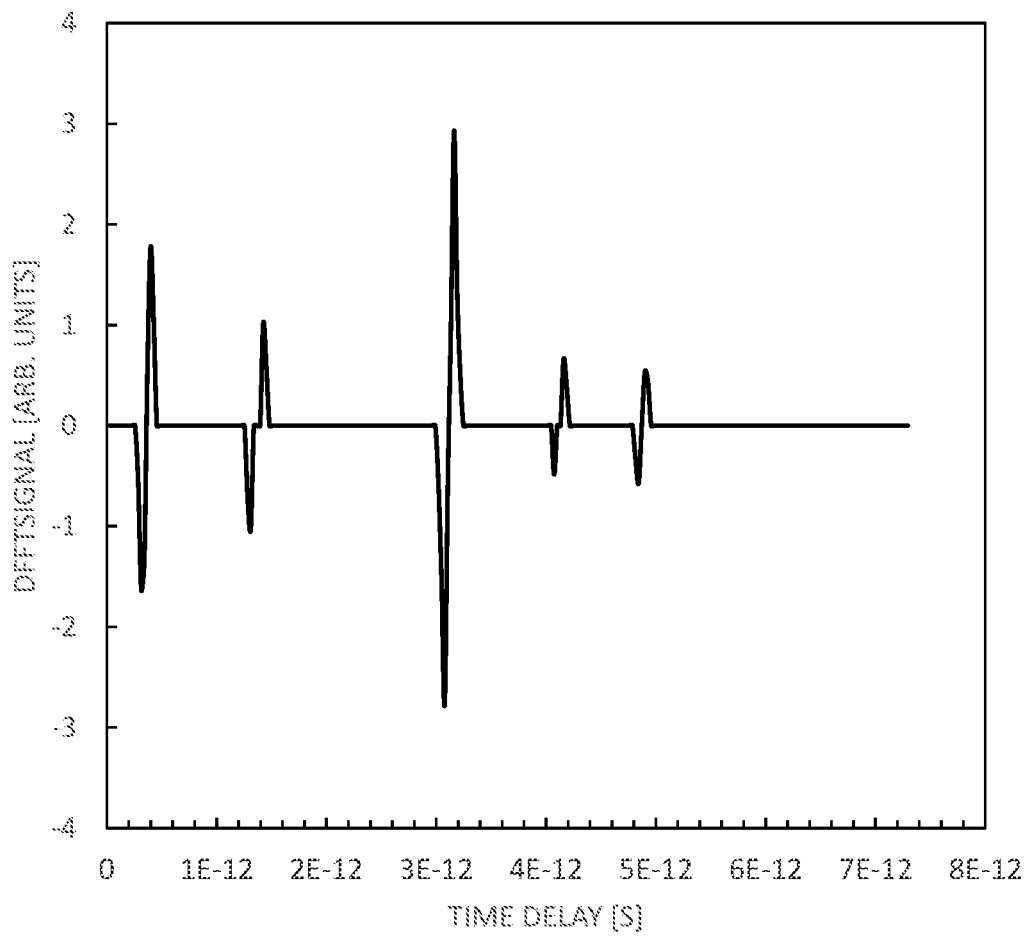

FIG. 59 represents differential spectrum DFFTDS1 calculated from the spectrum shown in FIG. 58 using parameter $\Delta t=0.010$ mm.

Figure 60:
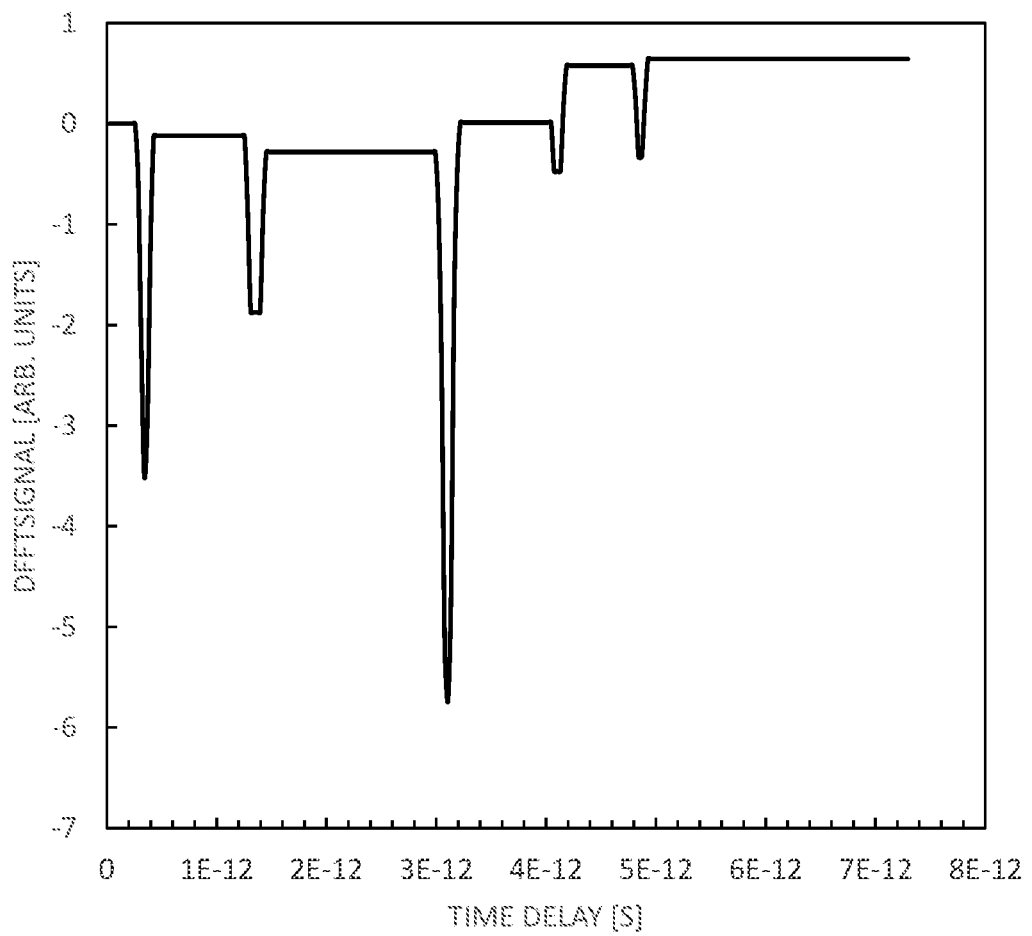

FIG. 60 represents filtered and integrated differential spectrum DFFTDS1 calculated from the spectrum shown in FIG. 59 using parameter $\Delta t=0.010$ mm.

Figure 61:
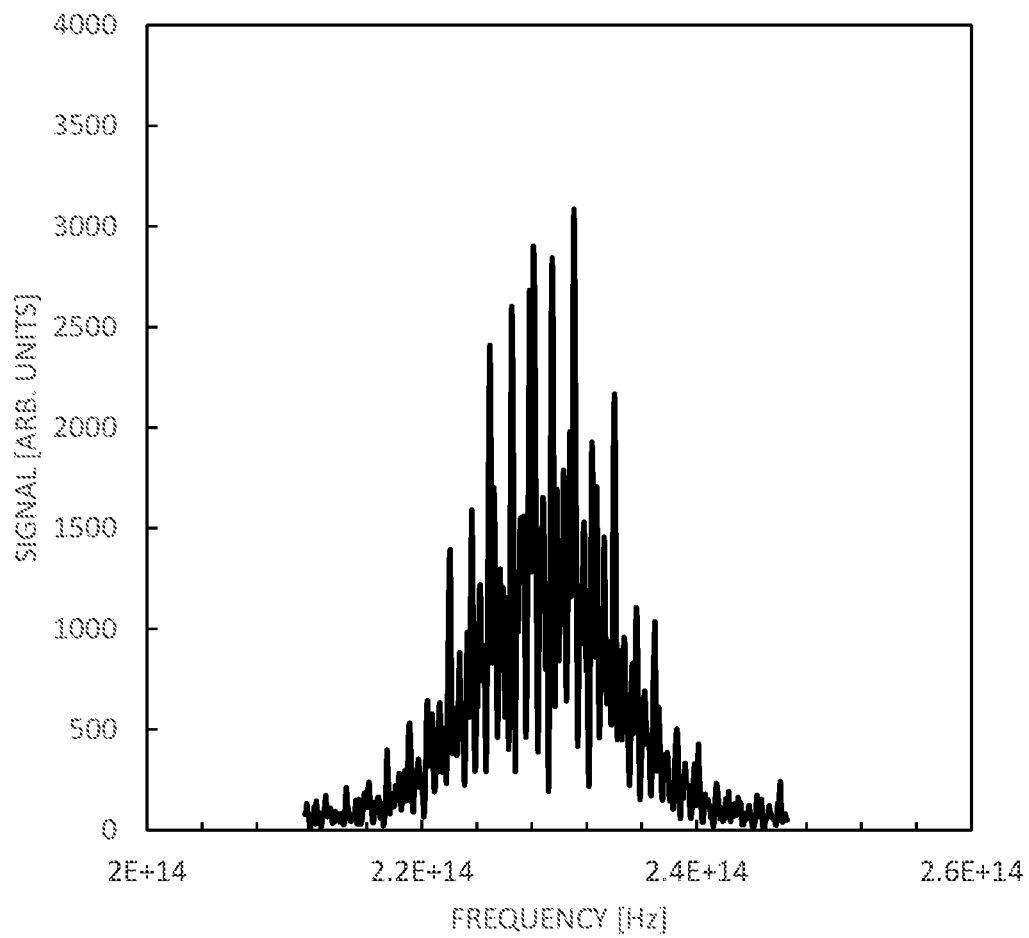

FIG. 61 represents signal recorded by 1D detector being incoherent sum of the reflection signals from the first and the second probe, when the sample is a multilayer sample, and the first probe is positioned at the distance −0.050 mm (negative) from the surface proximal to it. The second probe is positioned at the distance 0.200 mm from the surface proximal to the second probe.

Figure 62:
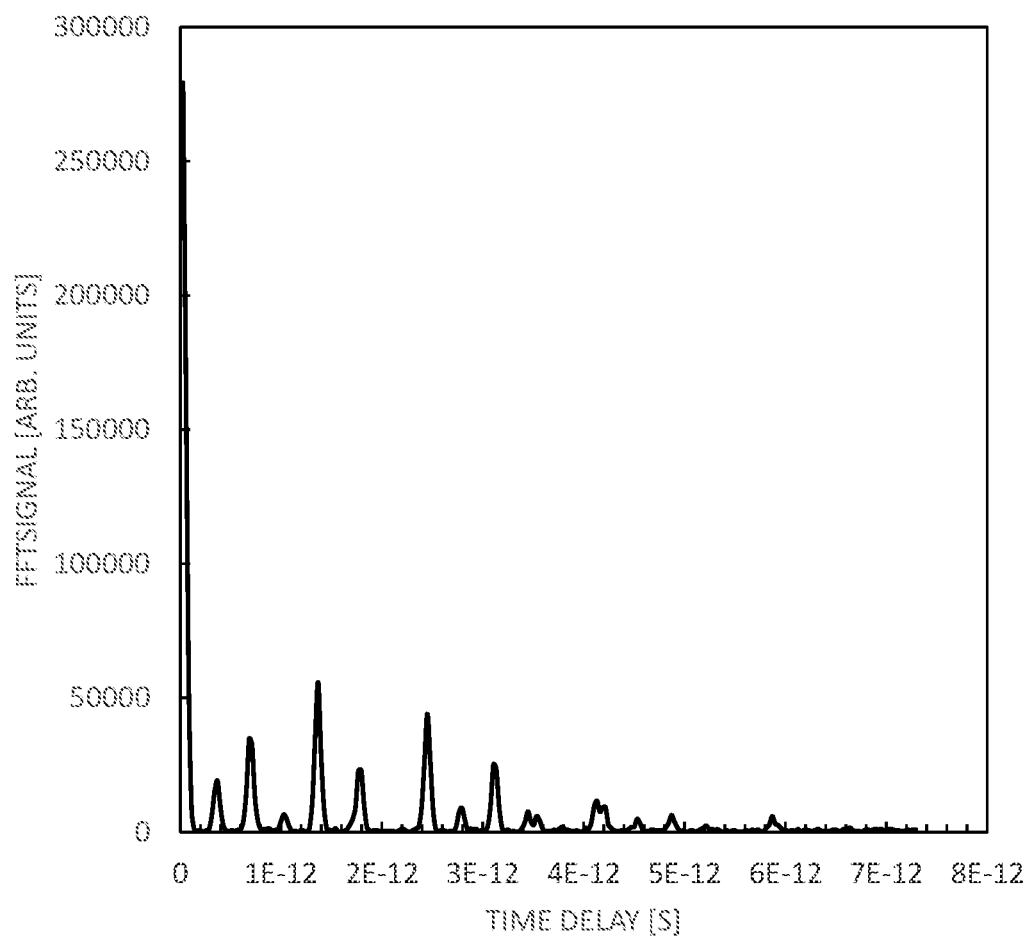

FIG. 62 represents a magnitude of the discrete Fourier transform of the signal shown in FIG. 61.

Figure 63:
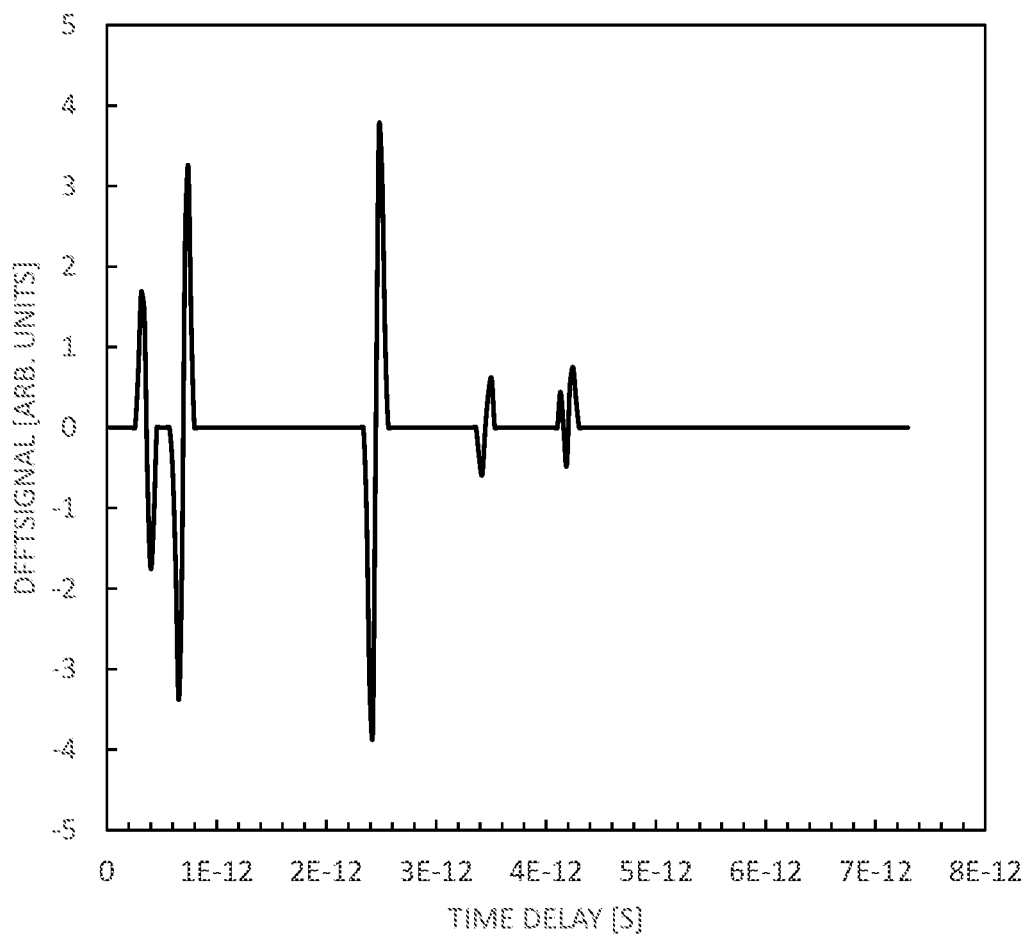

FIG. 63 represents differential spectrum DFFTDS1 calculated from the spectrum shown in FIG. 62 using parameter Δt=0.010 mm.

Figure 64:
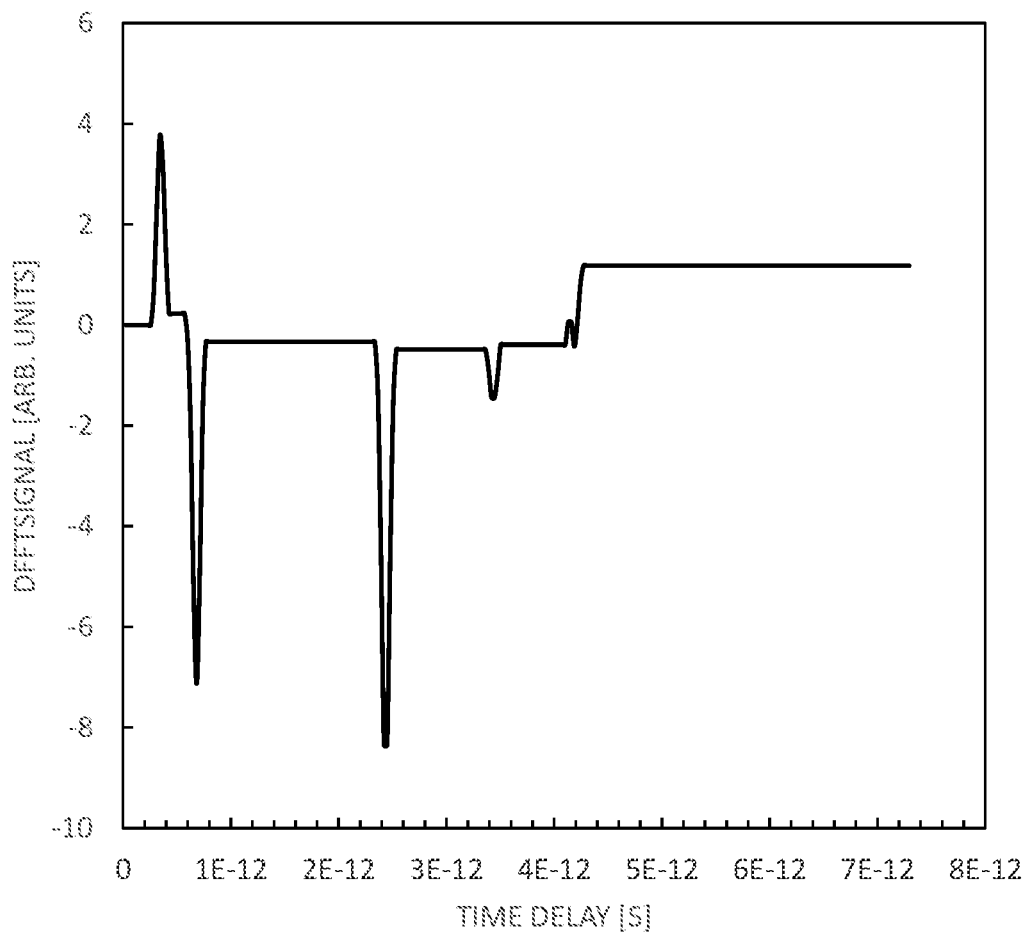

FIG. 64 represents filtered and integrated differential spectrum DFFTDS1 calculated from the spectrum shown in FIG. 63 using parameter Δt=0.010 mm.

Figure 65:
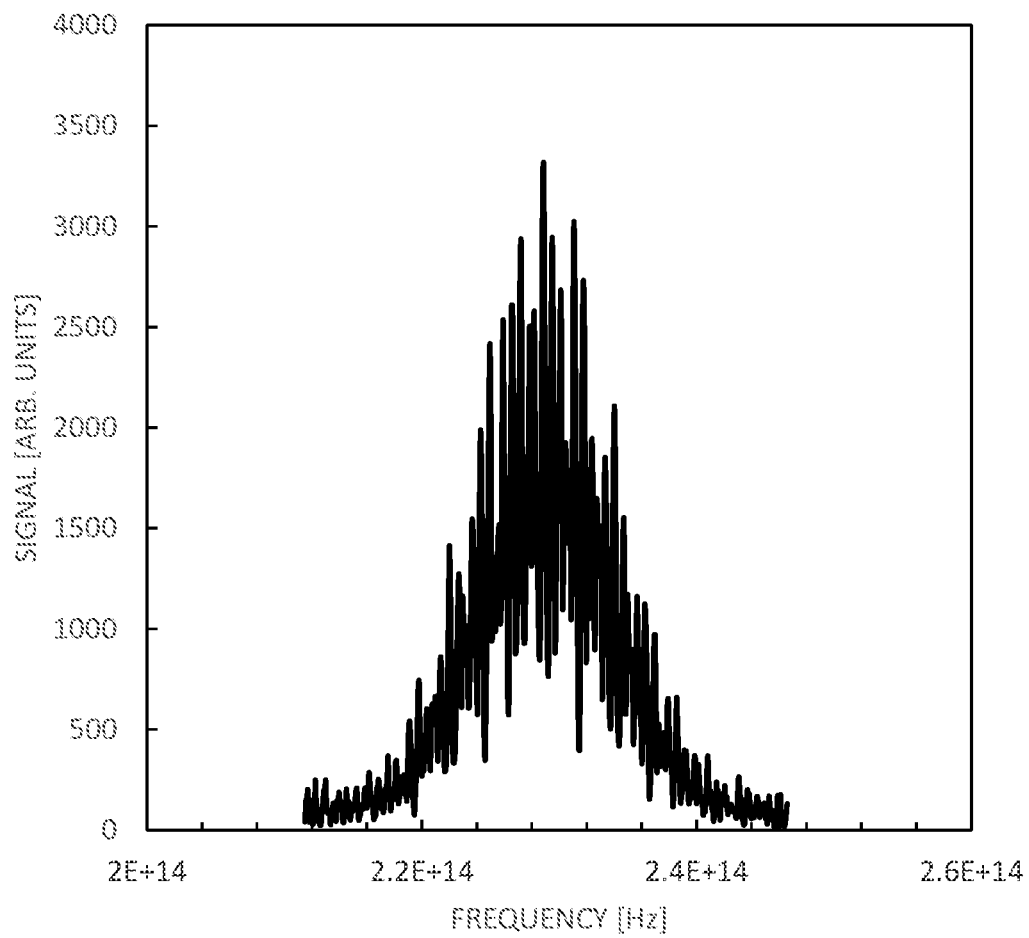

FIG. 65 represents signal recorded by 1D detector being incoherent sum of the reflection signals from the first and the second probe, when the sample is a multilayer sample, and the first probe is positioned at the distance −0.150 mm (negative) from the surface proximal to it. The second probe is positioned at the distance 0.200 mm from the surface proximal to the second probe.

Figure 66:
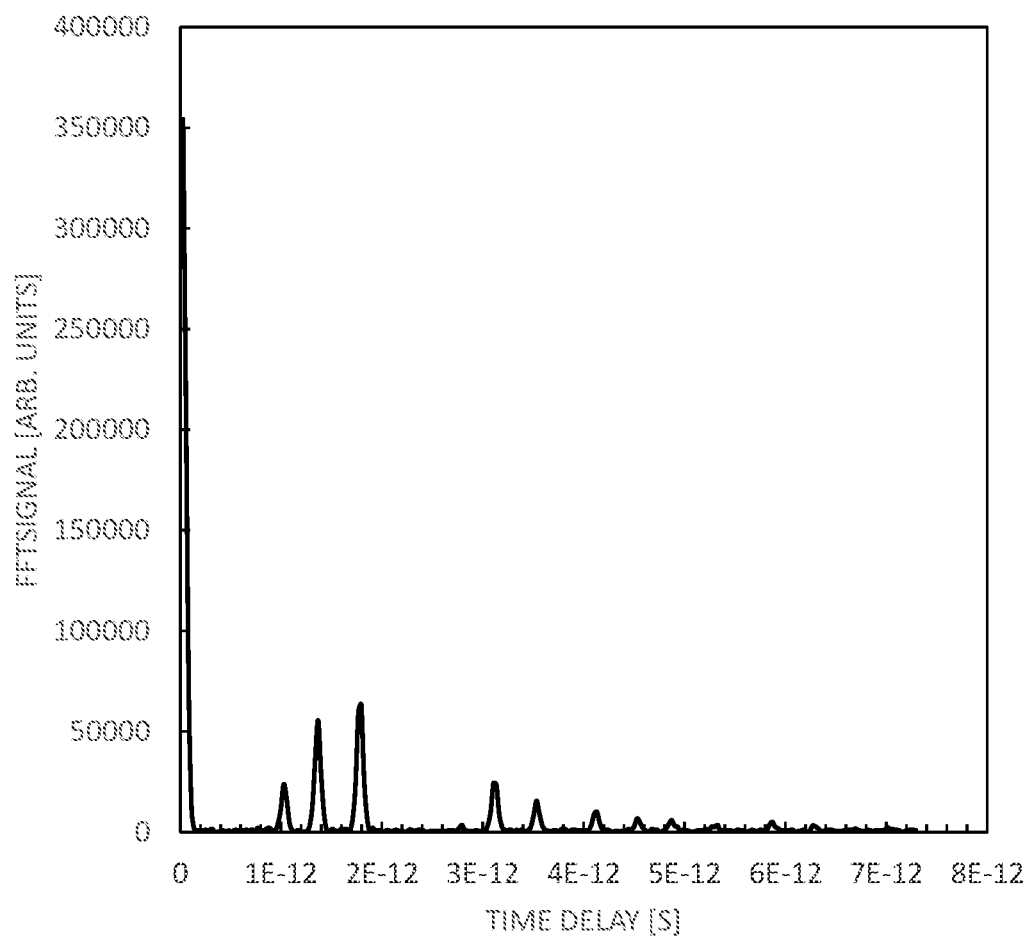

FIG. 66 represents a magnitude of the discrete Fourier transform of the signal shown in FIG. 65.

Figure 67:
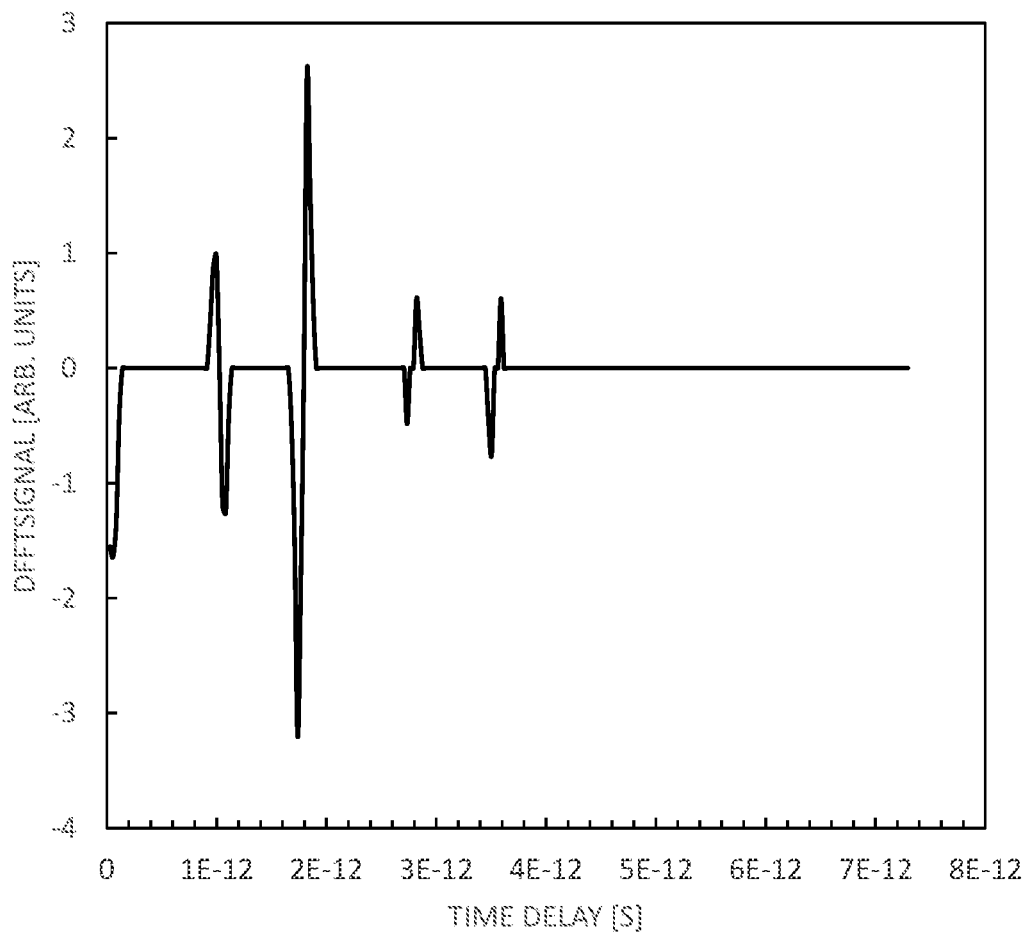

FIG. 67 represents differential spectrum DFFTDS1 calculated from the spectrum shown in FIG. 66 using parameter Δt=0.010 mm.

Figure 68:
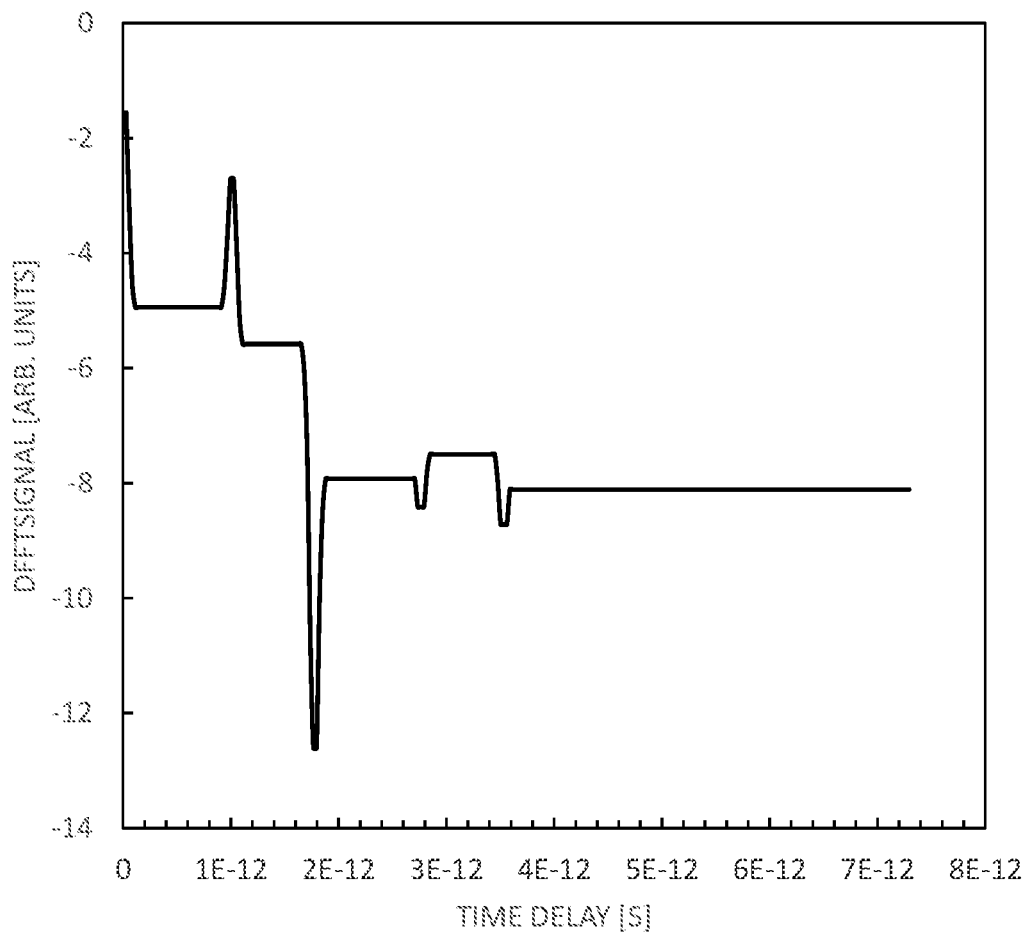

FIG. 68 represents filtered and integrated differential spectrum DFFTDS1 calculated from the spectrum shown in FIG. 67 using parameter Δt=0.010 mm.

Figure 69:
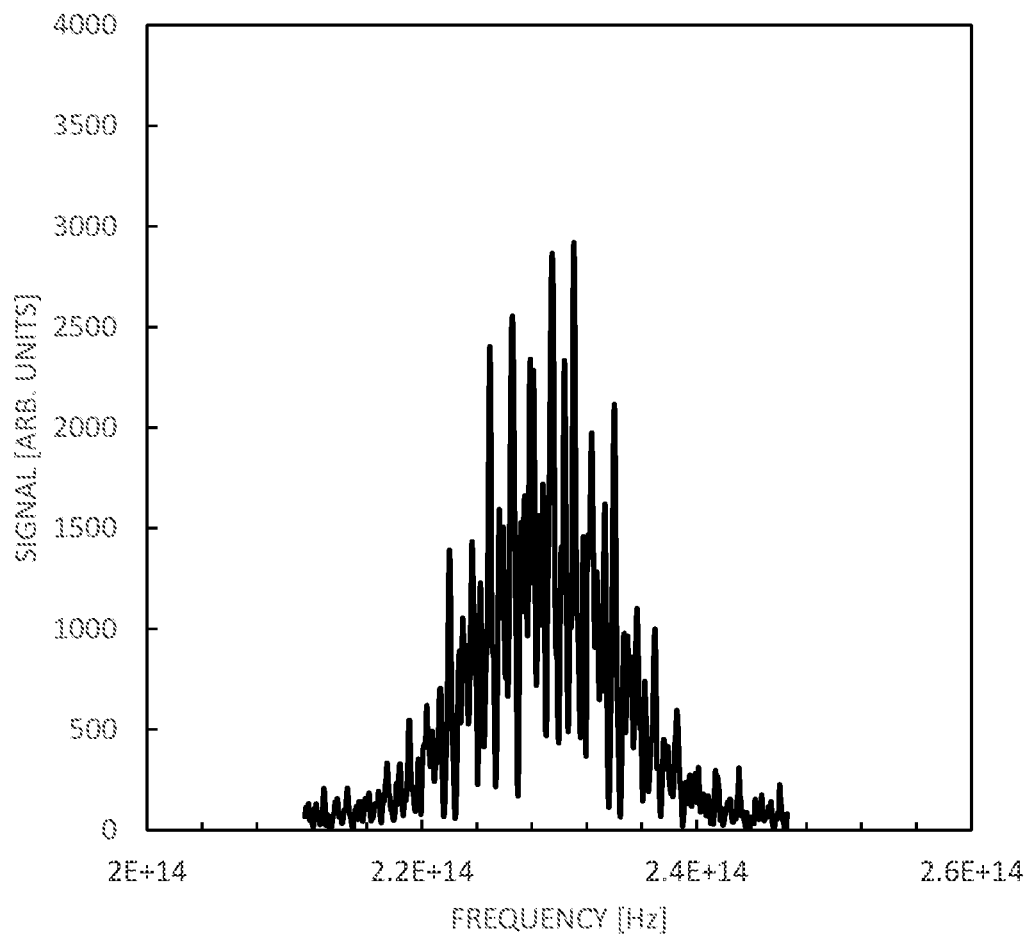

FIG. 69 represents signal recorded by 1D detector being incoherent sum of the reflection signals from the first and the second probe, when the sample is a multilayer sample, and the first probe is positioned at the distance −0.250 mm (negative) from the surface proximal to it. The second probe is positioned at the distance 0.200 mm from the surface proximal to the second probe.

Figure 70:
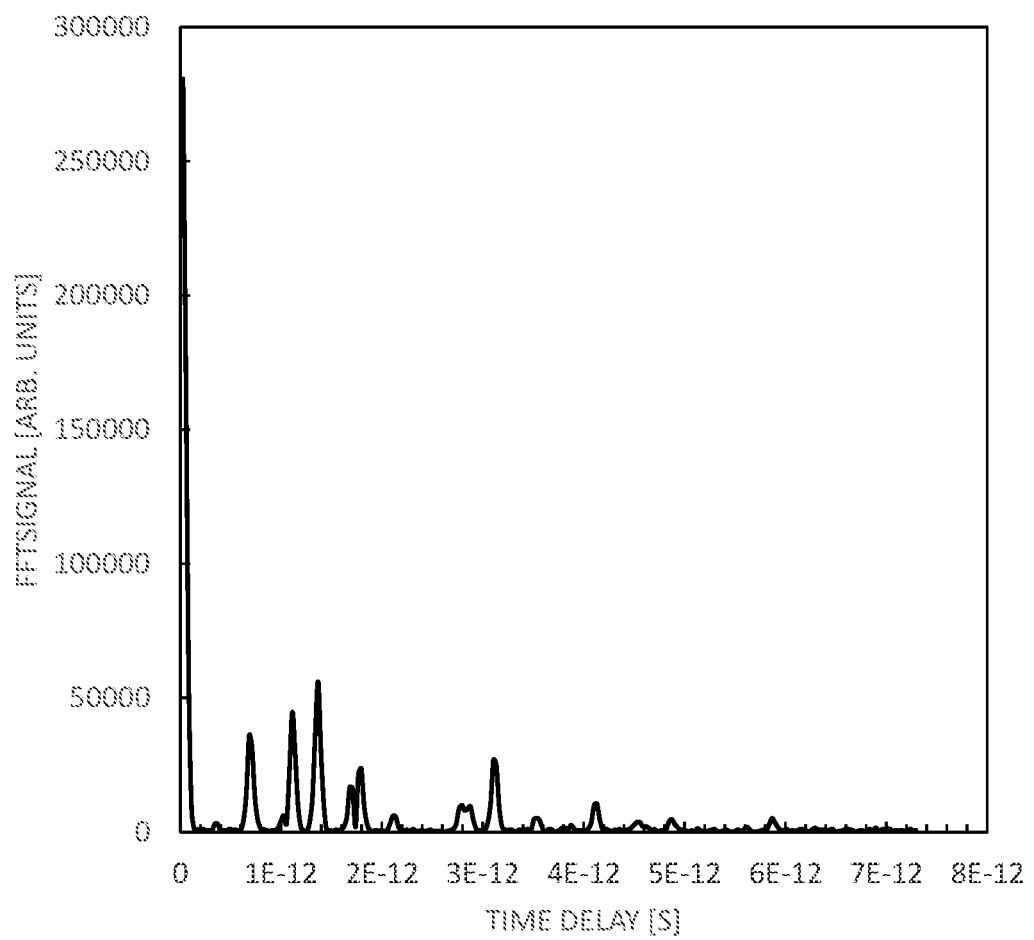

FIG. 70 represents a magnitude of the discrete Fourier transform of the signal shown in FIG. 69.

Figure 71:
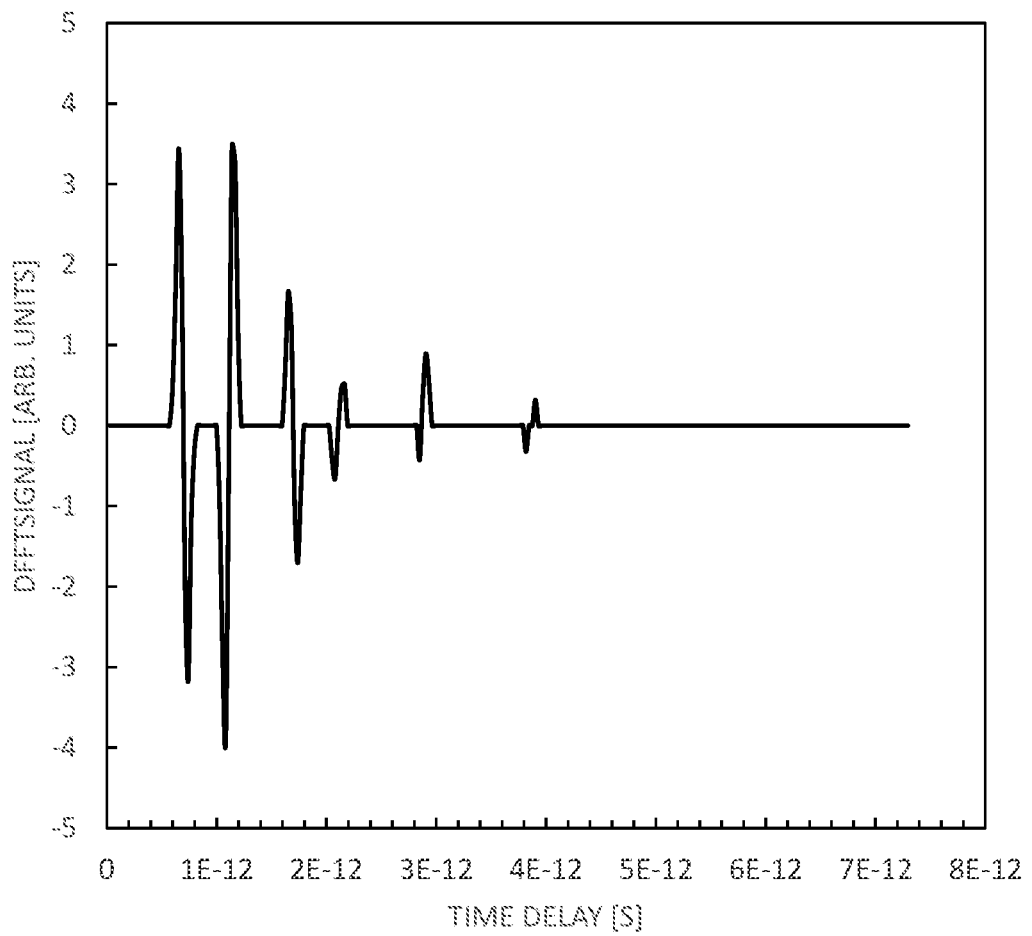

FIG. 71 represents differential spectrum DFFTDS1 calculated from the spectrum shown in FIG. 70 using parameter Δt=0.010 mm.

Figure 72:
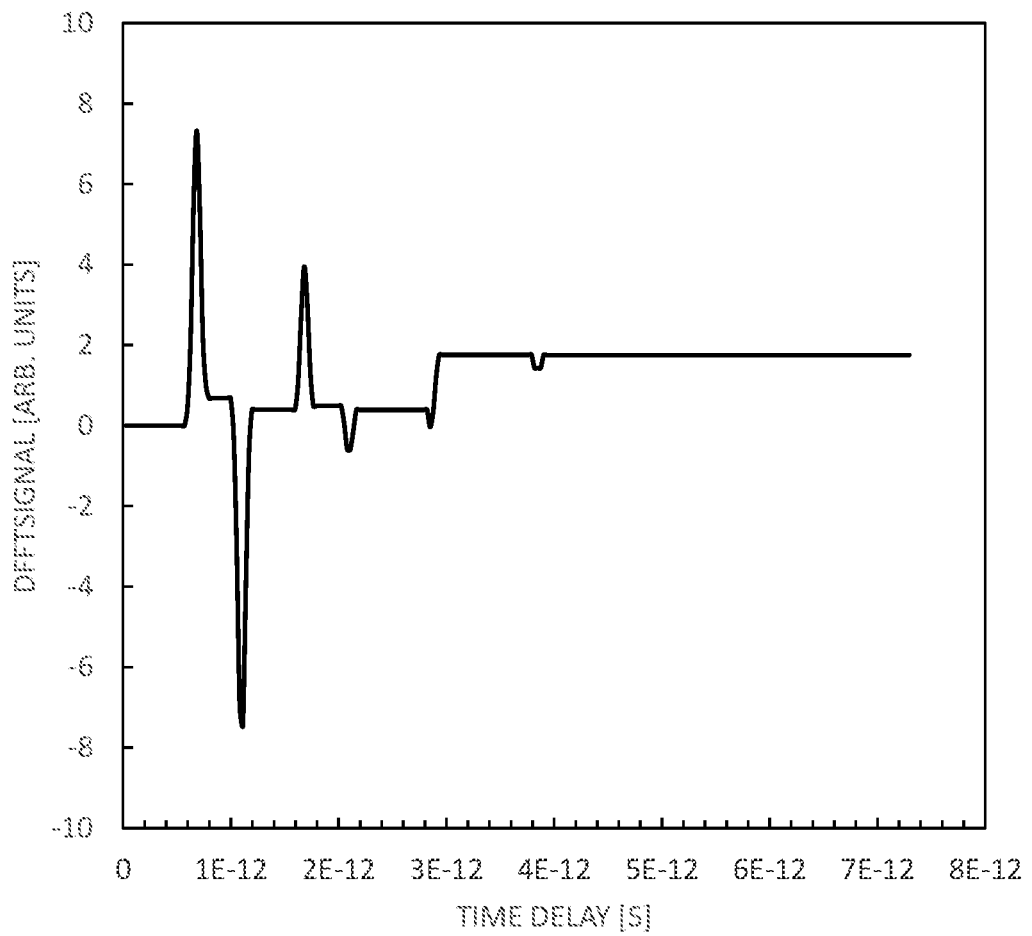

FIG. 72 represents filtered and integrated differential spectrum DFFTDS1 calculated from the spectrum shown in FIG. 71 using parameter Δt=0.010 mm.

Figure 73:
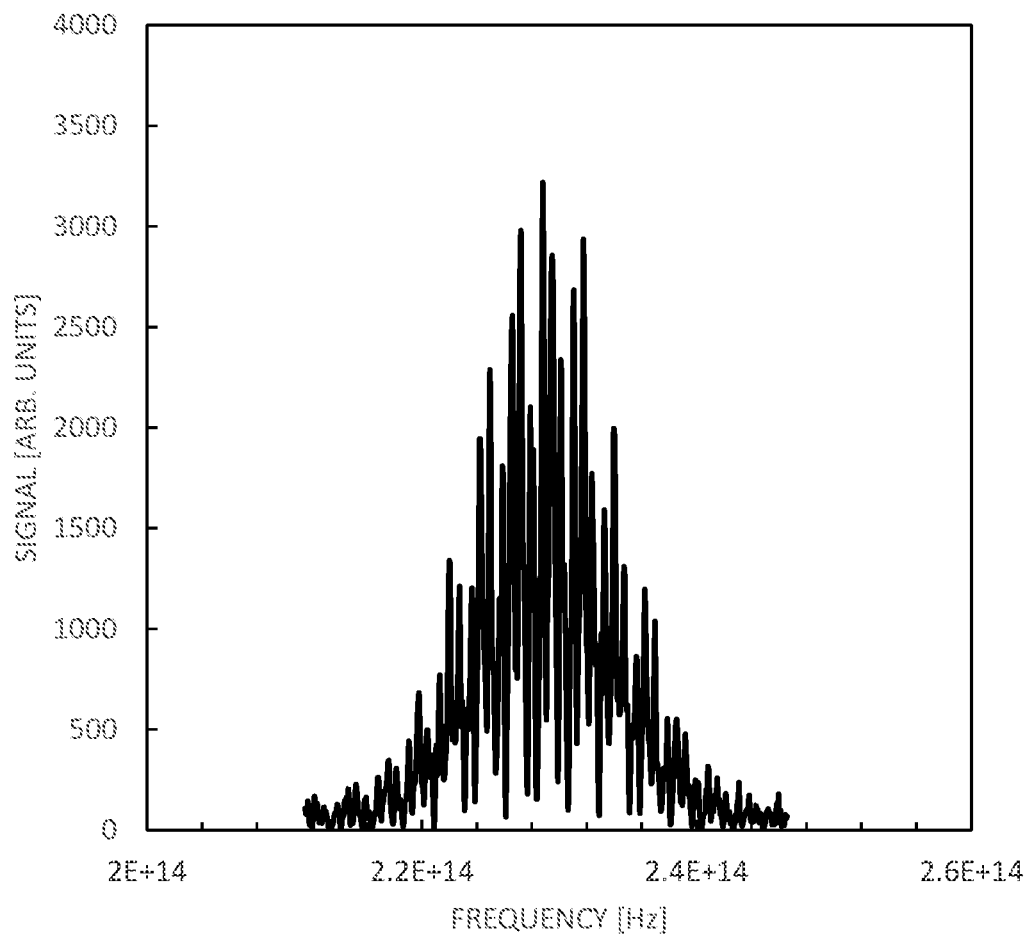

FIG. 73 represents signal recorded by 1D detector being incoherent sum of the reflection signals from the first and the second probe, when the sample is a multilayer sample, and the first probe is positioned at the distance −0.350 mm (negative) from the surface proximal to it. The second probe is positioned at the distance 0.200 mm from the surface proximal to the second probe.

Figure 74:
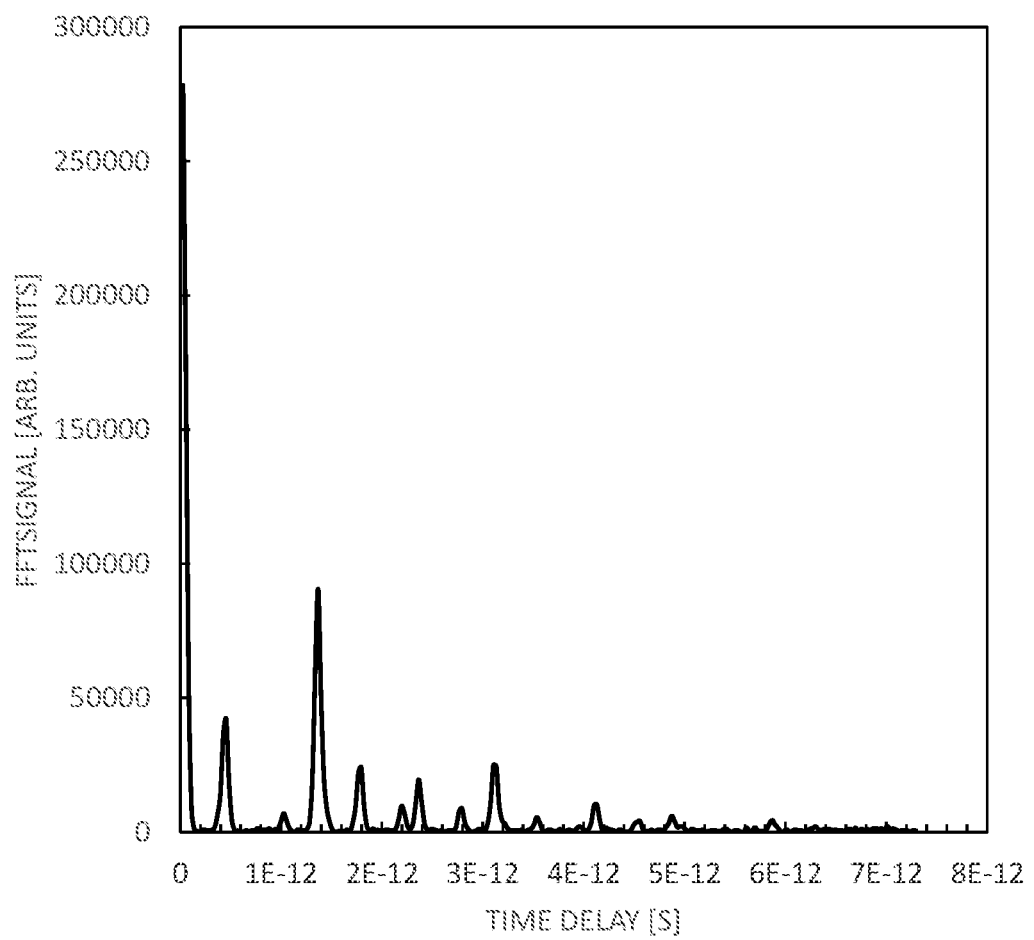

FIG. 74 represents a magnitude of the discrete Fourier transform of the signal shown in FIG. 73.

Figure 75:
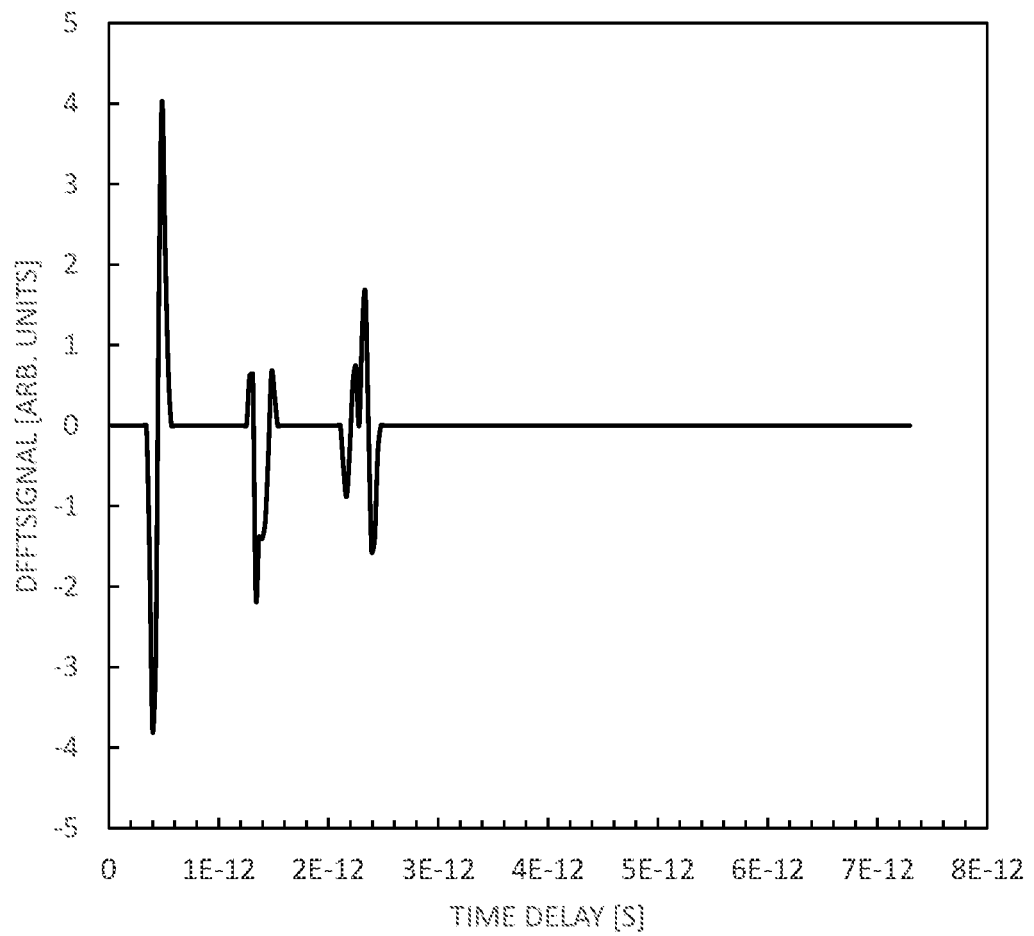

FIG. 75 represents differential spectrum DFFTDS1 calculated from the spectrum shown in FIG. 74 using parameter Δt=0.010 mm.

Figure 76:
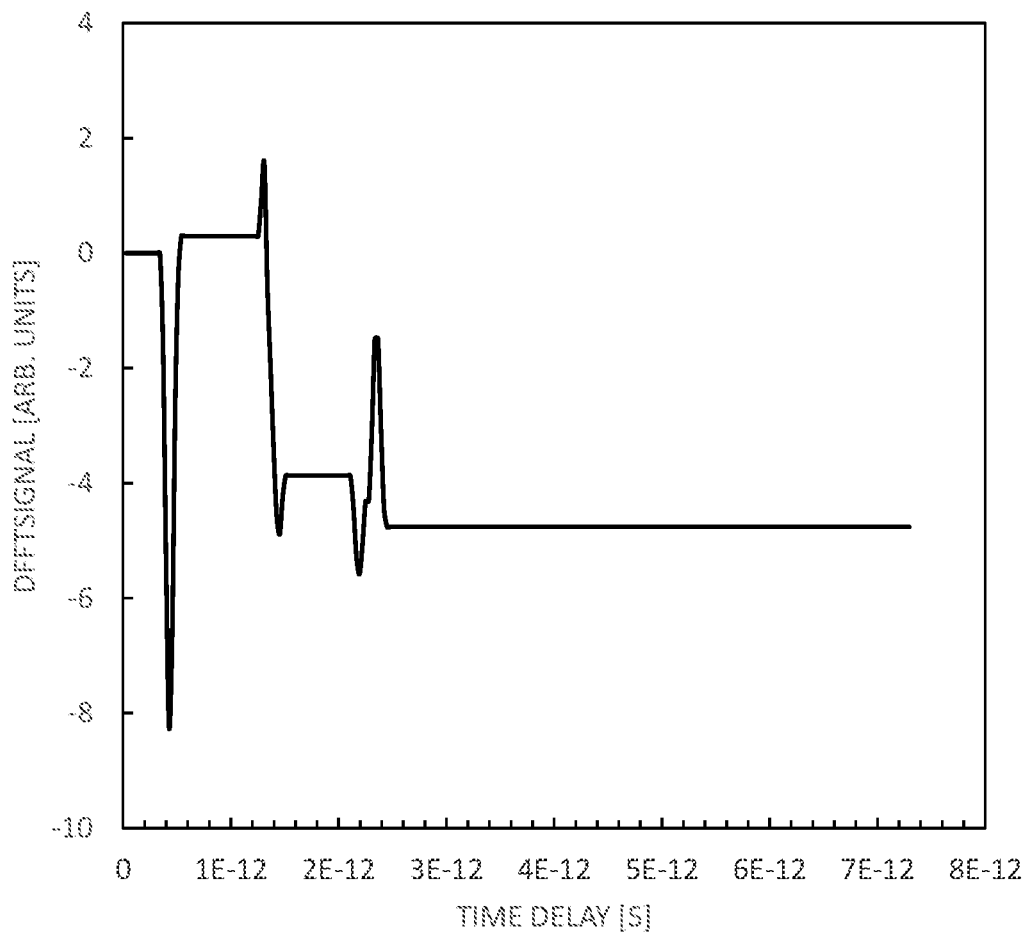

FIG. 76 represents filtered and integrated differential spectrum DFFTDS1 calculated from the spectrum shown in FIG. 75 using parameter Δt=0.010 mm.

Figure 77:
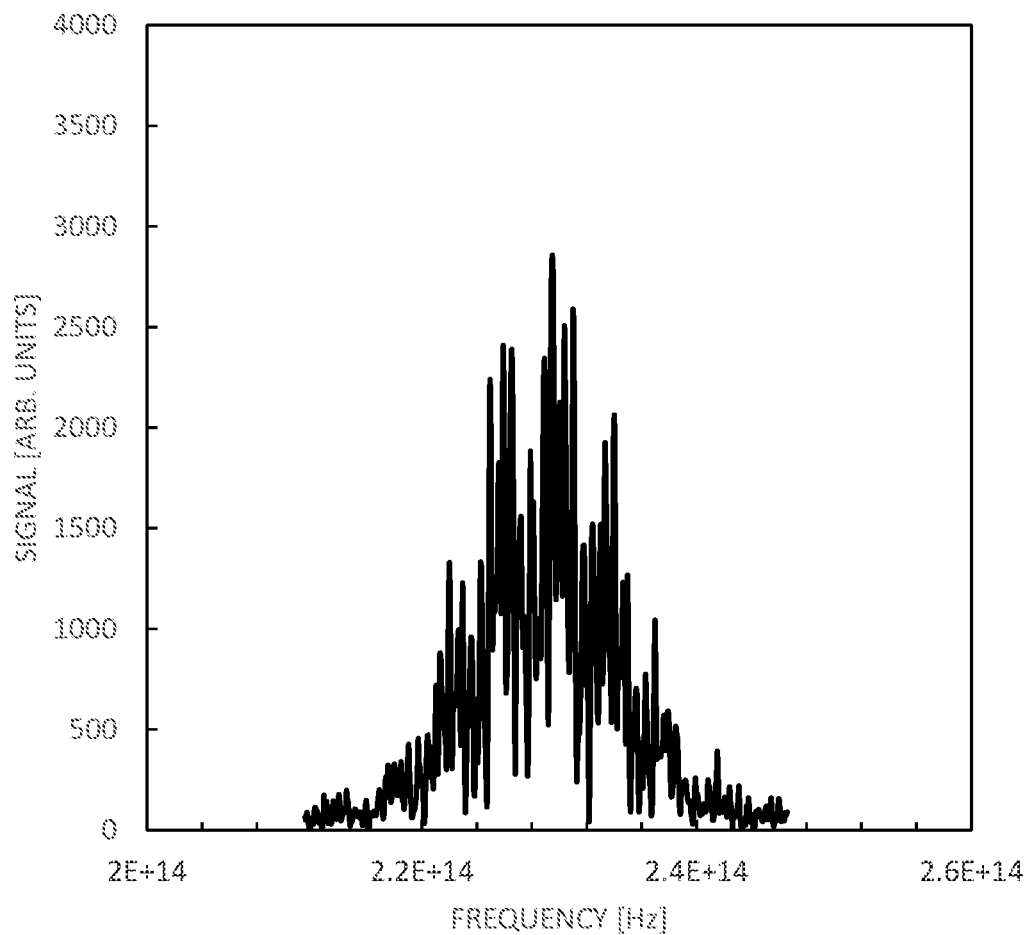

FIG. 77 represents signal recorded by 1D detector being incoherent sum of the reflection signals from the first and the second probe, when the sample is a multilayer sample, and the first probe is positioned at the distance −0.450 mm (negative) from the surface proximal to it. The second probe is positioned at the distance 0.200 mm from the surface proximal to the second probe.

Figure 78:
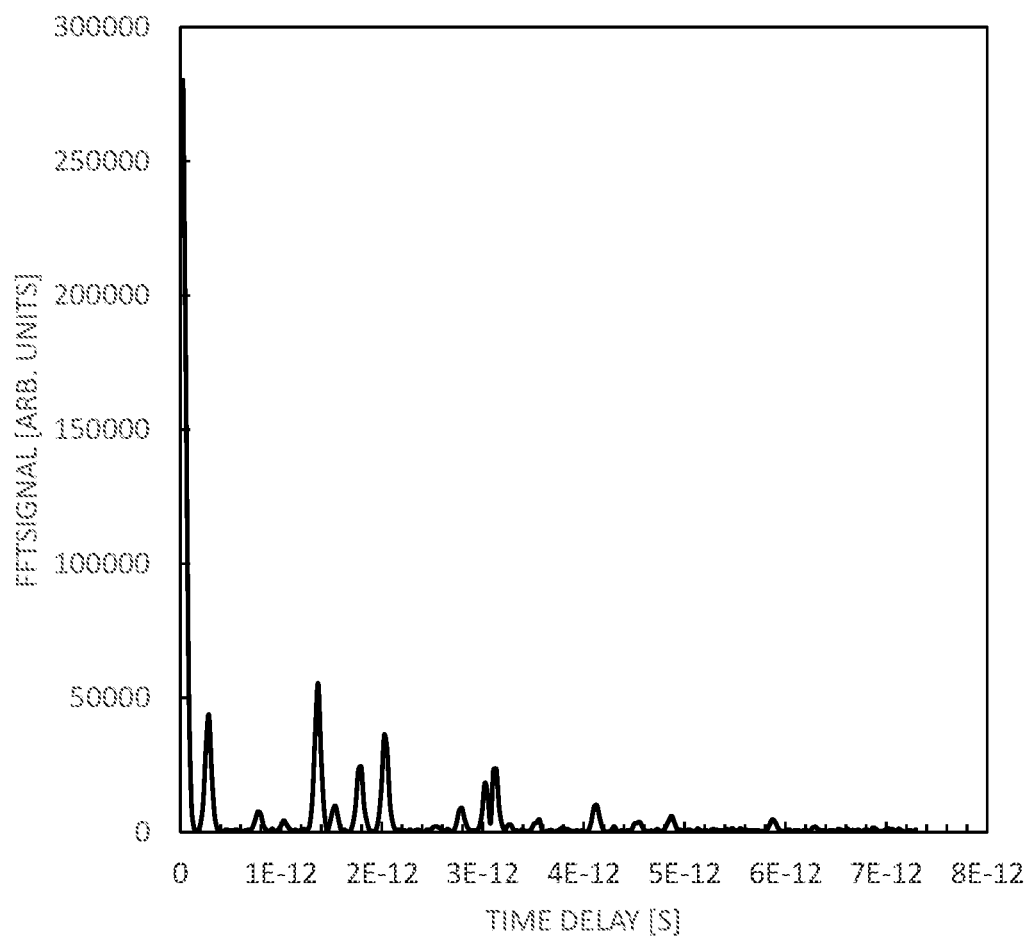

FIG. 78 represents a magnitude of the discrete Fourier transform of the signal shown in FIG. 77.

Figure 79:
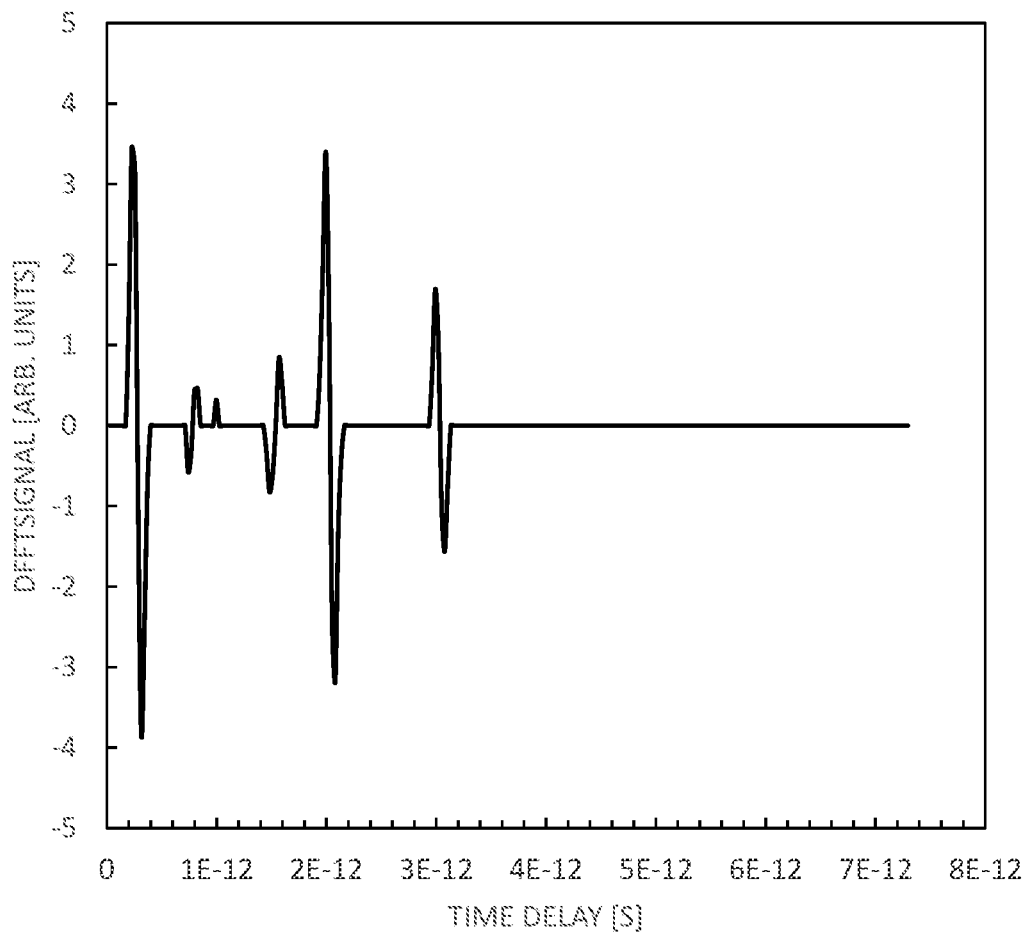

FIG. 79 represents differential spectrum DFFTDS1 calculated from the spectrum shown in FIG. 78 using parameter Δt=0.010 mm.

Figure 80:
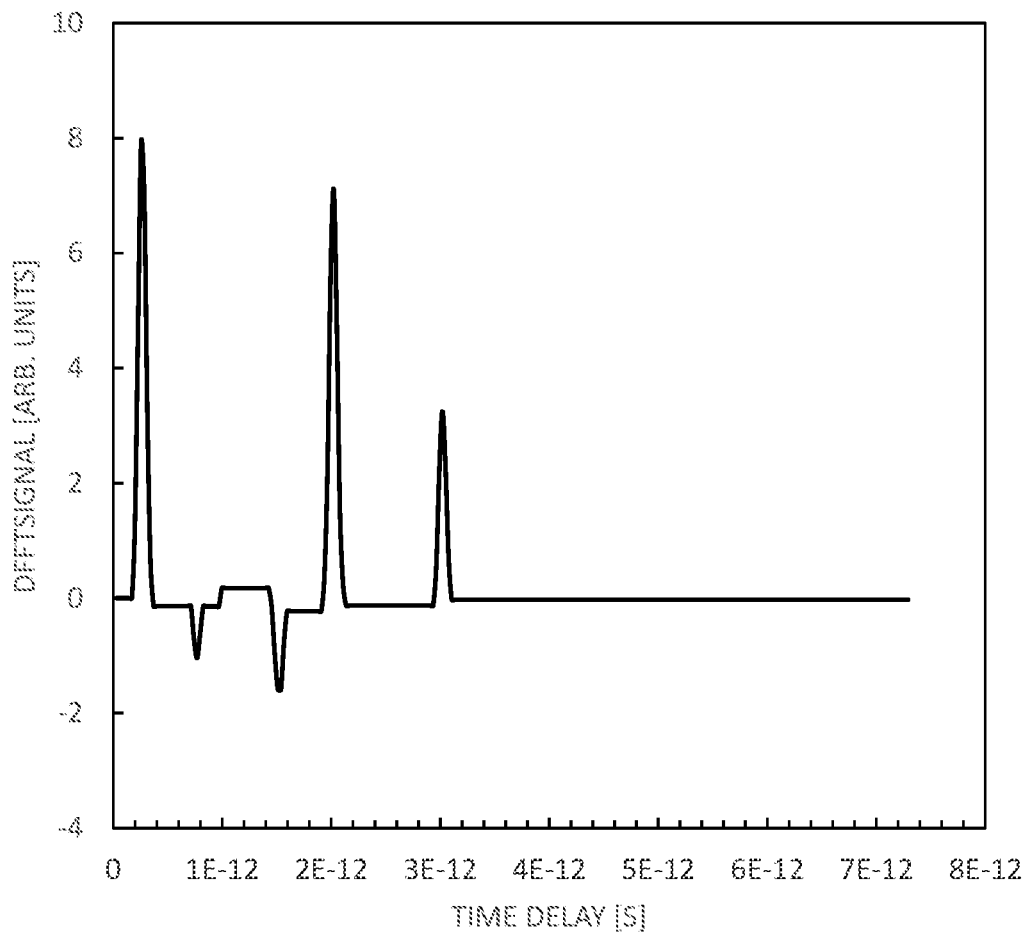

FIG. 80 represents filtered and integrated differential spectrum DFFTDS1 calculated from the spectrum shown in FIG. 79 using parameter Δt=0.010 mm.

Figure 81:
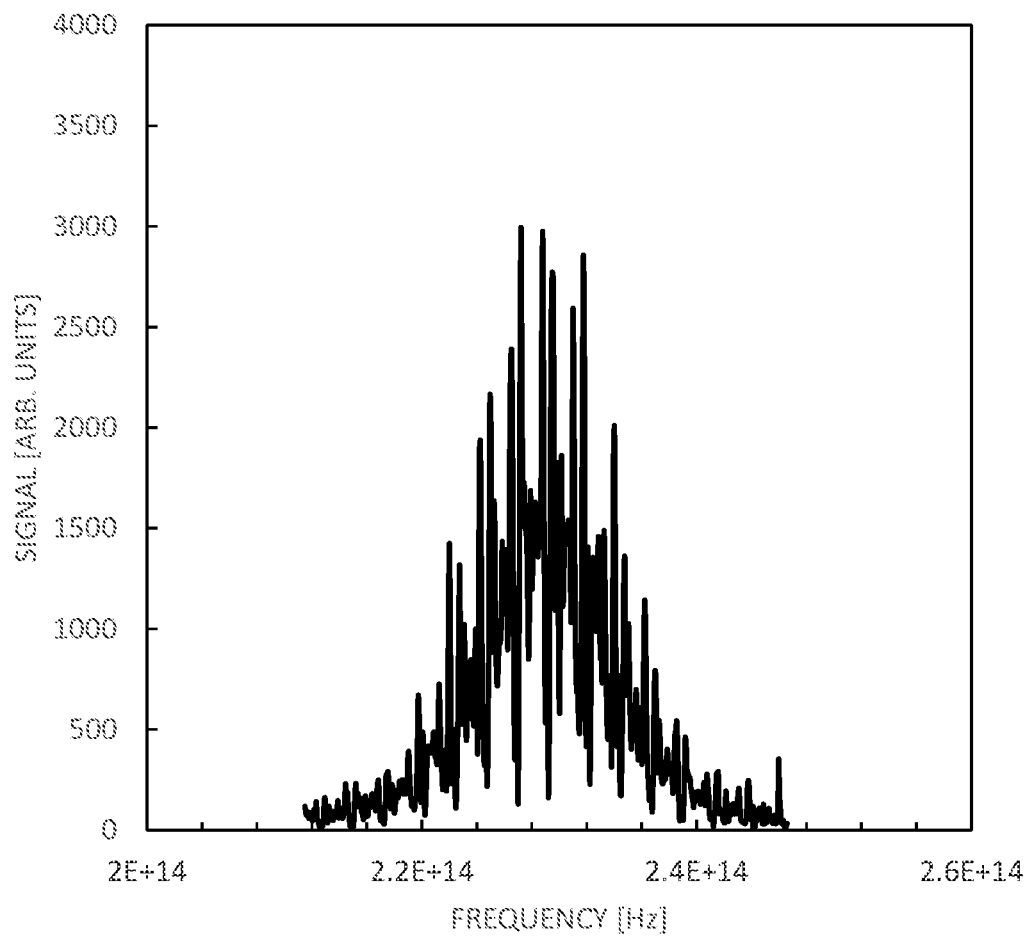

FIG. 81 represents signal recorded by 1D detector being incoherent sum of the reflection signals from the first and the second probe, when the sample is a multilayer sample, and the first probe is positioned at the distance −0.550 mm (negative) from the surface proximal to it. The second probe is positioned at the distance 0.200 mm from the surface proximal to the second probe.

Figure 82:
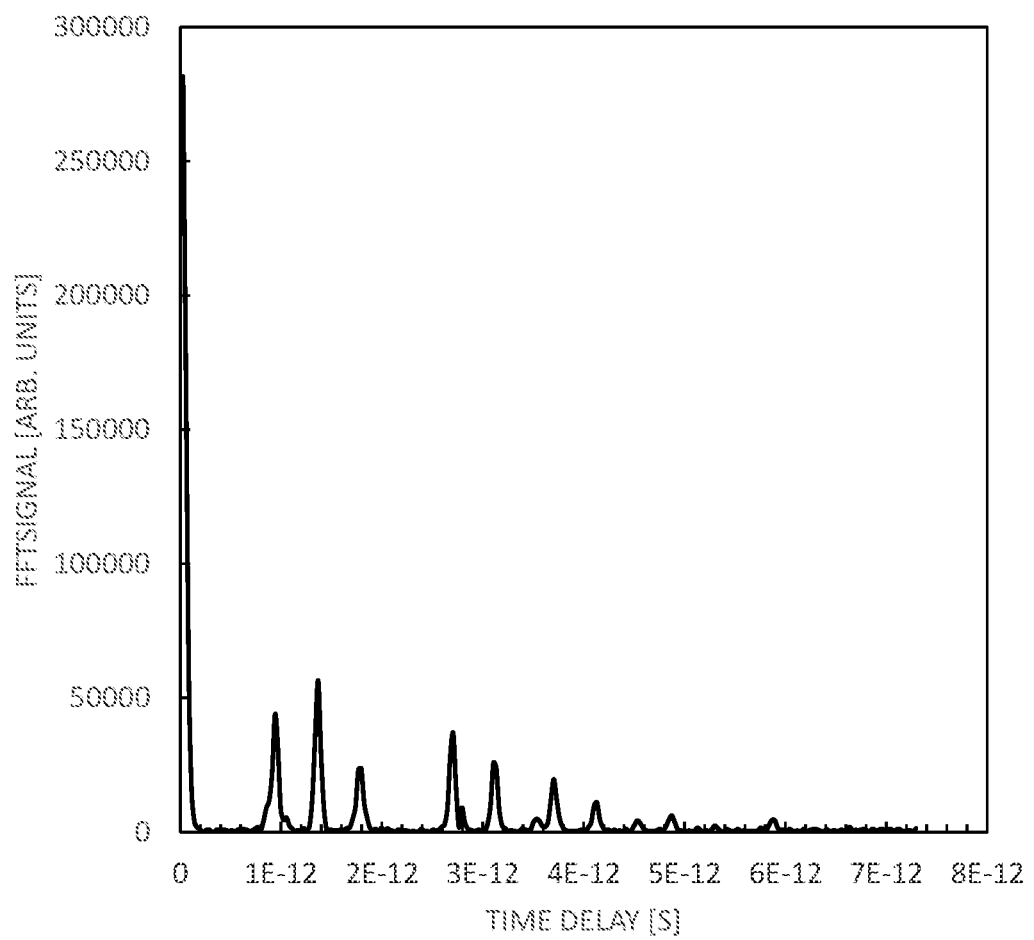

FIG. 82 represents a magnitude of the discrete Fourier transform of the signal shown in FIG. 81.

Figure 83:
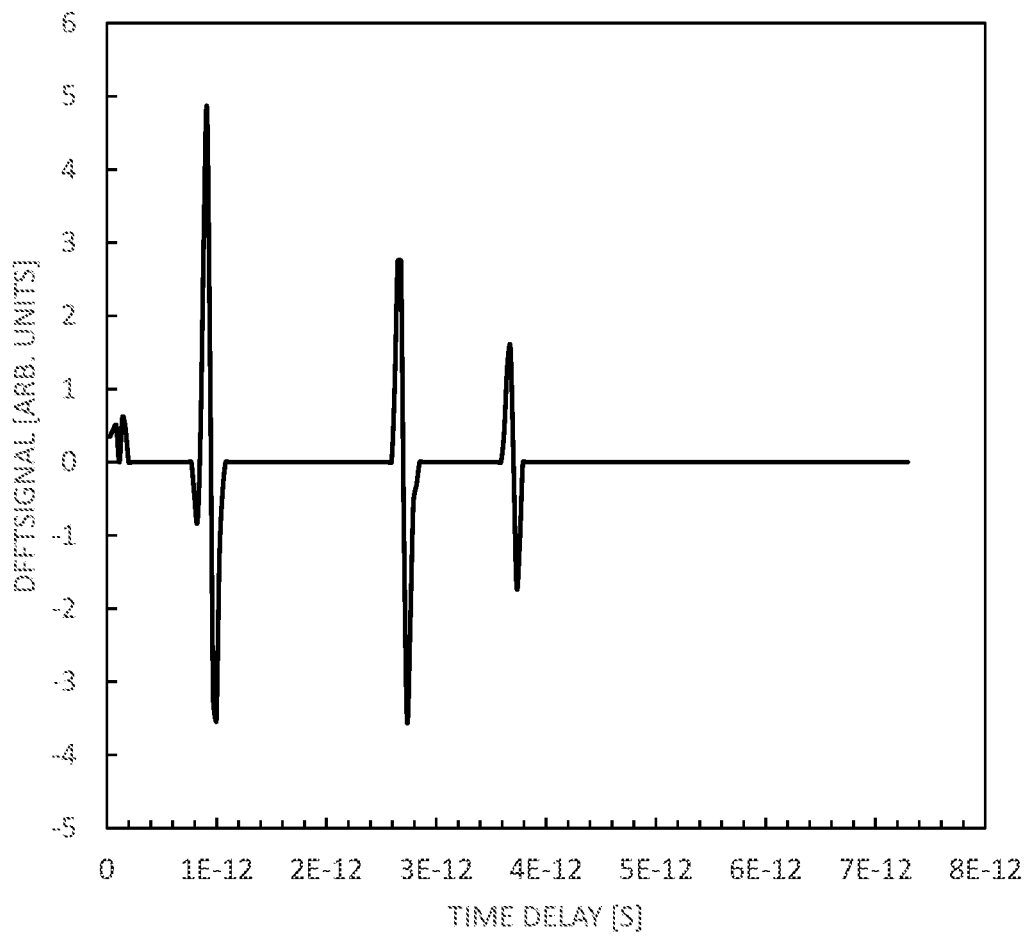

FIG. 83 represents differential spectrum DFFTDS1 calculated from the spectrum shown in FIG. 82 using parameter Δt=0.010 mm.

Figure 84:
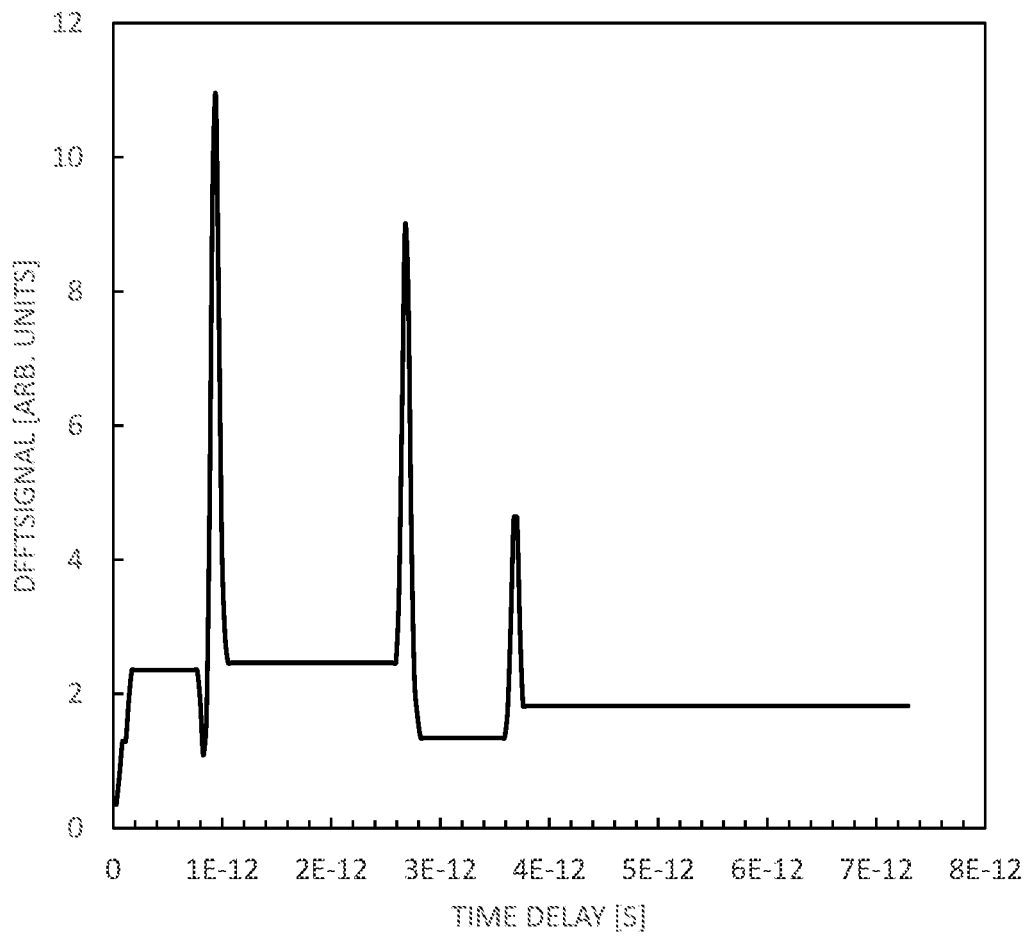

FIG. 84 represents filtered and integrated differential spectrum DFFTDS1 calculated from the spectrum shown in FIG. 83 using parameter Δt=0.010 mm.

Figure 85:
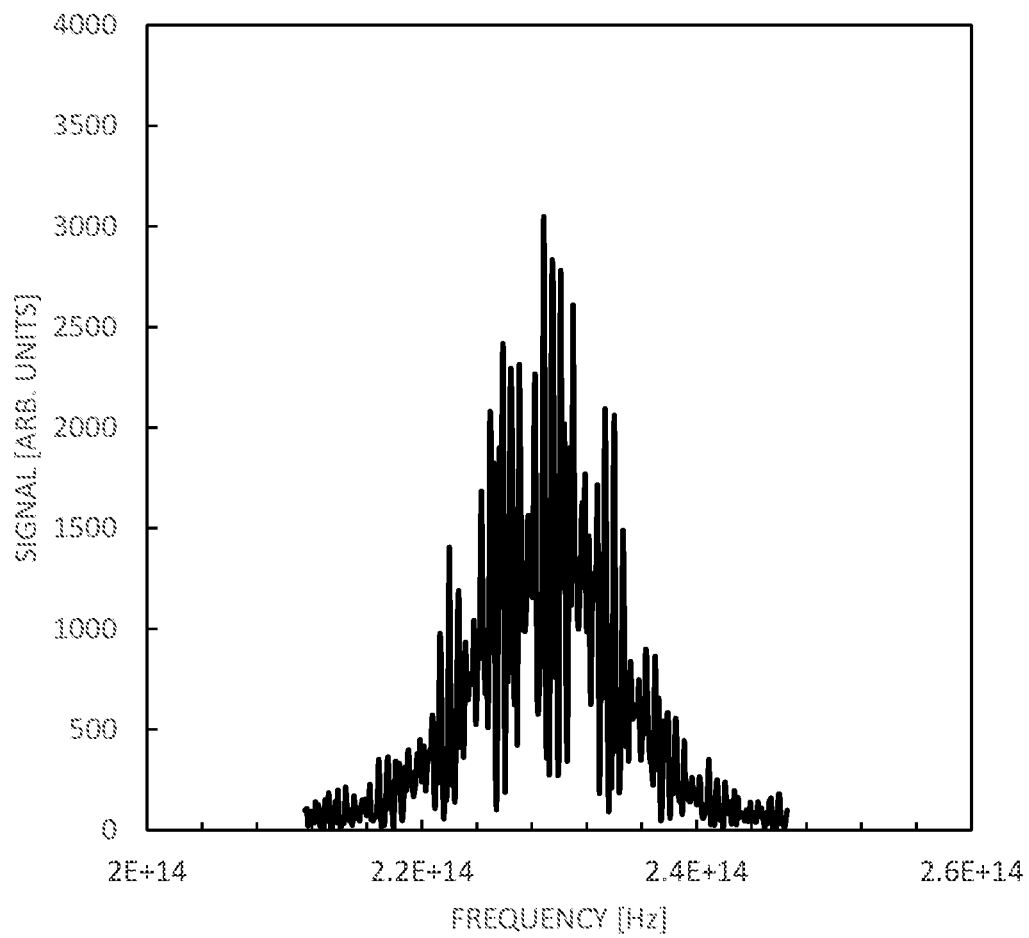

FIG. 85 represents signal recorded by 1D detector being incoherent sum of the reflection signals from the first and the second probe, when the sample is a multilayer sample, and the first probe is positioned at the distance −0.650 mm (negative) from the surface proximal to it. The second probe is positioned at the distance 0.200 mm from the surface proximal to the second probe.

Figure 86:
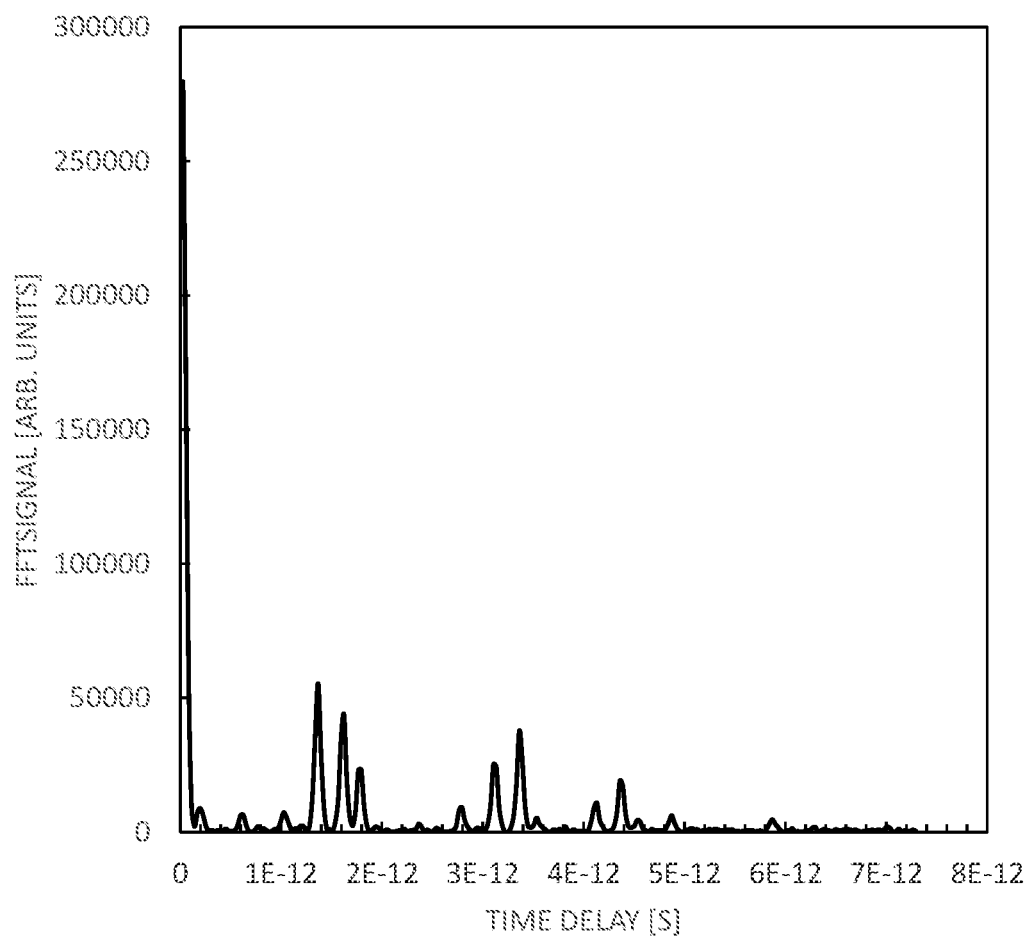

FIG. 86 represents a magnitude of the discrete Fourier transform of the signal shown in FIG. 85.

Figure 87:
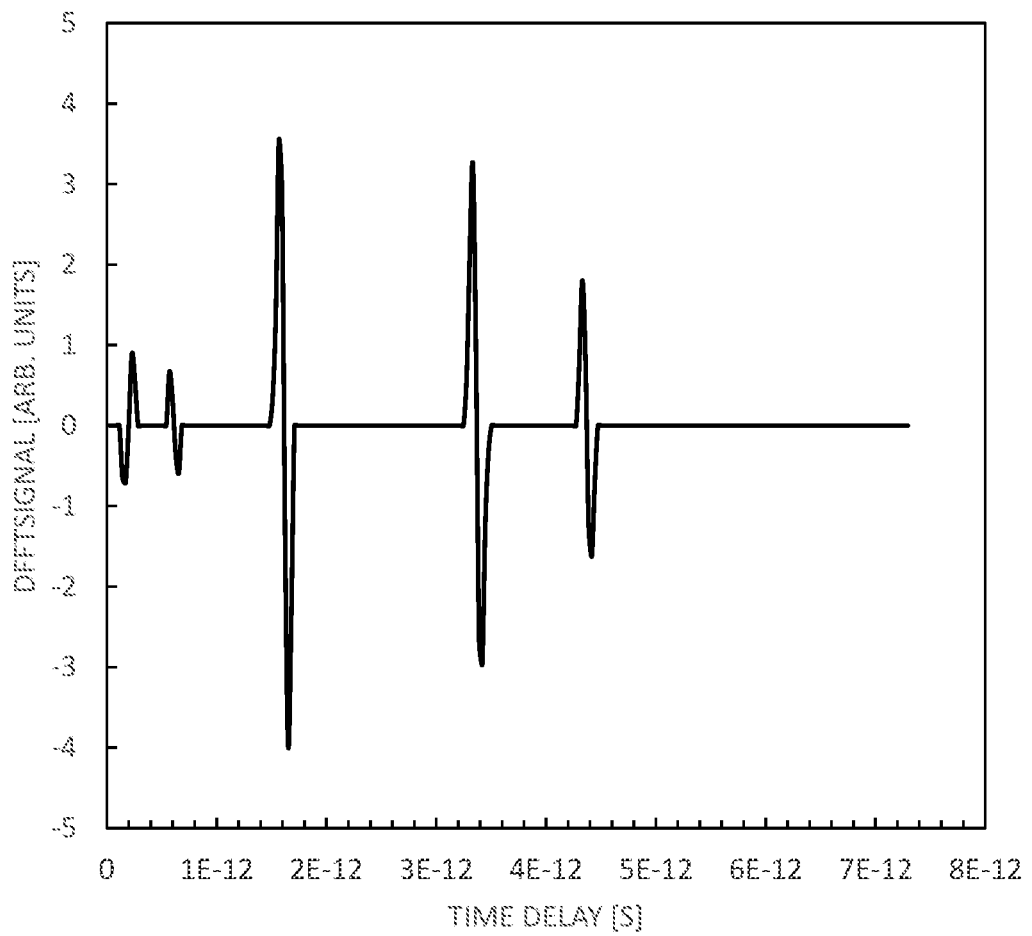

FIG. 87 represents differential spectrum DFFTDS1 calculated from the spectrum shown in FIG. 86 using parameter Δt=0.010 mm.

Figure 88:
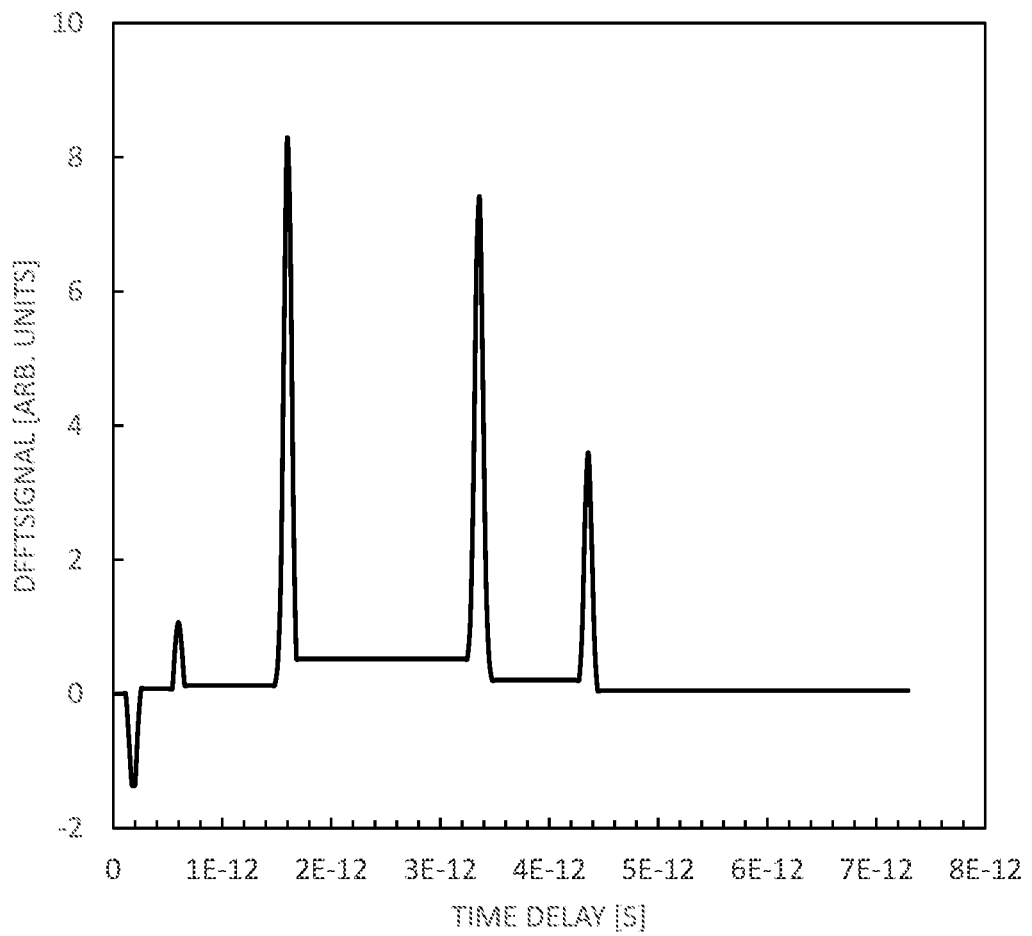

FIG. 88 represents filtered and integrated differential spectrum DFFTDS1 calculated from the spectrum shown in FIG. 87 using parameter Δt=0.010 mm.

DETAILED DESCRIPTION OF INVENTION

Figure 1:
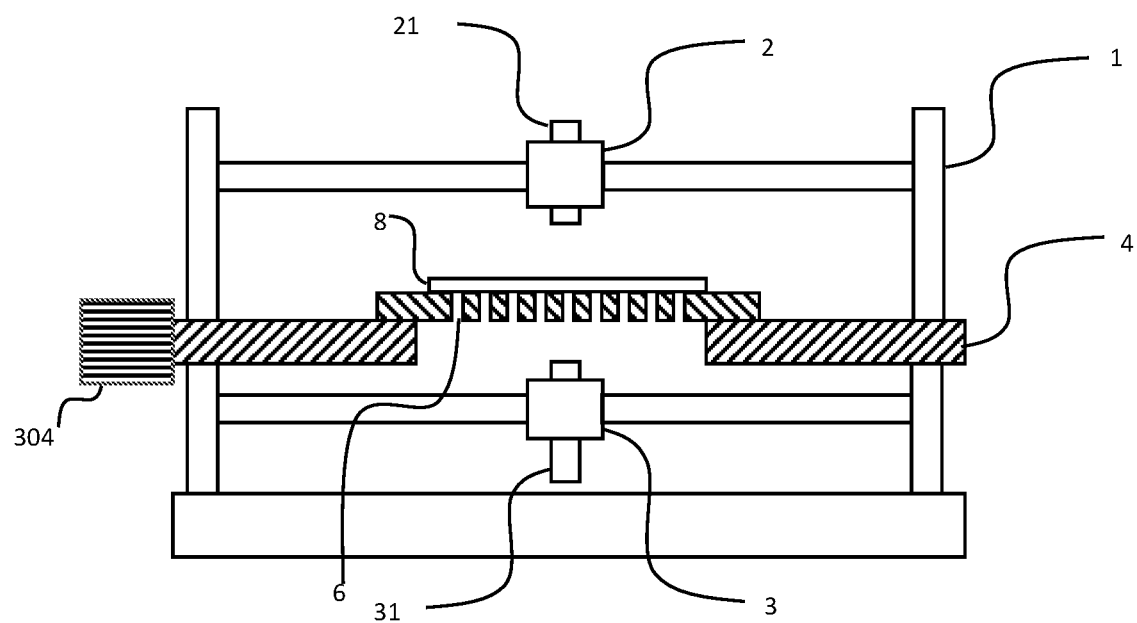
FIG. 1 represents how a sample wafer 8 is positioned on the motorized table 4.

FIG. 1 represents how a sample wafer 8 is positioned on the motorized XY positioning table 4. Table 4 is provided with multiple opening 6 allowing optical access to wafer 8 from both above and below of the wafer. Table 4 is motorized using the motors 304 which are attached to frame 1 of the tool. To the same tool are attached linear motion stages 31 and 21 which position the optical probes 2 and 3 respectively. Stages 31 and 21 can be used to adjust the distance between probes 3 and 2 and the measured sample 8 for purpose of optimizing, and analysis of the optical signal.

Figure 2:
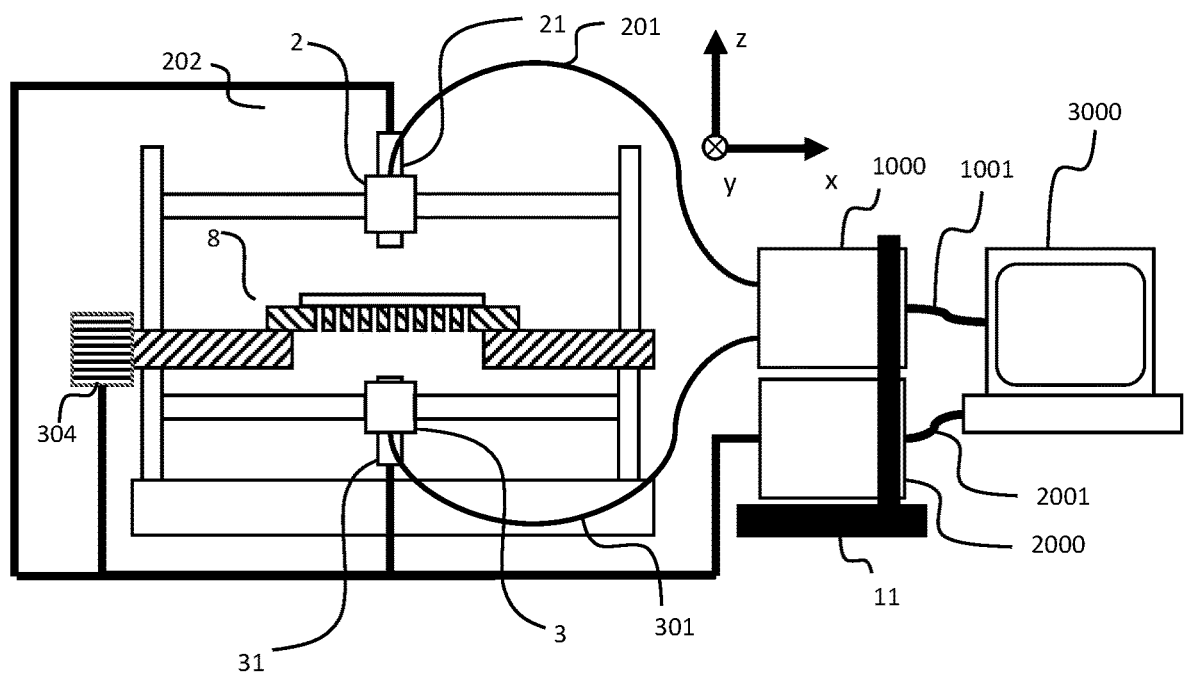
FIG. 2 represents a metrology system including optical and electrical connections.

FIG. 2 represents a metrology system including optical and electrical connections. The optical probes 2 and 3 are connected by optical fibers 201 and 301 to an optical source, data acquisition, and analysis module (OSDAM) 1000. OSDAM 1000 is connected to a controlling computer 3000 by cable 1001. In one embodiment the OSDAM module 1000 is mounted inside the 19-inch rack 12. The motorized stages 21, 31, and motors 304 controlling XY table 4 shown in FIG. 1 are connected to the motion control module (MCM) 2000 by an electrical harness 202. The MCM is connected to computer 3000 using the electrical cable 2001.

Figure 3:
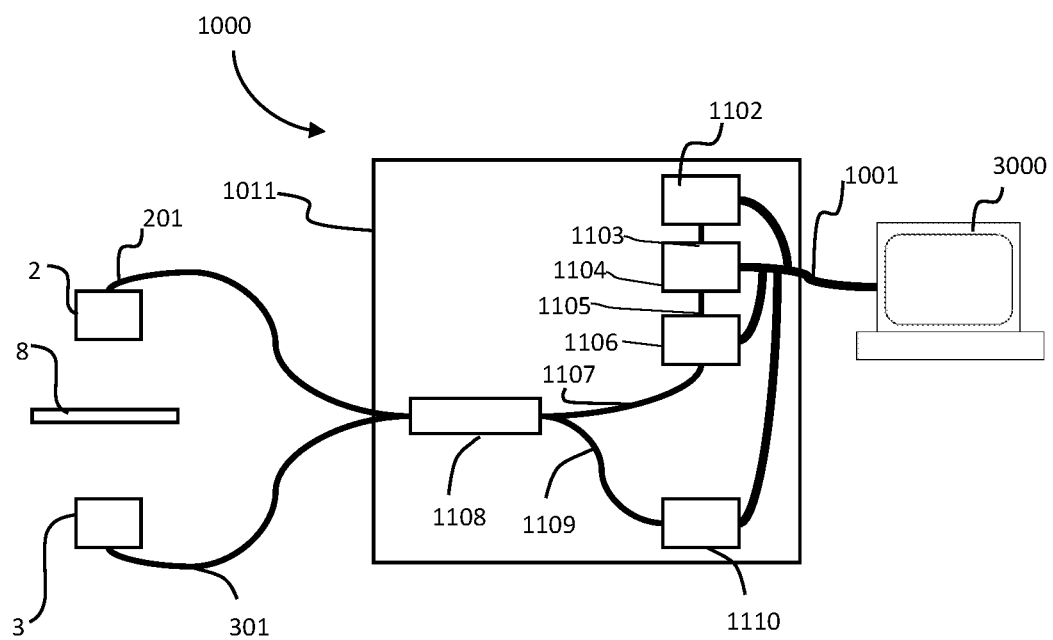
FIG. 3 represents metrology unit 1000 and the way it is connected to probes 3 and 8.

FIG. 3 represents metrology unit 1000 and the way it is connected to probes 3 and 8 and computer 3000. Light source 1110 is connected by an electrical harness 1001 to computer 3000. Computer 3000 controls light source 1110. The light source is producing radiation which is coupled to optical fiber 1109 and directed to 2×2 optical coupler 1108. Optical coupler 1108 is directing radiation to two distinct optical fibers 301 and 201 connected to two optical probes 3 and 2 respectively. Probes 3 and 2 are directing light to sample 8 and collect reflected radiation from sample 8. The reflected radiation from probe 3 is transmitted through the optical fiber 301 to 2×2 optical coupler 1108 and the reflected radiation from probe 2 is transmitted through the optical fiber 201 to 2×2 optical coupler 1108. Radiation reflected from probes 2 and 3 is transmitted from 2×2 optical coupler 1108 through optical fiber 1107 to computer-controlled filter 1106. Filter 1106 is connected through the electrical harness 1001 to computer 3000. Filter 1106 is connected through optical fiber 1105 to the second optical filter 1104. Optical filter 1104 is connected through the electrical harness 1001 to computer 3000. Optical filter 1104 is connected through the optical fiber 1103 to optical computer-controlled spectrograph 1002. The spectrograph 1002 is connected through the optical harness 1001 to computer 3000.

FIG. 4 represents a metrology unit similar as shown in FIG. 3 where the fiber 201 was replaced by a fiberoptic assembly comprising fiber 291 connected to a computer-controlled shutter 1201 connected by optical fiber 1211 to 2×2 optical coupler 1108, and where the fiber 301 was replaced by a fiberoptic assembly comprising fiber 391 connected to a computer-controlled shutter 1301 connected by optical fiber 1311 to 2×2 optical coupler 1108. Computer-controlled shutters 1201 and 1301 are connected through the electrical harness 1001 to the computer 3000.

Figure 5:
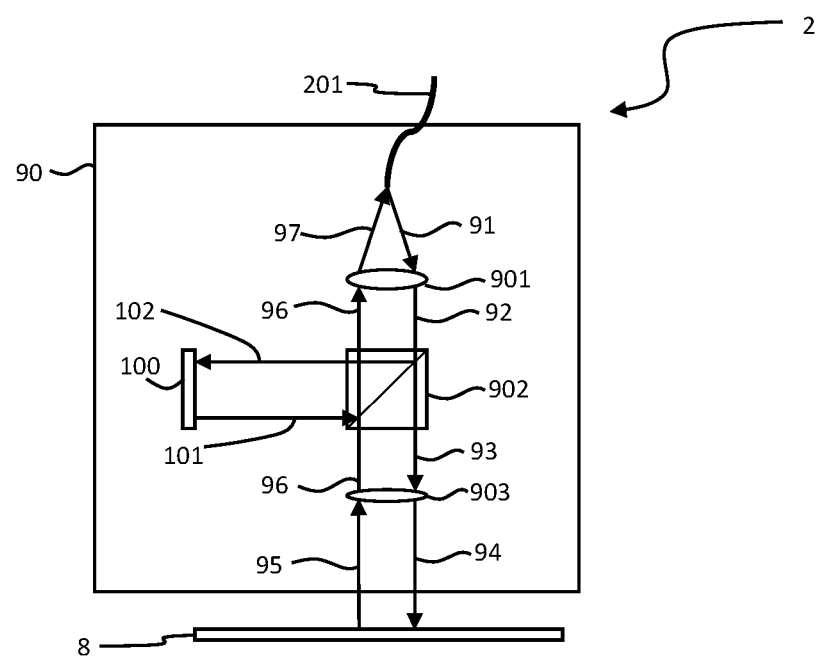
FIG. 5 represents probe 2 when connected to the metrology unit shown in FIG. 3

FIG. 5 represents probe 2 when connected to the metrology unit shown in FIG. 3. The radiation propagates through the optical fiber 201 and is emitted at the end of fiber 201 and forms a divergent beam 91. The divergent beam 91 is collimated by lens 901 and forms collimated beam 92. The collimated beam 92 impinges beam splitter 902. The beam splitter 902 divides beam 92 into two portions: the first portion 102 propagating towards reflector 100 and the second portion 93 propagating through the beam-forming lens 903 and forming beam 94 impinging sample 8. Reflector 100 reflects beam 102 and forms reflected beam 101, while sample 8 reflects beam 94 and forms beam 95. Beam 95 propagates through lens 903 forms beam 96. Beam 96 is combined with optical beam 101 by the beam splitter 902 and the combined beam forms beam 96 impinging lens 901. Beam propagating through lens 901 is forming focused beam 97 which is coupled to the optical fiber 201.

FIG. 6 represents probe 3 when connected to the metrology unit shown in FIG. 4. In this case, the optical fiber 201 is replaced by the optical fiber 291.

FIG. 7 represents the probe with adjustable length of the reference arm $L_{reference}$. The reflector 100 is mounted on linear motion stage 110. The linear motion 110 is connected by the harness 1001 and controlled by computer 3000.

FIG. 8 represents the probe with adjustable optical length of the reference arm $L_{reference}$. Polished and anti-reflection coated plates having preset optical thicknesses are mounted on motorized rotary motion stage 130. The actuator of the rotary motion 110 is connected by the harness 1001 and controlled by computer 3000.

FIG. 9 represents spectrometer for simultaneous measurement of the spectra of radiation emanating from fibers 201, and 301. The radiation emanating from the fiber 201 forms the beam 20000 and impinges the surface of the collimating lens 40000. The radiation emanating from the fiber 301 forms the beam 30000 is impinges the surface of the collimating lens 40000. The lens 40000 is collimating and combining beams 20000 and 30000 and directs the combined beam 50000 towards grating 60000. Grating 60000 diffracts the impinging radiation and produces beam 70000. Beam 70000 is transmitted through the focusing lens 80000. Lens 80000 separates radiation 70000 into two components: the first component 90002 originating from fiber 201, and the second component 90003 originating from fiber 301. Beams 90002 and 90003 form an image in the image plane 100000 and can be measured by the detector or plurality of detectors positioned in plane 100000.

FIG. 10 represents the two-dimensional detector 100001 and recorded spectra. The spectra 100003 and 100002 can be measured by the detector 100001 simultaneously, and since they do not overlap, they can be separately analyzed.

FIG. 11 represents a simulated signal detected by the system shown in FIG. 1 when the optical path of radiation detected by probe 2 differs from than the optical path of the radiation detected by probe 3 by much more than the coherence length of the radiation. The simulated signal is comprising two incoherent contributions from two probes 2, 3, and random noise. It was simulated using Equations (15)-(21) where the following parameters were used:

$f_0=2.29 \cdot 10^{14}$ Hz, $w=3.172 \cdot 10^{12}$ Hz, $A_1=1000$ arb. units, $A_2=1500$ arb. units, $f_1=3.172 \cdot 10^{11}$ Hz, $f_2=9.517 \cdot 10^{10}$ Hz, $\varphi_1=0$, $\varphi_2=0$, $B=100$, $N_0=200$.

FIG. 12 represents the spectrum of the signal when sample 8 is illuminated only by probe 2. It was simulated using prescription given by Equations 15-21 where the following parameters were used:

$f_0=2.29 \cdot 10^{14}$ Hz, $w=3.172 \cdot 10^{12}$ Hz, $A_1=0$ arb. units, $A_2=1500$ arb. units, $f_1=3.172 \cdot 10^{11}$ Hz, $f_2=9.517 \cdot 10^{10}$ Hz, $\varphi_1=0$, $\varphi_2=0$, $B=100$, $N_0=200$, $m_1=0.50$, $m_2=0.40$.

The simulated signal comprises of two incoherent contributions from two probes 2, 3, and random noise, and is simulated by following (1):

$$\text{TotSignal}(f)=|S_1(f)+S_2(f)+\text{Bckg}(f)+N(f)| \qquad (1)$$

where $S_1(f)$ is the term corresponding to probe 2 and is modeled in the simulation by the following formula:

$$S_1(f) = R_1(f)\left[1 + m_1 \cdot \cos\left(\frac{f}{f_1} - \varphi_1\right)\right] \qquad (2)$$

where $m_1$ is modulation depth which depends on reflectivity of sample 8, $f_1$ is the frequency of fringes corresponding to the distance between probe 2 and sample 8, $\varphi_1$ is the phase of these fringes and where $R_1(f)$ is the spectrum of the radiation reflected by probe 2 and depends slowly on the frequency f. For simulation, we modeled it by gaussian:

$$R_1(f) = A_1 e^{-\left(\frac{f-f_0}{w}\right)^2} \qquad (3)$$

In Equation 1y, $A_1$ is the amplitude of the signal reflected from probe 2, w is the spectral width of the light emitted by the light.

Similarly, $S_2(f)$ is the term corresponding to probe 3 and is modeled in the simulation by the following formula $$S_2(f) = R_2(f)\left[1 + m_2 \cdot \cos\left(\frac{f}{f_2} - \varphi_2\right)\right] \qquad (4)$$

where $m_2$ is modulation depth which depends on reflectivity of sample 8, $f_2$ is the frequency of fringes corresponding to the distance between probe 3 and sample 8, $\varphi_2$ is the phase of these fringes and where $R_2(f)$ is the spectrum of the radiation reflected by probe 3 and depends slowly on the frequency f. For simulation, it is modeled by a gaussian with finite offset B:

$$R_2(f) = A_2 e^{-\left(\frac{f-f_0}{w}\right)^2} + B \quad (5)$$

where $A_2$ is the amplitude of the signal reflected from probe 3, w is spectral width of the light emitted by the light source $f_2$ is the frequency of fringes corresponding to the distance between probe 3 and sample 8, $\varphi_2$ is the phase of these fringes.

The background of the detector is modeled by a constant and in this simulation does not depend on frequency:

$$Bckg(f)=B \quad (6)$$

where B=const.

The random noise of the detector, spectrometer, and optical system is $$N(f)=\text{rand}(N_0) \quad (7)$$

where rand(σ) is a random variable having an expected value of 0 and standard deviation $N_0$.

The absolute value operator |.| in (1) assures that the signal does not become negative in the case of very unlikely high noise values produced by the random variable generated in Equation 5y.

FIG. 13 represents the signal presented in FIG. 12 fitted with a gaussian function with the background given by Equation 8y:

$$\widetilde{R_1(f)} = \widetilde{B_1} + \widetilde{A_1} e^{-\left(\frac{f-\widetilde{f_{1,0}}}{\widetilde{w_1}}\right)^2} \quad (8)$$

where $\widetilde{B_1}$, $\widetilde{A_1}$, $\widetilde{f_{1,0}}$, $\widetilde{w_1}$ are fitting parameters and the fitted values of these parameters are:

$\widetilde{B_1}$=143.961 arb. units, $\widetilde{A_1}$=1.49·10³ arb. units, $\widetilde{f_{1,0}}$=2.290·10¹⁴ Hz, $\widetilde{w_1}$=3.077·10¹² Hz.

FIG. 14 represents the signal shown in FIG. 12 fitted with function $$S_1(f) = \widetilde{B_1} + \widetilde{R_1(f)}[1+\widetilde{\tilde{r}_1}\cdot\cos(f\cdot\widetilde{\tilde{s}_1}-\widetilde{\tilde{\varphi}_1})] \quad (9)$$

where $\widetilde{B_1}$, $\widetilde{R_1(f)}$ are defined with Equations 31-35 and where values of $\widetilde{B_1}$, $\widetilde{A_1}$, $\tilde{f}_0$, $\tilde{w}$ are kept constant, and the only fitting parameters are $\widetilde{\tilde{r}_1}$, $\widetilde{\tilde{s}_1}$, $\widetilde{\tilde{\varphi}_1}$. The fitted values of these parameters are:

$\widetilde{\tilde{r}_1}$=−0.524, $\widetilde{\tilde{s}_1}$=1.052·10⁻¹¹ s, $\widetilde{\tilde{\varphi}_1}$=−106.09 rad FIG. 15 represents the spectrum of signal when sample 8 is only illuminated by probe 3. It was simulated using prescription given by Equations 15-21 where the following parameters were used:

$f_0$=2.29·10¹⁴ Hz, w=3.172·10¹² Hz, $A_1$=1000 arb. units, $A_2$=0 arb. units, $f_1$=3.172·10¹¹ Hz, $f_2$=9.517·10¹⁰ Hz, $\varphi_1$=0 rad, $\varphi_2$=0 rad, B=100, $N_0$=200.

FIG. 16 represents the signal presented in FIG. 15 fitted with a gaussian function with the background given by Equation 8y:

$$\widetilde{R_2(f)} = \widetilde{B_2} + \widetilde{A_2} e^{-\left(\frac{f-\widetilde{f_{2,0}}}{\widetilde{w_2}}\right)^2}$$

where $\widetilde{B_2}$, $\widetilde{A_2}$, $\widetilde{f_{2,0}}$, $\widetilde{w_2}$ are fitting parameters and the fitted values of these parameters are:

$\widetilde{B_2}$=117.198 arb. units, $\widetilde{A_2}$=937.631 arb. units, $\widetilde{f_{2,0}}$=2.289·10¹⁴ Hz, $\widetilde{w_2}$=3.193·10¹² Hz.

FIG. 17 represents the signal shown in FIG. 15 fitted with the following function $$S_2(f) = \widetilde{B_2} + \widetilde{R_2(f)}[1+\widetilde{\tilde{r}_2}\cdot\cos(f\cdot\widetilde{\tilde{s}_2}-\widetilde{\tilde{\varphi}_2})]$$

where $\widetilde{B_2} + \widetilde{R_2(f)}$ are defined with Equations 31-35, and where values of $\widetilde{B_2}$, $\widetilde{A_2}$, $\tilde{f}_0$, $\tilde{w}$ are kept constant, and only fitting parameters are $\widetilde{\tilde{r}_2}$, $\widetilde{\tilde{s}_2}$, $\widetilde{\tilde{\varphi}_2}$. The fitted values of these parameters are:

$\widetilde{\tilde{r}_2}$=−0.389, $\widetilde{\tilde{s}_2}$=3.180·10⁻¹², $\widetilde{\tilde{\varphi}_2}$=9.438.

FIG. 18 represents the signal presented in FIG. 15 fitted with a gaussian function with the background given by Equation 10y:

$$\widetilde{R_{Tot}(f)} = \widetilde{B_{Tot}} + \widetilde{A_{Tot}} e^{-\left(\frac{f-\widetilde{f_{Tot,0}}}{\widetilde{w_{Tot}}}\right)^2} \quad (10)$$

where $\widetilde{B_2}$ $\widetilde{A_2}$ $\widetilde{f_{2,0}}$ $\widetilde{w_2}$ are fitting parameters and the fitted values of these parameters are:

$\widetilde{B_{Tot}}$=106.861 arb. units, $\widetilde{A_{Tot}}$=2.449·10³ arb. units, $\widetilde{f_{Tot,0}}$=2.29·10¹⁴ Hz, $\widetilde{w_{Tot}}$=3.181·10¹² Hz.

FIG. 19 represents the signal presented in FIG. 11 fitted with function given by Equation 11y:

$$\widetilde{R_{Tot}(f)} = \widetilde{B_{Tot}} + \frac{\widetilde{A_{Tot}}}{e^{\left(\frac{f-\widetilde{f_{Tot}}}{\widetilde{w_{Tot}}}\right)^2}}[1+\widetilde{r_{1,Tot}}\cdot\cos(f\cdot\widetilde{s_{1,Tot}}-\widetilde{\varphi_{1,Tot}})+\widetilde{r_{2,Tot}}\cdot\cos(f\cdot\widetilde{s_{2,Tot}}-\widetilde{\varphi_{2,Tot}})] \quad (11)$$

where $\widetilde{r_{1,Tot}}$ $\widetilde{s_{1,Tot}}$ $\widetilde{\varphi_{1,Tot}}$ $\widetilde{r_{2,Tot}}$ $\widetilde{s_{2,Tot}}$ $\widetilde{\varphi_{2,Tot}}$ are fitting parameters. The starting fitting values of $\widetilde{r_{1,Tot}}$, $\widetilde{s_{1,Tot}}$, $\widetilde{\varphi_{1,Tot}}$, $\widetilde{r_{2,Tot}}$, $\widetilde{s_{2,Tot}}$, $\widetilde{\varphi_{2,Tot}}$ were $\tilde{r}_2$, $\tilde{s}_2$, $\tilde{\varphi}_2$, $\tilde{r}_1$, $\tilde{s}_1$, $\tilde{\varphi}_1$. The final fitted parameters $\widetilde{r_{1,Tot}}$, $\widetilde{s_{1,Tot}}$, $\widetilde{\varphi_{1,Tot}}$, $\widetilde{r_{2,Tot}}$, $\widetilde{s_{2,Tot}}$, $\widetilde{\varphi_{2,Tot}}$ are:

The values of the fitted parameters are:

$\widetilde{r_{1,Tot}}$=−0.15, $\widetilde{s_{1,Tot}}$=3.185·10⁻¹² Hz⁻¹, $\widetilde{\varphi_{1,Tot}}$=−10.487 rad, $\widetilde{r_{2,Tot}}$=−0.293, $\widetilde{s_{2,Tot}}$=1.050·10⁻¹² Hz⁻¹, $\widetilde{\varphi_{2,Tot}}$=−88.474 rad.

It is important to notice that the value $1/\widetilde{s_{1,Tot}}$=3.140·10¹¹ Hz is a good approximation of $f_1$=3.172·10¹¹ Hz, and similarly the value of $1/\widetilde{s_{2,Tot}}$=9.524·10¹⁰ Hz is a good approximation of $f_2$=9.517·10¹⁰ Hz. Therefore, the method produces results consistent with simulated parameters.

FIG. 20 shows a simulated signal similar to that shown in FIG. 11 where the noise is described by the parameter $N_0$=20 and whose amplitude is 10 times smaller than in the case of the signal shown in FIG. 7. This case more realistically simulates the performance of the actual system. Other than $N_0$ all parameters are the same.

FIG. 21 shows a fitted function in form 31 to the data shown in FIG. 16. In this case, we get $\widetilde{s_{1,Tot}}$=3.153·10⁻¹² Hz⁻¹, or $\widetilde{s_{1,Tot}}$=3.1716·10¹¹ Hz which is a very good approximation of $f_1$=3.172·10¹¹ Hz, and $\widetilde{s_{2,Tot}}$=1.051·10⁻¹² Hz⁻¹, or $1/\widetilde{s_{2,Tot}}$=9.522·10¹⁰ Hz which is a very good approximation of $f_2$=9.517·10¹⁰ Hz.

FIG. 22 shows a multilayer sample 8 comprising two layers layer 81 and layer 82. There are three interfaces in the sample 8: the interface between layer 81 and air denoted by 810, interface between layer 81 and 82 denoted by 812, and the interface between layer 82 and air denoted by 820.

FIG. 23 describes procedure to find differential Fourier transform spectrum using and about the displacement of the first probe comprising following steps:
STEP 1: Physically move the first probe by ΔD1/2, where ΔD1 is of the order of 10% of coherence length of the light propagating through the first probe.
STEP 2: Measure and record spectrum S0.
STEP 3: Move the first probe by ΔD1, where ΔD1 is of the order of 10% of coherence length of the light propagating through the first probe.
STEP 4: Measure and record spectrum S1 STEP 5: Calculate normalized difference between spectra ΔS1= (S0−S1)/ΔD1, when the first probe is displaced by ΔD1.
STEP 6: Calculate discrete Fourier spectrum of the difference of earlier taken spectra DFFTDS1=DFFT (ΔS1). The discrete Fourier transform can be taken directly from difference spectrum ΔS1, or after appropriate apodization and zero padding.
STEP 7: Filter DFFTDS1, as a filter a threshold or other similar filter can be used $$DFFTDS1_i = \begin{cases} DFFTDS1_i, & |DFFTDS1_i| < T \\ 0, & |DFFTDS1_i| \geq T \end{cases} \text{ where } T \text{ is threshold}$$

Integrate filtered spectrum using formula:
STEP 8: Calculate integrated spectrum $IDFFTDS1_i = \Sigma_{j=1}^{i} DFFTDS1_j$.
STEP 9: Find peaks in integrated IDFFTDS2. Peaks can be found using standard peak finding algorithms rejecting peaks which have width smaller than preset value and larger than preset value.

FIG. 24 describes procedure to find differential Fourier transform spectrum using and about the displacement of the second probe comprising similar steps as procedure described in FIG. 25.

FIG. 25 describes algorithm for identification of observed interference from the proximal surface in the reflection spectra comprising following steps:
STEP 1: Position first probe in place where $L_{Sample, Proximal\ interface} > L_{reference}$
STEP 2: Decrease $L_{Sample}$, by Δt where Δt is less than the optical thickness of the thinnest layer by moving probe's motion stage. Record new position of probe's motion stage.
STEP 3: Find peaks in IDFFTDS1 according to FIG. 23.
STEP 4: Check if there is a visible a negative peak in IDFFTDS1. If negative peaks becomes present that means that the proximal interface is at distance shorter than $L_{reference}$, or $L_{Sample, Proximal\ interface} < L_{reference}$. Or that proximal interface is now at distance closer then $L_{reference}$, and at the last step it crossed value $L_{reference}$. If there is not such positive peak keep searching and go to STEP 2.
STEP 5: using last spectrum calculate position of the proximal interface using position of the positive peak and current position of the motion stage.

FIG. 26 The similar algorithm as described in FIG. 25 applied to the second probe.

FIG. 27: describes procedure for finding a multitude of optical interfaces using first probe comprising following steps:

STEP 1: Position first probe in position where $L_{Sample, Proximal\ interface} > L_{reference}$ Set number of interfaces found $M_{found}=0$. At this all peaks in IDFFTDS1 are positive.
STEP 2: Decrease $L_{Sample}$, by Δt where Δt is less than the optical thickness of the thinnest layer by moving the first probe's motion stage. Record new position of the probe's motion stage.
STEP 3: Find peaks in DFFTDS1 according to FIG. 23
STEP 3: Check if there is a new visible ($M_{found}+1$)-th positive peak found in DFFTDS1, which is not caused by the multiple reflection inside the same layer. If there is not such a new peak, continue searching for it and go to STEP 2.
STEP 4: Calculate optical position of number of interface M_found using position of the positive peak having smallest position in of FFTDS1 closest to and the current position of the motion stage Increment number of interfaces found M_found:=M_found+1
STEP 5: Calculate optical position of interface number $M_{found}$ using position of the positive peak having smallest position in IDFFTDS1 closest to and the current position of the motion stage Increment number of interfaces found $M_{found}:=M_{found}+1$.
STEP 6: Check if you found preset number of interfaces. If you did not return to STEP 2.
STEP 7: Report found optical positions of each of $M_{found}$ interfaces.

FIG. 28 describes similar procedure as FIG. 27 for the second probe.

FIG. 29 simulated spectrum containing signal from the first and the second probe. Both probes have golden flat mirrors in their reference arms having complex refractive index equal to 0.44+8.2i, and where the length D=0.250 mm for the first probe, and D=0.200 mm for the second probe, where D is the difference between sample arm length and reference arm length for each of probes. The spectrum of the light fed into the probe illuminating sample has from $2000*exp(-(freq(i)-fcenter)^2/fsigwidth^2)$, where I is a pixel index in our example i=1 . . . 512, and df=3E8*(1/1210E−9−1/1410E−9)/512, and fcenter=3E8/1310E−9; and freq(i)=fcenter+(i−256)*df. Noise and detector dark detector signal were simulated by adding (100+50*randn(1,1)) to the light source spectrum where randn(1,1) is a random number having expectation equal to 1 and standard deviation equal to 1. To avoid occasional negative value of the intensity of the noisy source an absolute value of the source intensity was used in a place of source intensity.

FIG. 30: represents a magnitude of the discrete Fourier transform of the signal shown in FIG. 29, no apodization and no zero padding was used.

FIG. 31 represents differential spectrum DFFTDS1 calculated from the spectrum shown in FIG. 30 using parameter ΔD=0.010 mm. Threshold was 0 (no filtering was used).

FIG. 32 represents nominally filtered and integrated differential spectrum DFFTDS1 calculated from the spectrum shown in FIG. 31 using parameter ΔD=0.010 mm. Threshold was 0 (effectively no filtering was used).

FIG. 33, FIG. 37, FIG. 41, and FIG. 45 show the same signal as in FIG. 29 for different position of the first probe D=0.150 mm, D=0.050 mm, D=−0.050 mm, and D=−0.150 mm respectively. All other parameters remain the same.

FIG. 34, FIG. 38, FIG. 42, and FIG. 46 show the same signal as in FIG. 30 for different position of the first probe D=0.150 mm, D=0.050 mm, D=−0.050 mm, and D=−0.150 mm respectively. All other parameters remain the same.

FIG. 35, FIG. 39, FIG. 43, and FIG. 47 show the same signal as in FIG. 31 for different position of the first probe D=0.150 mm, D=0.050 mm, D=−0.050 mm, and D=−0.150 mm respectively. All other parameters remain the same.

FIG. 36, FIG. 40, FIG. 44, and FIG. 48 show the same signal as in FIG. 32 for different position of the first probe D=0.150 mm, D=0.050 mm, D=−0.050 mm, and D=−0.150 mm respectively. All other parameters remain the same.

FIG. 49 represents signal recorded by 1D detector being incoherent sum of the reflection signals from the first and the second probe, when the transparent sample is a multilayer sample 8 shown in FIG. 22. The thickness the complex refractive index of layers 81, and 82 were equal to 0.100 mm and n=1.5, and 0.075 and n=3.5 respectively. The first probe is positioned at the distance 0.250 mm from the surface 810 proximal to it. The second probe is positioned at the distance 0.200 mm from the surface 820 proximal to the second probe. Noise and detector dark detector signal were simulated by adding (100+50*randn(1,1)) to the light source spectrum where randn(1,1) is a random number having expectation equal to 1 and standard deviation equal to 1. To avoid occasional negative value of the intensity of the noisy source an absolute value of the source intensity was used in a place of source intensity.

FIG. 50 represents a magnitude of the discrete Fourier transform of the signal shown in FIG. 49, no apodization and no zero padding was used.

FIG. 51 represents differential spectrum DFFTDS1 calculated from the spectrum shown in FIG. 50 using parameter ΔD=0.010 mm.

FIG. 52 represents filtered and integrated differential spectrum DFFTDS1 calculated from the spectrum shown in FIG. 51 using parameter ΔD=0.010 mm. Threshold of the filter was set to 0.3.

FIG. 53, FIG. 57, FIG. 61, FIG. 65, FIG. 69, FIG. 73, FIG. 77, FIG. 81, and FIG. 85 show the same signal as in FIG. 49 for different position of the first probe D=0.150 mm, 0.050 mm, −0.050 mm, −0.150 mm, −0.250 mm, −0.350 mm, −0.450 mm, −0.550, and −0.650 mm respectively. All other parameters remain the same.

FIG. 54, FIG. 58, FIG. 62, FIG. 66, FIG. 70, FIG. 74, FIG. 78, FIG. 82, and FIG. 86 show the same signal as in FIG. 50 for different position of the first probe D=0.150 mm, 0.050 mm, −0.050 mm, −0.150 mm, −0.250 mm, −0.350 mm, −0.450 mm, −0.550, and −0.650 mm respectively. All other parameters remain the same.

FIG. 55, FIG. 59, FIG. 63, FIG. 67, FIG. 71, FIG. 75, FIG. 79, FIG. 83, and FIG. 87 show the same signal as in FIG. 51 for different positions of the first probe D=0.150 mm, 0.050 mm, −0.050 mm, −0.150 mm, −0.250 mm, −0.350 mm, −0.450 mm, −0.550, and −0.650 mm respectively. All other parameters remain the same.

FIG. 56, FIG. 60, FIG. 64, FIG. 68, FIG. 72, FIG. 76, FIG. 80, FIG. 84, and FIG. 88 show the same signal as in FIG. 52 for different positions of the first probe D=0.150 mm, 0.050 mm, −0.050 mm, −0.150 mm, −0.250 mm, −0.350 mm, −0.450 mm, −0.550, and −0.650 mm respectively. All other parameters remain the same.

MODE OF OPERATION OF INVENTION

The measurement of thickness of wafer 8 denoted as T can be performed using system presented in FIG. 1 by measuring the distance $h_1$ between probe 2 and the upper surface of the wafer 8 and the distance $h_2$ between probe 3 and the bottom surface of the wafer 8. If the distance between probes D is known, then the thickness of the wafer 8 T is given by:

$$T = D - h_1 - h_2 \quad (12)$$

The distance D between probes can be found by placing the calibration standard block of known thickness $T_{calib}$ between the probes 2 and 3 and measuring the distance between the upper surface of the calibration standard block $h_{1,calib}$, and the distance between the lower surface of the calibration standard block $h_{2,calib}$. Directly from (12) we get the distance between the probes.

$$D = T_{calib} + h_{1,calib} + h_{2,calib} \quad (13)$$

The values of $h_1$ and $h_2$ are found by analysis of the spectral fringes observed in the spectra of the radiation reflected from sample 2 or 3 respectively, as described in the section below.

It is important that measurements of $h_2$ are performed while $h_1$ does not change and similarly that a measurement of $h_1$ is performed when $h_2$ does not change. For person skilled in the art, it is obvious that the same applies to $h_{1,calib}$ and $h_{1,calib}$. This may be a non-trivial task when a single detector is used and when $h_1$ and $h_2$ are time-dependent due to mechanical noise or mechanical motion of measured sample 8.

The fringes in the spectra of light reflected from probes 2, and 3 result in the interference of the radiation propagating in the reference arm of the probe (radiation 102 reflected by the reflector 100 and forming radiation 101) and the radiation propagating through the sample arm of the probe (Radiation 96 transmitted through the lens 93 and forming radiation 94 impinging sample 8, reflected portion of the 94 forms beam 95 which is again transmitted through the lens 903 and forms beam 96) as shown in FIG. 5. An example of the distance probe used in our system is shown in FIG. 5. The radiation entering the probe has electric field $$E_{in}(t) = E_{in}(\omega) e^{-i\omega t} \quad (14)$$

As described in the description of FIG. 5, this beam is split into two portions: a portion impinging sample surface, and a reference arm portion impinging the reference reflective element.

The reflected portion of the sample beam portion of the radiation is of the form $$E_{sample, back\ reflected}(t) = \frac{1}{2} r_{sample} t_{sample\ path} E_{in}(\omega) e^{-i2\pi ft + ik2L_{sample}} \quad (15)$$

where the length of the optical path in the sample beam is denoted as $2L_{sample}$, the amplitude complex reflection coefficient of the sample is denoted $r_{sample}$, and k is the wavevector in vacuum. The change of the phase and transmission for the beam traveling to and reflected by the samples of optical elements residing in the sample arm including portion of beam-splitter, and lenses. By the length of the optical path, we understand the physical length of the light corrected by a factor of 1/n for the portion of the path when optical beam travels through the medium having optical refractive index n.

Similarly, the electric field of optical radiation back reflected from the reference beam is given by:

$$E_{reference,\,back\,reflected}(t) = \frac{1}{2} r_{reference} t_{reference\,path} E_0(\omega) e^{-i2\pi ft + ik2L_{reference}} \quad (16)$$

where the length of the optical path in reference beam is denoted as $2L_{reference}$, the amplitude complex reflection coefficient of the reference reflection element is denoted $r_{reference}$, the complex transmission coefficient $t_{referencepath}$ describes changes of phase and amplitude of the reference beam due to presence of optical elements in the reference arm.

Both the reference and sample beams are recombined by beam-splitter 902 shown in FIG. 5. The resulting beam intensity is given by:

$$I_{total,reflected} = \langle |E_{sample,backreflected}(t) + E_{reference,backreflected}(t)|^2 \rangle \quad (17)$$

By combining Equations 14y through 17y, we get $$I_{total,\,reflected} = \left(\frac{1}{4}|r_{sample} t_{sample\,path}|^2 + \frac{1}{4}|r_{reference} t_{reference\,path}|^2 + \frac{1}{4}\tilde{b}\cos(k2(L_{reference} - L_{sample}))\right)I_{in} \quad (18)$$

where $I_{in}$ is the intensity of light entering probe, and $\tilde{b} = r_{sample} t_{samplepath} r_{reference} t_{referencepath} + (r_{sample} t_{samplepath} r_{reference} t_{referencepath})^*$ where the second summand is the complex conjugate of the first.

Since factors $r_{sample}$, $t_{samplepath}$, $r_{reference}$, $t_{referencepath}$ are slowly varying functions of the frequency of radiation used in our system, and since $k=2\pi f/c$, we can express the frequency dependent reflection function of the probe as:

$$R_{DP}(f) = I_{total,reflected}/I_{in} \quad (19)$$

or using (17) and (18) we get $$R_{DP}(f) = A(f) + B(f)\cos\left(\frac{2 \cdot 2 \cdot \pi \cdot f}{c}(L_{reference} - L_{sample}) + \varphi(f)\right) \quad (20)$$

where $A(f)$, $B(f)$, and $\varphi(f)$ are slowly varying functions of $\omega$, where "slowly varying" means that their values vary less than 10% the spectral width of the bandwidth of low coherence light source 1102 shown in FIG. 3. Since the probe is employing low coherence light sources having central wavelength in range 800-2000 nm, and bandwidth is typically 5% and always smaller than 20% of the central wavelength, we can replace slowly varying functions $A(f)$, $B(f)$, and $\varphi(f)$ by some constants equal to their values at the central wavelength of light source: A, B, and $\varphi$ respectively. If in addition, we introduce a new parameter characterizing frequency of the fringes in the reflectance spectrum of the distance probe:

$$F_{DP} = \frac{c}{2 \cdot (L_{reference} - L_{sample})} \quad (21)$$

Using (21) we can rewrite (20) in the form $$R_{DP}(f) = A + B\cos(2\pi f/F_{DP} + \varphi) \quad (22)$$

The reflectance spectrum of the probe R(f) exhibits fringes in spectral domain spaced by $|F_{DP}|$.

Fringes in the reflectance spectrum of the probe are discussed also in FIG. 10 and FIG. 10.

The spacing between fringes $$\Lambda = |F_{DP}| \quad (23)$$

can be found using many well-known numerical methods including but not limited to best fit, zero crossing and Fourier techniques. The spacing between fringes can be used to find distance between the probe and the sample using Equation 21. By (23) we can assure that the sign of $F_{DP}$ is positive by gradually increasing $L_{sample}$ by moving it by the means of the motion stage 21 in case of the probe 2 and 31 in case of the probe 3 from the initial position $L_{sample}=L_{reference}$ until the interference between radiation traveling in the sample and in the reference arm is observed. Alternatively In Equation 10 we can assure that the sign of $F_{DP}$ is negative by gradually decreasing $L_{sample}$ by moving it by the means of the motion stage 21 in case of the probe 2 and 31 in case of the probe 3 from the position $L_{Sample} \gg L_{reference}$, where sign ">>" means much more than the coherence length of the radiation, until the interference between radiation travelling in the sample and in the reference arm is observed.

If sign and absolute value of quantity $F_{DP}$ is known, then the value of $F_{DP}$ is known. Then we can find $L_{sample}$ from Equation 10:

$$F_{DP} = \frac{c}{2 \cdot 2\pi(L_{reference} - L_{sample})} \quad (24)$$

$$L_{sample} = L_{reference} - \frac{c}{2 \cdot 2\pi \cdot F_{DP}} \quad (25)$$

Usually, $L_{reference}$ does not change during the measurement, and it forms a constant offset to the measured value of $L_{sample}$. People skilled in the art will notice that this constant offset $L_{reference}$ defines a reference plane in the topography measurements and does not affect the values of measured bow and warp, waviness, or other commonly used parameters.

Thickness measurement using fringes generated by a two or more probes is described below. When measuring thickness of the wafer $L_{sample}$ corresponds to (has value equal to) $h_1$ for probe 2 and $h_2$ for probe 3 as used in the Equation 1. Equation 2 shows how the absolute thickness of the wafer can be calculated when $h_1$, $h_2$, $h_{1calib}$, and $h_{2calib}$ are known.

The effect of the vibration on measured thickness can be reduced by simultaneous measurement of the spectra of the radiation reflected by probes 2, 3. This is the subject of this invention.

In the first embodiment of this invention, one can simply use as two one channel spectrographs which are synchronized and detect radiation reflected by probes 2 and 3 simultaneously.

In the second embodiment of this invention, one can use one two-channel spectrographs detecting radiation reflected by probes 2 and 3 simultaneously. An example of such a two-channel spectrograph is shown in FIG. 9x. The two-channel spectrograph is equipped with two separate and synchronized linear detectors positioned in the focal plane 100000 and detecting spectra projected by beams 90003 and 90002.

In the third embodiment of this invention, one can use one two-channel spectrograph detecting radiation reflected by probes 2 and 3 simultaneously. An example of such a two-channel spectrograph is shown in FIG. 9x. The two-channel spectrograph is equipped with a single two-dimensional (array) detector 100001 simultaneously detecting spectra 100003 and 100002 shown in FIG. 10 projected by beams 90003 and 90002 respectively.

The fourth embodiment of this invention employs an OSDAM shown in FIG. 3 and FIG. 4. In this design, the absolute value of the difference of the optical paths of the of the radiation propagating through probe 2 and 3 is much larger or the coherence length of radiation. This assures that the radiation reflected from probes 2 and 3 is added by 2×2 coupler as incoherent sum. The radiation reflected from the probe 2 and the radiation reflected by probe 3 propagating through fiber 1107 do not interfere one with another. The filtered spectrum of this radiation is detected by a single channel spectrograph 1102 equipped with a single linear detector. Since the signals originating from probes 2 and 3 are separated by much more than the coherence length of the light source when they are combined by 2×2 coupler 1108 their intensity spectra add as spectra from two incoherent sources without interference (without producing additional interference fringes). The detected spectrum by the detector of the spectrograph 1102 is a sum of spectra produced by the radiation reflected from sample 2 and 3. FIGS. 11-19 explain how the signal detected by this single channel spectrograph can be analyzed and how the spacing between the interference fringes in the spectra of the light reflected by the probe 2 and 3 which are $\Lambda_2$, and $\Lambda_3$. or alternatively the frequency of the fringes in frequency space be measured simultaneously. When $\Lambda_2$ and $\Lambda_3$ are known then $h_1$, $h_2$ can be found as shown above and after performing calibration with calibration standard block thickness of the measured sample can be found using (1).

FIG. 7 represents the signal generated by radiation reflected from probes 2 and 3. It is possible to analyze this signal using Fourier methods and well as using fitting the measured spectra to simulated data. The latter approach offers the advantage of providing more accurate result when very few oscillations are visible in the observed spectrum. First we will describe the fitting method.

The spectrum presented in FIG. 11 is usually modeled using many parameters whose number is typically exceeding eight. The direct application of the standard procedure minimizing chi-square such as Simplex, or Levenberg-Marquardt methods having many fitting parameters often leads to poor convergence or convergence to local minima not corresponding to actual physical parameters including fringe spacings $\Lambda_2$, and $\Lambda_3$. We describe a robust method of finding fringe spacings $\Lambda_2$, and $\Lambda_3$ by means of the procedure consisting of the following steps:

Step A: Finding approximate value of $\Lambda_3$ using the signal reflected from the second probe by measurement and analysis of the first signal alone by system employing an OSDAM shown in the FIG. 12 where the signal from the first probe can be selected by optical switches 1201 and 1301:
  I. initially fitting an envelope function to the spectrum reflected from the second probe as shown in the FIG. 9
  II. using the fitted envelope parameters as starting parameters to fit the entire spectrum from the second probe including oscillations produced by interference between the sample and the reference arm. This step produces fitted spectrum of the radiation reflected from the first probe as shown in FIG. 14.

Step B: finding the approximate value of $\Lambda_2$ using signal reflected from the first probe by measurement and analysis of the first signal alone by system employing an OSDAM shown in the FIG. 15 where the signal from the first probe can be selected by optical switches 1201 and 1301:
  i. initially fitting an envelope function to the spectrum reflected from the first probe as shown in the FIG. 12
  ii. using the fitted envelope parameters as starting parameters to fit the entire spectrum from the first probe including oscillations produced by interference between the sample and the reference arm. This step produces fitted spectrum of the radiation reflected from the first probe as shown in FIG. 13.

Step C: Fitting the entire signal shown in FIG. 11 using starting parameters found in the steps A(ii) and B(ii) above. This step results in the signal shown in FIG. 15.

The method outlined in steps A-C is much more robust than fitting a large number (more than eight) of parameters directly to spectrum shown in FIG. 7.

A similar fitting procedure can be used when the system employs an OSDAM shown in FIG. 3. In this case one can eliminate fringes corresponding to probe 2 by moving it physically by means of the motion stage 21 away from the sample 8 until interference fringes in spectrum of the radiation reflected by the probe 2 become unresolved by the spectrograph 1102. Similarly, one can eliminate fringes corresponding to probe 3 by moving it physically by means of the motion stage 31 away from the sample 8 until interference fringes in spectrum of the radiation reflected by the probe 3 become unresolved by the spectrograph 1102. The spectra with eliminated fringes require less parameters to fit and the fit is less likely to result in the wrong local minimum.

When values of $\Lambda_2$, and $\Lambda_3$ are close one can avoid danger of misassigning value of $\Lambda_2$, and $\Lambda_3$ by slightly changing the distance between probe 2 and sample 8 by means of stage 21. This change will affect only value of $\Lambda_2$ while value of $\Lambda_3$ will remain unchanged. This way, one can uniquely identify which of the measured values of $\Lambda_2$, and $\Lambda_3$ belongs to probe 2 or 3.

If a sample comprises of several layers such as in the sample shown in FIG. 22 the radiation spectrum corresponding to probe 2 and probe 3 may exhibit a plurality of oscillations corresponding to interference of signal and reference radiation corresponding to reflections from the external and internal boundaries as well as Fabry-Perot fringes due to multiple reflections between layer boundaries in the sample.

One possible method of eliminating effects on signal generated by probe 2 on reflection from internal layers (such as layer 812, and layer 820 respectively shown in FIG. 18), similarly and effects on signal generated by probe 3 on reflection from internal layers (such as layer 812, and layer 810 respectively shown in FIG. 18), is to use radiation of such wavelength for which layers 81 and 82 are not transparent.

Another method which allows identification of the fringes in the reflected spectrum by probe 2 originating from the interference of the radiation reflected from the reference arm of the probe and front surface 810 comprises of following steps:

STEP 1: Increase the initial distance between the distance between sample 8 and the probe 2 by means of motion stage 21 to such position when the fringes originating from the interference between sample and reference arms are no longer resolved by spectrograph 1102.

STEP 2: Gradually decrease the distance between probe 2 and 8 by a known amount until the oscillations from the interference between sample and reference arm become visible. These oscillations are related to interference between radiation reflected from the interface 810 and reflected by the reference arm. These oscillations are uniquely identified since the interface 810 is the closest interface to probe 2.

STEP 3a: Calculate of the new position of the surface 810 using measured $L_{sample}$ and information about the amount of translation of the stage in STEP 1 and STEP 2 one can measure the absolute position of the sample.

STEP 3b: Replace the measured sample by a reference surface such as a reference flat and comparing the position of the surface 810 to the position of the well-known reference surface.

Person skilled in art will notice that the similar procedure can be applied to probe 3. In this case measurement of the position of the interface 820 is consists of the following steps:

STEP 1: increase the initial distance between the distance between sample 8 and the probe 3 by means of motion stage 31 to such position when the fringes originating from the interference between sample and reference arms are no longer resolved by spectrograph 1102.

STEP 2: Gradually decrease the distance between probe 2 and 8 by a known amount until the oscillations from the interference between sample and reference arm become visible. These oscillations are related to the interference between radiation reflected from the interface 820 and reflected by the reference arm. These oscillations are uniquely identified since the interface 820 is the closest interface to probe 3.

STEP 3a: Calculate of the new position of the surface 820 using measured $L_{sample}$ and information about the amount of translation of the stage in STEP 1 and STEP 2, one can measure the absolute position of the sample.

STEP 3b: Replace the measured sample by the reference surface such as a reference flat. And comparing position of the surface 820 to the position of the well-known reference surface.

A similar method can be used to detect position of the interface 812. If one would like to detect and identify position of the interface 812 using probe 2, then after detecting position of the interface 810 by probe 2 in Step 3a above one can continue decreasing the distance between the probe and sample until in addition to oscillations corresponding to the interference of the radiation reflected by reference arm and surface 810 having spacing $F_{DP,810}$, a new set of oscillations corresponding to interference of the radiation from the reference arm and radiation reflected from interface 812 having spacing $F_{DP,812}$ can be observed. People skilled in art will notice that the difference between frequency of these fringes can be used to calculate the optical thickness of the slab 81. Directly from Equation 14 we get the following expression for the optical thickness $T_{optical}$ of the layer 81:

$$T_{optical} = \frac{c}{2 \cdot 2\pi \cdot F_{DP,812}} - \frac{c}{2 \cdot 2\pi \cdot F_{DP,810}} \quad (26)$$

Where the optical thickness is defined as the product of the thickness of the medium and the group velocity of the radiation propagating in this medium.

Other method of measurement of position of the surfaces proximal to probes are described in FIG. 29-48. Initially as shown in FIG. 29-33 probes are positioned distance such that the reference arms of each probe are shorter than distance to sample. The Fourier spectrum of the radiation detected on 1D detector employed by the spectrometer reveals two peaks corresponding to the signals generated by the first and the second probe. One can identify which peak corresponds to the first probe by translating probe as shown in the FIG. 30, and FIG. 31. One can also precisely find distance when the interface resides at the distance equal to the length of the reference arm by observing change of the sign the sign of the integrated peak in the IDFFTDS1 signal following procedure described in FIG. 23-FIG. 28. Equation (21)-(23) imply that spacing between fringes decreases as a function of D for D>0 and decrease for D<0. Therefore, one can determine sign of D by calculating difference between two spectra, and by calculating Fourier transform of DFFTDS1. If differentiated peak DFFTDS1 first has negative values for smaller D and positive values for larger D this means that D>0 as shown in FIG. 31. One can also integrate this feature and obtain spectrum IDFFTDS1 as shown in the FIG. 32. Person skilled in the art will notice that we will get a negative peak (minimum) for D>0 and maximum for D<0. We can use this fact to identify distance between probe and proximal surface to the first probe for nontransparent samples.

Person skilled in the art can see that the similar method can be used for the second probe in order to find position of the surface proximal to the second sample.

Person skilled in art will notice that this method can be also used for the transparent and multilayer transparent samples. The position of the interface between layers provided the interface is optically accessible can be determined by observing change of the sign of the observed peaks in the integrated differential spectra IDFFTS1 and IDFFTS2 as described in FIG. 45-FIG. 88.

The invention claimed is:

1. A Tool for measurement of semiconductor wafer comprising two probes equipped with reflectors positioned on opposite sides of the semiconductor wafer,
    where both probes are connected to 2×2 optical coupler to computer-controlled spectrograph, and to a low coherence light source,
    where an upper probe is placed at a distance from the semiconductor wafer,
        where the distance between the upper probe and semiconductor wafer defined as optical path length from 2×2 coupler through the first probe to the semiconductor wafer is different than a distance between the lower probe from the semiconductor wafer where the distance between the lower probe and semiconductor wafer is defined optical path length from 2×2 coupler through the lower probe to the semiconductor wafer
    by more than two coherence lengths of radiation emitted by the low coherence light source, and a computer-controlled spectrograph where computer is equipped with a computer Fourier transform program filtering and separating Fourier transform frequency peaks originating from top and bottom probes.

2. A method of measuring thickness of slab of the material using the tool for measurement of thickness of semiconductor wafer as described in claim 1
    comprising following steps:
    recording a set of three spectra using spectrograph including a first spectrum when two probes illuminate the semiconductor wafer;
    recording a second spectrum when only first probe produces interference fringes while the second probe is removed by distance larger than three (3) times the coherence length from position
    where second probe produces largest observed amplitude interference fringes;

recording a third spectrum when only second probe produces interference fringes while the first probe is removed by distance larger than three (3) coherence length from position where the first probe produces largest observed amplitude interference fringes;

analyzing the second spectrum and finding a first frequency of fringes caused by the radiation reflected through the first probe;

analyzing third spectrum and finding a second frequency of fringes caused by radiation propagating through the second probe;

analyzing the first spectrum using and finding simultaneously recorded two distinct frequencies corresponding to interference fringes produced by radiation propagating through two probes and attributing frequency peaks to radiation propagating through the first and the second probe using frequencies identified in the analysis of the second and the third spectra and using the simultaneously measured frequencies to calculate thickness of the wafer.

3. Tool described in claim 1 where a detector in the computer-controlled spectrograph is one dimensional array detector.

\* \* \* \* \*